United States Patent [19]

Dressel et al.

[11] 4,382,284
[45] May 3, 1983

[54] COMMAND AND RESIDUAL PRIORITY CONTROL OF LOADS

[75] Inventors: Lawrence J. Dressel, Bloomington, Minn.; Richard A. Wruck, Mount Prospect; Bruce D. Westphal, Oakwood Hills, both of Ill.

[73] Assignee: Honeywell Inc., Minneapolis, Minn.

[21] Appl. No.: 254,553

[22] Filed: Apr. 15, 1981

[51] Int. Cl.³ .............................................. G06F 9/18
[52] U.S. Cl. .................... 364/492; 364/418; 364/483; 364/900; 364/200; 364/557
[58] Field of Search ............ 364/492, 418, 483, 557, 364/200, 900, 431.11, 569, 138, 141

[56] References Cited

U.S. PATENT DOCUMENTS

| | | | |
|---|---|---|---|
| 3,905,025 | 9/1975 | Davis et al. | 364/200 |
| 4,005,391 | 1/1977 | MacPherson | 364/200 |
| 4,035,780 | 7/1977 | Kristick et al. | 364/900 |
| 4,091,447 | 5/1978 | Dillon et al. | 364/200 |
| 4,096,564 | 6/1978 | Inose et al. | 364/200 |
| 4,099,860 | 7/1978 | Connin | 355/14 C |
| 4,146,923 | 3/1979 | Borkan | 364/492 X |
| 4,282,573 | 8/1981 | Imai et al. | 123/417 X |
| 4,355,360 | 10/1982 | Asano et al. | 364/431.11 |

*Primary Examiner*—Edward J. Wise
*Attorney, Agent, or Firm*—Trevor B. Joike

[57] ABSTRACT

A system for controlling a plurality of loads based upon command and residual priorities having a plurality of loads, a controller for controlling the loads according to at least two programs, each program having a command priority used for a program which wants control of a load and a residual priority retained for the program having control, the controller comparing the command priority of the program wanting control of the load to the residual priority of the program having control for thereby providing a command instruction to the load if the command priority of the program wanting control is greater than or equal to the residual priority of the program having control, and a communication channel connected between the controller and the loads for communicating the command instruction to the load.

4 Claims, 3 Drawing Figures

FIG. 3

| | CONTROLLING PROGRAM | | PROGRAM WANTING TO CONTROL | DUTY CYCLE | | DEMAND | | OPTIMUM START / STOP | | | ZERO ENERGY BAND | | | | | MANUAL | |
|---|---|---|---|---|---|---|---|---|---|---|---|---|---|---|---|---|---|
| | | | | FAN | | FAN | | FAN | | HEAT COOL ENABLE | MIN OA | MIN OA LC | HEAT | | COOL | | |
| | | | COMMAND PRIORITY → | ON | OFF | ON | OFF | ON | OFF | | MIN | | ON | OFF | ON | OFF | ON OFF |
| | | | RESIDUAL PRIORITY ↓ | 18 | 18 | 9 | 9 | 6 | 7 | 7 | 23 | 23 | 23 | 23 | 23 | 23 | 1 1 |
| A | DUTY CYCLE | FAN | ON | 18 | | | | | | | | | | | | | | ← |
| | | FAN | OFF | 18 | | | | | | | | | | | | | | ← |
| B | DEMAND | FAN | ON | 20 | C | ← | | | | | | | | | | | | ← ← |
| | | FAN | OFF | 9 | ↓ | ↓ | | | | | | | | | | | | ← ← |
| C | OPTIMUM START/ STOP | FAN | ON | 5/31 | ←/C ↑ | ←/C ↑ | ←/C ↑ | ←/C ↑ | | | | | | | | | | ← ← |
| | | FAN | OFF | 31 | C | C | C | C | | | | | | | | | | ← ← |
| | | HEAT | ENABLE | 5/31 | | | | | | | | | | | | | | ← ← |
| | | COOL | ENABLE | 5/31 | | | | | | ← | | | | | | | | ← ← |
| | | MIN OA | MIN | 23 | | | | | | | | | | | | | | ← ← |
| | | MIN OA | MIN LC | 25 | | | | | | | | | | | | | | ← ← |
| D | ZERO ENERGY BAND | HEAT | DISABLE | 25 | | | | | | | ← | | | | | | | ← ← |
| | | HEAT | ENABLE | 23 | | | | | | | ← | | | ↓ ↑ | ↓ ↑ | | | ← ← |
| | | COOL | DISABLE | 25 | | | | | | | | | | | | | | ← ← |
| | | COOL | ENABLE | 23 | | | | | | | | | | | | ↓ | ↓ | ← ← |
| | MANUAL | | ON | 31 | C | C | C | C | | | | | | | | | | |
| | | | OFF | 31 | C | C | C | C | ← | ← | ← | ← | ← | ← | ← | ← | ← | |

COMMAND AND RESIDUAL PRIORITY CONTROL OF LOADS

BACKGROUND OF THE INVENTION

The present invention relates to the use of command and residual priorities for the control of loads. This invention is particularly useful in building automation control systems.

Building automation control systems are used for controlling air conditioning equipment, including chillers, fans, dampers, humidifiers, heating plants and the like, in larger buildings or building complexes. A typical building automation control system includes a central processor located in a control room and manned by a human operator and a plurality of air conditioning loads connected over a common communication channel to the central processor. Energy management program packages can be stored in the memory of the central processor for controlling the remote loads according to energy management routines.

Such routines can include a demand routine for turning loads on and off upon demand, a duty cycle routine for cycling loads on and off according to a duty cycle to reduce power consumption, an optimum start/stop routine for turning the air conditioning equipment off at an amount of time before non-occupancy to allow the temperature within the building to drift to a night setback temperature and to turn the equipment on in the morning an amount of time before occupancy to bring the temperature back to the desired level for occupancy, a zero energy band routine for providing neither heating nor cooling when the actual temperature within a zone is within a comfort range, and the like.

Since there are more than one routine which can control a load, it often happens that more than one routine will compete for the control of any given load, at any given time. It becomes apparent that, because of the competition between programs for control of loads, a mechanism must be established for determining which of the competing programs should be allowed to control the load.

One possible solution to this problem is to establish a priority hierarchy between the programs which are stored in the central processor such that the program having the highest priority among the programs competing for control of the load is the program selected to control the load. As a practical matter, there is always a routine or program presently controlling a load. Thus, when a new program wants to control a load, its priority must be compared to the priority of the program presently controlling the load. If the program wanting the control of the load has a priority higher than the priority of the program controlling the load, then the program wanting control is allowed to take over control of the load. However, if the program wanting control has a lower priority than the program controlling the load, the program controlling the load is allowed to continue to control the load.

In order to implement this solution, it is necessary to store the priority of the program currently controlling the load. Thus, if the program wanting control of the load has a lower priority than the priority of the program controlling the load, the priority of the program controlling the load is maintained in memory because control remains with the program having control. However, if the program wanting control of the load has a priority higher than the program currently controlling the load, then the program wanting control of the load is allowed to control the load and its priority is stored in memory. As can be seen from this operation, only programs having a priority higher than that stored in memory can control a load and only their priorities are then stored in memory. Thus, the stored priority keeps increasing until the highest priority program controls the load and lower priority programs are excluded. If a higher priority program no longer needs control of the load once its routine has been accomplished, lower priority programs cannot take over control of the load without some sort of special resetting operation to lower the priority stored in memory. The present invention solves this problem.

SUMMARY OF THE INVENTION

The present invention is directed to a system for controlling a plurality of loads based upon command and residual priorities. The system includes a plurality of loads, a controller for controlling the loads according to at least two programs, each program having a command priority used when it wants control of a load and a residual priority retained for it when it is allowed control, the controller comparing the command priority of the program wanting control of the load to the residual priority of the program having control for thereby providing a command instruction to the load if the command priority of the program wanting control is greater than or equal to the residual priority of the program having control, and a communication channel connected between the controller and the loads for communicating the command instruction to the loads.

Thus, each program has a command and a residual priority. The command priority of the program wanting control is compared to the residual priority of the program having control. If the command priority of the program wanting control is greater than or equal to the residual priority of the program having control, the program wanting control is then allowed to control the load and its residual priority replaces the residual priority of the displaced program. If the program wanting control has a lower command priority than the residual priority of the program having control, the residual priority of the program having control is retained and the residual priority of the program wanting control is ignored.

DETAILED DESCRIPTION

Figure 1:
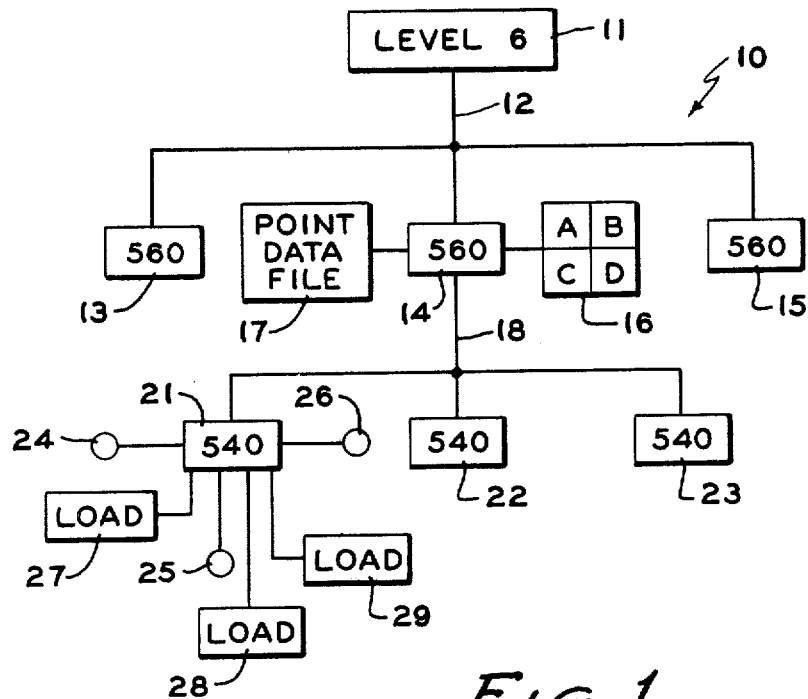
FIG. 1 shows a circuit diagram of a system for using the present invention.

Control system 10 shown in FIG. 1 includes central processor computer 11 which can be located in a control room and may include various man machine interfaces so that an operator can visually observe the control and alarm functioning of the system. As shown, central computer 11 can be a Honeywell Level 6 Computer.

Central computer 11 is connected by communication channel 12 to a plurality of Honeywell 560 Intelligent Data Gathering Panels (IDGP) 13, 14, and 15. Since all IDGPs can be arranged similarly, only IDGP 14 is shown in more detail.

IDGP 14 is connected to memory 16 which may contain the various programs which are used for controlling the loads of building automation system 10. There are four programs A-D shown in memory 16 and these programs may be related to the programs shown in FIG. 3. In addition, the memory also contains a point data file 17 which stores all of the data necessary for the control and supervision of remote loads. In this case, a point is defined as a remote load. Such information may include alarm limits, setpoints, last readings, change of state information, and the like. A further piece of information stored for each point is the residual priority of the program currently controlling that point or load.

IDGP 14 is in turn connected over communication bus 18 to a plurality of 540 multiplexers 21, 22, and 23. Since all multiplexers can be connected to various sensors and loads and are essentially alike, only the loads and sensors connected to multiplexer 21 are shown. Thus, various sensors 24, 25 and 26, which may be temperature sensors, humidity sensors, pressure sensors, air motion sensors and the like, are shown connected to multiplexer 21. Multiplexer 21 is in turn connected to a plurality of loads 27, 28, and 29 which are to be controlled by system 10.

Thus, when 560 IDGP 14 receives a temperature, for example, from sensor 24 through multiplexer 21 indicating a deviation from setpoint, IDGP 14 will issue an instruction to load 27 to bring the temperature of the zone in which sensor 24 is located back to setpoint. This control function can also reside alternatively or concurrently in central computer 11. Likewise, programs A-D in memory 16 and point data file 17 can alternatively or concurrently be stored in a memory attached to central computer 11. Furthermore, although separate memories 16 and 17 are shown in FIG. 1, these memories may be different memory locations of the same memory.

For each program A-D, there is assigned a command priority and a residual priority. The residual priority of the program presently controlling a load is stored in the point data file 17. Thus, each point or load has stored in memory 17 a residual priority of the program presently controlling that point. When a different program wants to take control of a point or load, controller 14 will compare the command priority of that program to the residual priority of the program currently in control of the load, which residual priority has been stored in the point data file for that load, and will allow the program wanting control to assume control of the load if its command priority is greater than or equal to the residual priority stored in the point data file. If the program wanting control of the load takes control of the load, then the residual priority associated with that program replaces the old residual priority in the point data file. If, on the other hand, the priority of the program wanting control is less than the residual priority stored in the point data file, the residual priority stored in the point data file remains and no changes are made. In this latter case, the program concurrently controlling the load continues to control that load.

Figure 2:
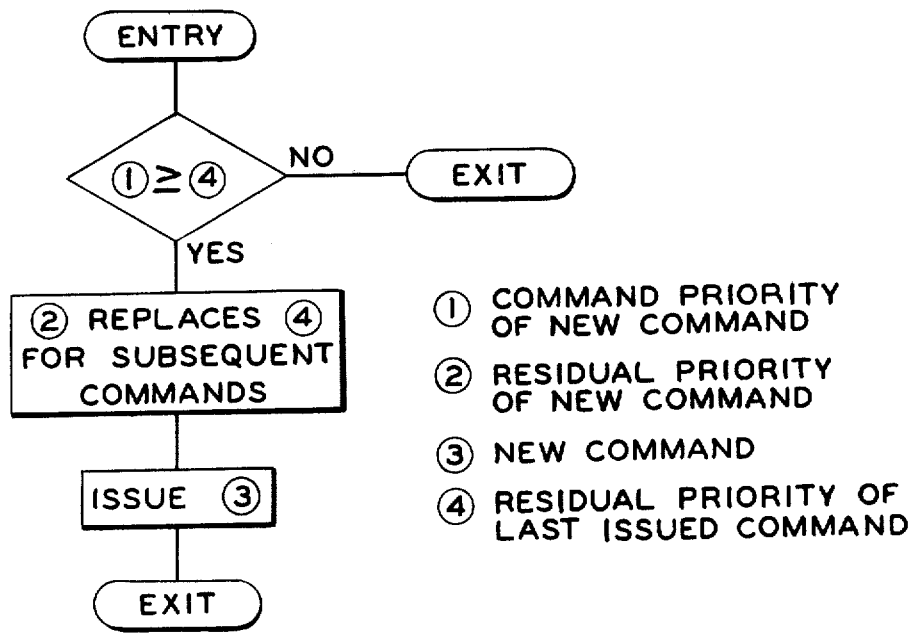
FIG. 2 shows a flow chart of the portion of the invention which relates to the selection between competing programs; and, FIG. 3 shows an example of selected programs and the priorities which might be established for those programs.

FIG. 2 shows this operation in flow chart form. When two programs compete for control of a load, the command priority of the new command, that is the command priority of the program wanting control, is compared to the residual priority of the last issued command, that is the residual priority of the program having control. If the command priority of the program wanting control is not greater than or equal to the residual priority of the program having control, the comparison operation exits and no action is taken. If, on the other hand, the command priority of the program wanting control is greater than or equal to the residual priority of the program having control, then the residual priority of the program wanting control replaces the residual priority of the program having control for subsequent comparison operations. Also, the new command or command instruction is issued.

FIG. 3 shows an example of selected energy management programs which can compete for control of the load, the command and residual priorities established for each program, and the direction of control depending upon a comparison of those priorities. The blank spaces in this chart represent areas where no comparison is made. For example, certain intersecting programs never compete for the control of certain loads and, therefore, the blocks at these intersections are left blank. Another example is that the common blocks to a program, such as the column and row duty cycle blocks, are left blank.

This chart shows at the top those programs wanting to control a load and the command priorities used when those programs want control. Four programs have been used as examples including the duty cycle program, the demand program, the optimum start/stop program, and the zero energy band program. The manual section merely indicates that a human operator has intervened to take over control of a load.

The top priority that can be assigned to a routine is 1 and the lowest priority which can be assigned is 31. It is to be noted here that the higher the priority, the smaller the number. Of course this can be inverted so that the higher the priority, the larger the number. The manual portion of the routine has a command priority of 1 which means that any time the human operator wants to take manual control of the load, his manual instructions will always be obeyed. On the other hand, the manual routine has a residual priority of 31 which means that most programs wanting to control the load will be permitted to control the load. However, the letter C on the chart indicates that a comparison is not permitted per program logic. There may be several reasons for this. For example, if a manual instruction has turned a load on, the residual priority 31 is then stored in the point data file for that load. If a demand routine desires to turn that load off, the load will be turned off because the demand routine has a higher command priority than the residual priority of the manual routine and because to conserve energy it is desired to turn loads off which are not in demand, (i.e. are not essential). But, if a manual instruction has turned a load off and a demand routine desires to turn the fan on, normally the load would be turned on because the demand routine has a higher command priority than the residual priority of the manual routine. However, it is presumed that the human operator made the right choice in turning off the fan or load and the demand routine will not be permitted by the program logic to turn the load back on even though its command priority is higher than the residual priority of the manual instruction because this kind of operation does not result in energy savings. This reasoning is also applicable to a comparison between manual and duty cycle. In the cases of optimum start/stop and zero energy band routines, however, these routines are always allowed to override manual control because both programs are designed for always operating in an energy efficient manner.

As another example, if a duty cycle routine wants to turn a fan off which has previously been turned on by a demand routine, the duty cycle program will control because its command priority is higher than the residual priority of the demand routine. On the other hand, if a duty cycle program wants to turn a fan on which has previously been turned off by a demand program, the demand program is allowed to continue control because its residual priority is higher than the command priority of the duty cycle routine. In this latter case, if there is no demand for that fan to be turned on, it would be wasteful in energy to allow the duty cycle routine to turn the fan on. If the duty cycle program wants to turn a fan off which had been previously turned off by a demand program, of course the fan would still remain off. However, the demand program would be allowed to maintain control of that fan because its residual priority has a higher priority than the command priority of the duty cycle routine thus requiring a routine having a higher priority to take control of the fan. By allowing the higher residual priority to remain in the point data file, energy is saved because the fan is not unnecessarily operated. A comparison between the duty cycle fan ON and demand fan ON is not permitted because an ON command to a load currently on is only permitted if the demand program had itself issued the last command. Thus, the designation C is used depending upon the desirable operation between the programs competing for loads and may be changed depending upon installation.

As another example, when the optimum start/stop program wants control of the fan, heating, and cooling equipment, it has a fairly high command priority which means that in most cases it will assume control of that equipment. The fan, heating, and cooling equipment during a optimum start/stop routine is given a residual priority of 5 until the temperature within the building reaches the non-occupancy or occupancy temperatures depending on whether stop or start operations are being followed to prevent any other program assuming control of those loads. The equipment is then given a residual priority of 31 once the correct temperature has been reached so that any of the other programs can assume control. When controller 14 issues a heat enable control instruction indicating the beginning of an optimum start/stop routine, a local controller is allowed to assume control of the heating equipment. For example, the local controller may include one thermostat for a nighttime temperature and a second thermostat for the occupancy temperature. As another example, controller 14 may issue one setpoint for occupancy and a second setpoint for a non-occupancy using a single thermostat. The heating and cooling disable instructions have not been shown since they are merely duplicative and essentially have the same command priority as the enabling routines.

The 560 IDGPs and the 540 multiplexers may all be supplied by Honeywell. The program listing according to the flow chart of FIG. 2 is attached as an appendix.

The chart shown in FIG. 3 is merely demonstrative. The actual priorities established for the programs can be changed according to the desire of the user and the specific comparison operations between selected routines (represented by the letter C in the chart) can also be altered as desired. Such modifications still fall within the scope of the present invention.

*Appendix*

```
ISIS-II MCS-86 MACRO ASSEMBLER V2.0 ASSEMBLY OF MODULE CNVINC
OBJECT MODULE PLACED IN :F1:CNVINC.OBJ
ASSEMBLER INVOKED BY: ASM86 :F1:CNVINC.SRC OBJECT(:F1:CNVINC.OBJ) XREF EP(:F1:CNVINC.EPL) PW(132) DA(02/25/81) PR(:F1:CNVINC

LOC  OBJ         LINE    SOURCE

1      $TITLE ('CNVT+VAL INC')
              2      ;     CONVERT VALUE INCREMENT   REV # D56-DC-000-0000
              3      ;
              4      ;     1.   REVISION HISTORY:
              5
              6      ;          REV 0    02/18/80     L. LYON
              7      ;          REV 1    05/13/80     R. FISHER    ;NEW CALCULATION
              8      ;          REV 2    11/19/80     R.T.B.       ;DIV RANGE BY 2
              9      ;          REV 3    01/23/81     R. FISHER
             10
             11      ;     2.   FUNCTION:
             12
             13      ;          THIS MODULE CONVERTS AN ABSOLUTE ANALOG VALUE INTO
             14      ;          THE PERCENTAGE OF INCREMENTS OF THE RANGE OF THE
             15      ;          ANALOG POINT.
             16
             17      ;     3.   CALL AND RETURN SETUP:
             18
             19      ;          CALL:   STACK - RES(AD),ANA+COM+VAL; ADP; ADC; CMND
             20
             21      ;          RETURN: AX - ANA+VAL
             22
             23      ;     4.   ENTRY POINT:
             24
             25                 PUBLIC CNVT+VAL INC
```

```
 26
 27   ;    5.   CALLED ROUTINES:
 28
 29              EXTRN  D3BCDBIN:FAR   ;3 BYTE BCD TO BINARY CONVERT WITH FLOP
 30
 31   ;    6.   EXTERNAL VARIABLES DEFINED:
 32
 33              DYNAMIC+WORD   SEGMENT WORD PUBLIC
 34
 35              TNPVS    DW    0         ;SENSOR SPAN
 36              TNPRNG   DW    0         ;RANGE
 37              TNPSTP   DW    0         ;SET POINT
 38
 39              DYNAMIC+WORD   ENDS
 40
 41   ;    7.   EXTERNAL VARIABLES USED:
 42
 43   ;    8.   EQUATED SYMBOLS:
 44
 45              P1    EQU   10           ;PARAMETER STACK OFFSETS
 46              P2    EQU   P1-2
 47              P3    EQU   P2-2
 48              P4    EQU   P3-2
 49              DEL40 EQU   40           ;DELTA 1000 SENSOR SPAN
 50              EIA1000 EQU 1000         ;EIA SENSOR SPAN
 51
 52   ;    9.   INTERNAL SYMBOLS:
 53
 54   ;   10.   REGISTERS USED:
 55
 56   ;              ALL RESTORED UPON EXIT EXCEPT AX.
 57
 58 +1 $EJECT
 59
 60
 61
 62
 63
 64 +1 $SAVE
 65 +1 $NOLIST
263
264 +1 $EJECT
265
266     DATA   GROUP   DYNAMIC+BYTE,DYNAMIC+WORD,DATA+POINTER,DATA+FILE
267     ASSUME CS:CODE,DS:DATA
268
269     CODE SEGMENT BYTE PUBLIC
270
271     ;
272     ;*IF
273     ;*   GRP+REC(ADC).TYP = 1 OR 2 OR 3 --> VSPAN := 40
274     ;*   (GRP+REC(ADC).TYP *= 1 OR 2 OR 3 --> VSPAN := 1000
275     ;*FI
276     ;
277     CNVT+VAL.INC   PROC              NEAR
278
279     VLIN01:        PUSH    BP
280                    MOV     BP,SP
281                    PUSH    DX
282                    PUSH    DI
283                    PUSH    SI
284                    MOV     DI,[BP+P3]        ;ADC
285                    MOV     SI,[BP+P2]        ;ADP
286                    MOV     AL,[DI+PHTTYCHN]  ;TYPE
287                    AND     AL,0F0H
288                    CMP     AL,30H
289                    JG      VLIN05            ;TYPE > 3 JUMP
290                    MOV     TNPVS,DEL40       ;DELTA 1000 SENSOR SPAN = 40
291                    JMP     VLIN10
292     VLIN05:        MOV     TNPVS,EIA1000     ;EIA SENSOR SPAN =1023
293     ;
294     ;*RNGE := D3BCDBIN (IN: PNT+REC(ADP).RNG; OUT: RNGE );
295     ;*STPNT := D3BCDBIN (IN: PNT+REC(ADP.SET+PT; OUT: STPNT );
```

```
0024 884A1F       296                 !
              297  VLIN10:    MOV     AX,[SI+ANSCFC1]  ;GET THE RANGE
0027 9A0000----  E 298                 CALL    D3BCDBIN         ;CONVERT TO BINARY
002C A30200     R 299                 MOV     TMPRNG,AX        ;SAVE
002F 884421       300                 MOV     AX,[SI+ANOFST1]  ;GET THE SET POINT
0032 9A0000----  E 301                 CALL    D3BCDBIN         ;CONVERT TO BINARY
0037 A30400     R 302                 MOV     TMPSTP,AX        ;SAVE
              303                 !
              304                 !*IF
              305                 !* CMND = 4 OR 5 -->
              306                 !* ANA+VAL := (VALUE * VSPAN) / RNGE!
              307                 !
003A 884604       308                 MOV     AX,[BP+P4]       ;GET COMMAND
003D 3C05         309                 CMP     AL,5             ;IF NOT INCREMENT OR DECREMENT
003F 7F08         310                 JG      VLIN15           ; THEN JUMP
0041 88460A       311                 MOV     AX,[BP+P1]       ;GET INCREMENT OR DECREMENT VALUE
0044 32E4         312                 XOR     AH,AH            ;FORCE TO ONE BYTE IN LENGTH
0046 E83790       313                 JMP     VLIN20           ;GO TO COMMON FINISH
              314                 !
              315                 !*!CMND <> 4 OR 5 -->
              316                 !*  IF
              317                 !*    ANA+VAL < STPNT - RNGE/2 -->
              318                 !*      ANA+VAL := STPNT - RNGE/2!
              319                 !*  ! ANA+VAL > STPNT + RNGE/2 -->
              320                 !*      ANA+VAL := STPNT + RNGE/2!
              321                 !*  ! OTHERWISE -->
              322                 !*      SKIP!
              323                 !*  FI
              324                 !*  ANA+VAL := [(VALUE - STPNT + RNGE/2) * VSPAN] / RNGE!
              325                 !*FI
              326                 !
0049 A10200   R  327  VLIN15:    MOV     AX,TMPRNG        ;RANGE
004C D1E8        328                 SHR     AX,1             ; DIVIDED BY 2
004E 03060400  R 329                 ADD     AX,TMPSTP        ; PLUS SETPOINT
0052 39460A      330                 CMP     AX,[BP+P1]       ;IF ANA+VAL > SUM
0055 7C10        331                 JL      VLIN17           ; THEN JUMP
0057 A10200   R  332                 MOV     AX,TMPRNG        ;ELSE RANGE
005A D1E8        333                 SHR     AX,1             ; DIVIDED BY 2
005C F7D8        334                 NEG     AX               ; NEGATE RANGE/2
005E 03060400  R 335                 ADD     AX,TMPSTP        ; ADDED ALGEBRAICLY TO SETPOINT
0062 38460A      336                 CMP     AX,[BP+P1]       ;IF ANA+VAL > SUM
0065 7C03        337                 JL      VLIN18           ; THEN JUMP
0067 87460A      338  VLIN17:    XCHG    AX,[BP+P1]       ;ELSE REPLACE ANA+VAL WITH LIMIT
006A 884608      339  VLIN18:    MOV     AX,[BP+P1]       ;GET COMMAND VALUE
006D F71E0400  R 340                 NEG     TMPSTP           ;SET 'SET POINT' MINUS
0071 03060400  R 341                 ADD     AX,TMPSTP        ;ADD SET POINT TO VALUE ALGEBRAICLY
0075 50          342                 PUSH    AX
0076 A10200   R  343                 MOV     AX,TMPRNG        ;ADD THE RANGE/2 TO SET POINT VALUE
0079 D1E8        344                 SHR     AX,1
007B 0146F8      345                 ADD     [BP-8],AX
007E 58          346                 POP     AX
              347
007F F7260000  R 348  VLIN20:    MUL     TMPVS            ;TOTAL TIMES THE SENSOR SPAN
0083 F7360200  R 349                 DIV     TMPRNG           ; TOTAL NUMERATOR DIVIDED BY RANGE
              350
              351
0087 5E          352                 POP     SI
0088 5F          353                 POP     DI
0089 5A          354                 POP     DX
008A 5D          355                 POP     BP
008B C20800      356                 RET     8                ;AX = ANSWER
              357
              358  CNVT+VALINC ENDP
----           359  CODE        ENDS
              360                 END
```

XREF SYMBOL TABLE LISTING

| NAME | TYPE | VALUE | ATTRIBUTES, XREFS |
|---|---|---|---|
| ??SEG | SEGMENT | | SIZE=0000H PARA PUBLIC |
| ABASLN | NUMBER | 0015H | 207# |
| ABIT | NUMBER | 000BH | 108# 109 |
| ABITMSK | NUMBER | 0030H | 236# |
| ABMSK | NUMBER | 0002H | 85# |
| ACTL | NUMBER | 000AH | 106# 107 |
| ACTLMSK | NUMBER | 00C0H | 239# |
| ADPMSK | NUMBER | 0007H | 261# |
| ADYN | NUMBER | 0204H | 205# 207 |
| AMA | NUMBER | 0028H | 214# 215 |
| AMD | NUMBER | 0016H | 162# 163 |
| ANDECP | NUMBER | 0017H | 191# 192 203 |
| ANHIL | NUMBER | 001BH | 195# 196 |
| ANLCKOUT | NUMBER | 0027H | 201# 203 211 |
| ANLOL | NUMBER | 001DH | 196# 197 |
| ANOFST1 | NUMBER | 0021H | 198# 199 300 |
| ANOFST2 | NUMBER | 0025H | 200# 201 |
| ANPD1 | NUMBER | 0028H | 211# 212 |
| ANPD2 | NUMBER | 0029H | 212# 213 |
| ANPD3 | NUMBER | 002AH | 213# 214 |
| ANSCFC1 | NUMBER | 001FH | 197# 198 297 |
| ANSCFC2 | NUMBER | 0023H | 199# 200 |
| ANVAL | NUMBER | 0013H | 187# 188 205 |
| ASTAT | NUMBER | 0011H | 203# 207 |
| ATTMSK | NUMBER | 00F0H | 223# |
| ATTRIB | NUMBER | 0000H | 104# 105 124 |
| AVALMSK | NUMBER | FFF0H | 257# |
| BITRLDS | NUMBER | 0001H | 95# 96 |
| BUSNO | NUMBER | 0018H | 169# 170 181 |
| BUSNUM | NUMBER | 001CH | 146# 147 |
| C | NUMBER | 0018H | 171# 172 |
| CBASLN | NUMBER | 0013H | 126# |
| CDY | NUMBER | 0009H | 124# 126 |
| CHNL | NUMBER | 001DH | 149# 150 |
| CIMSK | NUMBER | 00F8H | 232# |
| CLRMSK | NUMBER | 0008H | 251# |
| CMDDLY | NUMBER | 0014H | 131# 132 136 |
| CMDID | NUMBER | 0018H | 120# 121 |
| CMDPAM | NUMBER | 001DH | 121# 122 |
| CMDSMK | NUMBER | 0060H | 227# |
| CMDSTS | NUMBER | 000CH | 112# 113 |
| CNFHI | NUMBER | 001BH | 144# 145 155 |
| CNFLOW | NUMBER | 001AH | 145# 146 |
| CNTL | NUMBER | 0020H | 105# 106 |
| CNTLMSK | NUMBER | 0004H | 240# |
| CNVT+VALINC | L NEAR | 0000H | CODE PUBLIC 25 277# 358 |
| CODE | SEGMENT | | SIZE=005EH BYTE PUBLIC 267# 269 359 |
| CPMSK | NUMBER | 07FFH | 233# |
| DSECDAIN | L FAR | 0000H | EXTRN 29# 270 281 |
| DATA | GROUP | | DYNAMIC+BYTE DYNAMIC+WORD DATA+POINTER DATA+FILE 266# 267 |
| DATA+FILE | SEGMENT | | SIZE=0000H --UNDEFINED-- 266# |
| DATA+POINTER | SEGMENT | | SIZE=0000H --UNDEFINED-- 266# |
| DBASLN | NUMBER | 0005H | 140# |
| DDYN | NUMBER | 0001H | 138# 140 |
| DECPMK | NUMBER | 0007H | 243# |
| DEL40 | NUMBER | 0028H | 49# 298 |
| DGPID1 | NUMBER | 0004H | 98# 99 |
| DGPID2 | NUMBER | 0005H | 99# 100 |
| DLEN | NUMBER | 0005H | 165# |
| DLYFLG | NUMBER | 0046H | 226# |
| DMSK | NUMBER | 0002H | 256# |
| DPD1 | NUMBER | 0018H | 159# 160 165 |
| DPD2 | NUMBER | 0019H | 160# 161 |
| DPD3 | NUMBER | 001AH | 161# 162 |
| DSTAT | NUMBER | 0004H | 136# 140 |
| DYNAMIC+BYTE | SEGMENT | | SIZE=0000H --UNDEFINED-- 266# |
| DYNAMIC+WORD | SEGMENT | | SIZE=0006H WORD PUBLIC 33# 39 266 |

| | | | |
|---|---|---|---|
| E . . . . . . . | NUMBER | 0018H | 170# 171 |
| EIA4020 . . . | NUMBER | 0FA0H | 50# 292 |
| EMSLEN. . . . | NUMBER | 0008H | 155# |
| EMSMSK. . . . | NUMBER | 0008H | 249# |
| ENAMSK. . . . | NUMBER | 0020H | 252# |
| EU. . . . . . | NUMBER | 0063H | 97# 98 |
| FRCNT . . . . | NUMBER | 0009H | 103# 104 126 |
| FRCTR . . . . | NUMBER | 000BH | 110# 111 |
| FRMSK . . . . | NUMBER | 003FH | 225# |
| GRP1. . . . . | NUMBER | 001EH | 151# 152 |
| GRP10 . . . . | NUMBER | 001EH | 150# 151 |
| HYSTER. . . . | NUMBER | 001AH | 194# 195 |
| L6LMSK. . . . | NUMBER | 0004H | 245# |
| LCKPT . . . . | NUMBER | 0007H | 101# 102 |
| LKCRMK. . . . | NUMBER | 003FH | 246# |
| LKDLCT. . . . | NUMBER | 0016H | 190# 191 |
| LODCMSK . . . | NUMBER | 003FH | 266# |
| MAXOFF. . . . | NUMBER | 0015H | 132# 133 |
| MCMSK . . . . | NUMBER | 0001H | 234# |
| MIMXMSK . . . | NUMBER | 00FFH | 241# |
| MIMXTM. . . . | NUMBER | 0013H | 130# 131 138 138 |
| MINCTR. . . . | NUMBER | 0012H | 122# 124 130 187 |
| MINOFF. . . . | NUMBER | 0016H | 133# 134 |
| MINON . . . . | NUMBER | 0017H | 134# 136 144 159 169 |
| MOD1. . . . . | NUMBER | 001DH | 148# 149 |
| MOD10 . . . . | NUMBER | 001CH | 147# 148 |
| MODE. . . . . | NUMBER | 0018H | 172# 173 |
| MODEMSK . . . | NUMBER | 0002H | 253# |
| MODNUM. . . . | NUMBER | 0019H | 173# 174 |
| NRA . . . . . | NUMBER | 0032H | 80# |
| NRB . . . . . | NUMBER | 0001H | 81# |
| OUT1D1. . . . | NUMBER | 0006H | 100# 101 |
| OV. . . . . . | NUMBER | 000CH | 111# 112 |
| OVMSK . . . . | NUMBER | 0080H | 244# |
| P1. . . . . . | NUMBER | 000AH | 45# 46 311 330 336 338 339 |
| P2. . . . . . | NUMBER | 000BH | 46# 47 285 |
| P3. . . . . . | NUMBER | 0006H | 47# 48 284 |
| P4. . . . . . | NUMBER | 0004H | 48# 308 |
| PHAC. . . . . | NUMBER | 0008H | 83# |
| PHEB. . . . . | NUMBER | 0001H | 94# 95 126 |
| PHCRD . . . . | NUMBER | 0004H | 84# |
| PHGRP . . . . | NUMBER | 0002H | 73# 74 |
| PHMXPT. . . . | NUMBER | 0005H | 76# 77 |
| PHNR. . . . . | NUMBER | 0004H | 75# 76 |
| PHPNTADD. . . | NUMBER | 0006H | 77# |
| PHSCAN. . . . | NUMBER | 0003H | 74# 75 |
| PHTYCHN . . . | NUMBER | 0001H | 72# 73 286 |
| PHTYP . . . . | NUMBER | 00F0H | 82# |
| PHUCNT. . . . | NUMBER | 0000H | 71# 72 |
| PNT1. . . . . | NUMBER | 001FH | 153# |
| PNT10 . . . . | NUMBER | 001FH | 152# 153 155 |
| R . . . . . . | NUMBER | 0030H | 114# 115 |
| RD. . . . . . | NUMBER | 0090H | 92# 93 |
| RDMSK . . . . | NUMBER | 0080H | 219# |
| REPRNG. . . . | NUMBER | 0018H | 192# 193 |
| RESPRY. . . . | NUMBER | 0020H | 117# 118 |
| RMSK. . . . . | NUMBER | 0080H | 237# |
| RP. . . . . . | NUMBER | 0000H | 115# 116 |
| RPMSK . . . . | NUMBER | 0040H | 238# |
| RPTPRI. . . . | NUMBER | 0008H | 102# 103 |
| RPTPYMK . . . | NUMBER | 001FH | 242# |
| RSPRMK. . . . | NUMBER | 001FH | 229# |
| RTC . . . . . | NUMBER | 001CH | 176# 177 179 |
| RTC2. . . . . | NUMBER | 001DH | 177# 179 |
| RT1 . . . . . | NUMBER | 001AH | 174# 175 176 |
| RTI2. . . . . | NUMBER | 001BH | 175# 181 |
| RTLDYM. . . . | NUMBER | 0000H | 179# 183 |
| RTLEN . . . . | NUMBER | 0004H | 183# |
| RTMSK . . . . | NUMBER | 0010H | 240# |
| RTSLEN. . . . | NUMBER | 0004H | 181# 183 |
| SCNMSK. . . . | NUMBER | 0001H | 247# |
| SEGMSK. . . . | NUMBER | 00F0H | 221# |

```
SEGTYP. . . . NUMBER   0002H    96# 97
STATUS. . . . NUMBER   000AH    107# 108
STSMSK. . . . NUMBER   0003H    224#
TARVAL. . . . NUMBER   0014H    188# 189
TC. . . . . . NUMBER   000BH    109# 110
TCIDMSK . . . NUMBER   00F8H    230#
TMA . . . . . NUMBER   002CH    215#
TMD . . . . . NUMBER   001CH    163# 165
TMPRES. . . . NUMBER   000CH    113# 114
TMPRNC. . . . V WORD   0002H    DYNAMIC+WORD  36# 299 327 332 343 349
TMPSTP. . . . V WORD   0004H    DYNAMIC+WORD  37# 302 329 335 340 341
TMPVS . . . . V WORD   0006H    DYNAMIC+WORD  35# 290 292 348
TPCDPR. . . . NUMBER   000EH    119# 120
TPCID . . . . NUMBER   000EH    118# 119
TPFNMK. . . . NUMBER   07FFH    231#
TPRCNK. . . . NUMBER   001FH    220#
TRVLMK. . . . NUMBER   0FFFH    258#
TV..OK. . . . NUMBER   0C7FH    222#
UCMSK . . . . NUMBER   007FH    220#
UCNTMSK . . . NUMBER   00C0H    259#
UNRCNT. . . . NUMBER   0016H    189# 190 205
UNREAS. . . . NUMBER   0019H    193# 194
USERCT. . . . NUMBER   0020H    93# 94
VLIN01. . . . L NEAR   0000H    CODE  279#
VLIN05. . . . L NEAR   001EH    CODE  289 292#
VLIN10. . . . L NEAR   0024H    CODE  291 297#
VLIN15. . . . L NEAR   0049H    CODE  310 327#
VLIN17. . . . L NEAR   0067H    CODE  331 336#
VLIN18. . . . L NEAR   006AH    CODE  337 339#
VLIN20. . . . L NEAR   007FH    CODE  313 346#
WL. . . . . . NUMBER   000DH    116# 117
WLMSK . . . . NUMBER   002CH    235#
```

ASSEMBLY COMPLETE, NO ERRORS FOUND

ISIS-II MCS-86 MACRO ASSEMBLER V2.0 ASSEMBLY OF MODULE PRICNG
OBJECT MODULE PLACED IN :F1:PRICNG.OBJ
ASSEMBLER INVOKED BY: ASM86 :F1:PRICNG.SRC OBJECT(:F1:PRICNG.OBJ) XREF EP(:F1:PRICNG.EPL) PW(132) DA(02/25/81) PR(:F1:PRICNG.

LOC OBJ              LINE    SOURCE

```
  1    $TITLE ('PRIORCHNG')
  2    ;       PRIORITY CHANGE ONLY      REV 0    D56-DC-000-0000
  3
  4    ;       1.      REVISION HISTORY:
  5
  6    ;               REV 0   07/30/80        L. LYON
  7    ;               REV 1   01/09/81        R. FISHER
  8
  9    ;       2.      FUNCTION:
 10
 11    ;               THIS MODULE WILL COMPARE THE PRESENT POSITION OR
 12    ;               STATUS TO THE STATE TO WHICH IT IS BEING COMMANDED.
 13    ;               IF THE COMMAND IS DIFFERENT THEN AN INDICATION OF
 14    ;               NO ERROR WILL BE RETURNED TO THE CALLER; OTHERWISE,
 15    ;               AN INDICATION OF THE TYPE OF ERROR WILL BE RETURNED AND THE
 16    ;               RESIDUAL PRIORITY, COMMAND ID AND COMMAND PARAMETER
 17    ;               IN THE POINT FILE WILL BE UPDATED.
 18
 19    ;       3.      CALL AND RETURN SETUP:
 20
 21    ;               CALL - STACK: A+OR+D; MES(AD).ANA+VAL/CMND; ADP;
 22    ;                             RES+PRIORITY; MES(AD).CID; MES(AD).CPARA
 23    ;               RETURN - AX; ERROR
 24
 25    ;       4.      ENTRY POINT:
 26
 27                    PUBLIC PRIORCHNG
 28
 29    ;       5.      CALLED ROUTINES:
 30
```

```
                        31  ;   6.   EXTERNAL VARIABLES DEFINED:
                        32
                        33  ;   7.   EXTERNAL VARIABLES USED:
                        34
                        35  ;   8.   EQUATED SYMBOLS:
                        36
000E                    37           P1      EQU     14      ;PARAMETER STACK OFFSETS
000C                    38           P2      EQU     P1-2
000A                    39           P3      EQU     P2-2
0008                    40           P4      EQU     P3-2
0006                    41           P5      EQU     P4-2
0004                    42           P6      EQU     P5-2
0006                    43           ERR6    EQU     6       ;ERR = 6, DIFFERENT RESIDUAL PRIORITIES
000B                    44           ERR11   EQU     11      ;ERR = 11, RESIDUAL PRIORITY EQUALITY
                        45
                        46  ;   9.   INTERNAL SYMBOLS:
                        47
                        48  ;   10.  REGISTERS USED:
                        49
                        50  ;            ALL RESTORED UPON EXIT EXCEPT AX.
                        51
                        52 +1 $EJECT
                        53
                        54
                        55
                        56
                        57
                        58 +1 $SAVE
                        59 +1 $NOLIST
                        257
                        258 +1 $EJECT
                        259
                        260       ASSUME CS:CODE
                        261
----                    262       CODE SEGMENT BYTE PUBLIC
                        263
                        264
                        265  ;+IF
                        266  ;+      A+OR+D += 0 AND PNT+REC(ADP).FR+CNTR += 0 -->
                        267  ;+     IF
                        268  ;+          ANA+VAL = PNT+REC(ADP).TRCT+VAL -->
                        269  ;+          IF
                        270  ;+              PNT+REC(ADP).TMP+RES+PRIORITY = RES+PRIORITY -->
                        271  ;+              ERR := 11
                        272  ;+          |   PNT+REC(ADP).TMP+RES+PRIORITY <> RES+PRIORITY -->
                        273  ;+              PNT+REC(ADP).TMP+RES+PRIORITY := RES+PRIORITY
                        274  ;+              ERR := 6
                        275  ;+          FI
                        276  ;+      |ANA+VAL += PNT+REC(ADP).TRCT+VAL -->
                        277  ;+          ERR := 0
                        278  ;+     FI
                        279
0000                    280       PRIORCHNG  PROC    NEAR
                        281
0000 55                 282       PCA1:   PUSH BP                 ;SAVE REGISTERS USED
0001 8BEC               283               MOV BP,SP
0003 53                 284               PUSH BX
0004 51                 285               PUSH CX
0005 57                 286               PUSH DI
0006 8B460E             287               MOV AX,[BP+P1]          ;A+OR+D
0009 8B7E0A             288               MOV DI,[BP+P3]          ;ADP
000C 0BC0               289               OR AX,AX                ;JUMP A+D = 0
000E 7462               290               JE PCU50
0010 8A4508             291               MOV AL,[DI+FRCTR]       ;FAIL TO RESPOND CTR
0013 243F               292               AND AL,FRMSK            ;MASK OFF CTR
0015 0AC0               293               OR AL,AL
0017 7427               294               JE PCA20                ;CONTINUE FR+CTR += 0
0019 8B460C             295               MOV AX,[BP+P2]          ;ANA+VAL
001C 8B5D14             296               MOV BX,[DI+TARVAL]      ;TARGET VALUE
001F 81E3FF0F           297               AND BX,TRVLMK           ;MASK TARGET VALUE
0023 86FB               298               XCHG BH,BL
0025 3BC3               299               CMP AX,BX               ;COMPARE ANA+VAL AND TAR+VAL
0027 7544               300               JNZ PCERR6              ;EXIT NOT EQUAL
```

```
0029 8B4608      301   PCA10:     MOV AX,[BP+P4]           ;RES+PRIORITY
002C 8A650C      302              MOV AH,[DI+TMPRES]       ;GET TEMP RES PRIORITY
002F 80E41F      303              AND AH,1FH               ;ISOLATE
0032 3AE0        304              CMP AH,AL                ;CHECK FOR EQUALITY
0034 7431        305              JE PCERR6                ;JUMP IF EQUAL
0036 80650CE0    306              AND BYTE PTR [DI+TMPRES],0E0H  ;MASK TMP RES PRI OFF
003A 08450C      307              OR [DI+TMPRES],AL        ;PLACE INTO POINT FILE
003D E02690      308              JMP PCERR6               ;EXIT
                 309
                 310    ;*    (A+OR+D += 0 AND PNT+REC(ADP).FR+CNTR = 0 -->
                 311    ;*    IF
                 312    ;*         ANA+VAL = PNT+REC(ADP).A+VALUE -->
                 313    ;*         IF
                 314    ;*              PNT+REC(ADP).RES+PRIORITY = RES+PRIORITY -->
                 315    ;*              ERR := 11
                 316    ;*         |    PNT+REC(ADP).RES+PRIORITY <> RES+PRIORITY -->
                 317    ;*              PNT+REC(ADP).RES+PRIORITY := RES+PRIORITY
                 318    ;*              ERR := 6
                 319    ;*         FI
                 320    ;*    |ANA+VAL += PNT+REC(ADP).A+VALUE -->
                 321    ;*         ERR := 0
                 322    ;*    FI
                 323
0040 8B460C      324   PCA20:     MOV AX,[BP+P2]           ;FR+CTR = 0
0043 8B5D13      325              MOV BX,[DI+ANVAL]
0046 86FB        326              XCHG BH,BL
0048 B104        327              MOV CL,4
004A D3EB        328              SHR BX,CL
004C 3BC3        329              CMP AX,BX                ;ANA+VAL = POINT FILE ANA+VAL?
004E 751D        330              JNZ PCERR0               ;EXIT NOT EQUAL
0050 8B4608      331   PCA25:     MOV AX,[BP+P4]           ;RES+PRIORITY
0053 8A650D      332              MOV AH,[DI+RESPRT]       ;GET PNT RES PRIORITY
0056 80E41F      333              AND AH,1FH               ;ISOLATE
0059 3AE0        334              CMP AH,AL                ;COMPARE FOR EQUALITY
005B 740A        335              JE PCERR6                ;JUMP IF EQUAL
005D 80650DE0    336              AND BYTE PTR [DI+RESPRT],0E0H
0061 084500      337              OR [DI+RESPRT],AL        ;PLACE INTO POINT FILE
0064 EB0190      338              JMP PCERR6               ;EXIT
                 339
0067 B80600      340   PCERR6:    MOV AX,ERR6              ;SET UP ERROR 6 MESSAGE
006A E85790      341              JMP PCERREND             ;EXIT THRU COMMON ERROR END
                 342
006D 33C0        343   PCERR0:    XOR AX,AX                ;SET UP ERROR 0 MESSAGE
006F EB7190      344              JMP PCOUT                ;EXIT
                 345
                 346    ;*    A+OR+D = 0 AND PNT+REC(ADP).FR+CNTR += 0 -->
                 347    ;*    IF
                 348    ;*         MES(AD).CMND = PNT+REC(ADP).TMP+STATUS -->
                 349    ;*         IF
                 350    ;*              PNT+REC(ADP).TMP+RES+PRIORITY = RES+PRIORITY -->
                 351    ;*              ERR := 11
                 352    ;*         |    PNT+REC(ADP).TMP+RES+PRIORITY <> RES+PRIORITY -->
                 353    ;*              PNT+REC(ADP).TMP+RES+PRIORITY := RES+PRIORITY
                 354    ;*              ERR := 6
                 355    ;*         FI
                 356    ;*    |MES(AD).CMND += PNT+REC(ADP).TMP+STATUS -->
                 357    ;*         ERR := 0
                 358    ;*    FI
                 359
0072 8A450B      360   PCD50:     MOV AL,[DI+FRCTR]        ;A+OR+D = 0
0075 243F        361              AND AL,FRMSK             ;ISOLATE F/R CNTR
0077 7429        362              JE PCD70                 ;JUMP FR COUNTER = 0
0079 8B460C      363              MOV AX,[BP+P2]           ;MES(AD).CMND
007C 8A5D0C      364              MOV BL,[DI+CMDSTS]       ;TMP+STATUS
007F 80E360      365              AND BL,CMDSMK
0082 B105        366              MOV CL,5

LOC  OBJ        LINE   SOURCE

0084 D2EB        367              SHR BL,CL
0086 3AC3        368              CMP AL,BL                ;MES(AD).CMND = TMP+STATUS
0088 7402        369              JE PCD55
008A EBE1        370              JMP PCERR0               ;EXIT NOT EQUAL
008C 8B4608      371   PCD55:     MOV AX,[BP+P4]           ;RES+PRIORITY
```

```
003F 8A650C      372              MOV AH,[DI+TMPRES]   ;GET PNT TEMP RES PRIORITY
0092 80E41F      373              AND AH,1FH           ;ISOLATE
0095 3AE0        374              CMP AH,AL            ;COMPARE FOR EQUALITY
0097 74CE        375              JE PCERR6            ;JUMP IF EQUAL
0099 80650CE0    376              AND BYTE PTR [DI+TMPRES],0E0H
009D 03450C      377              OR [DI+TMPRES],AL    ;PLACE IN POINT FILE
00A0 EBC5        378              JMP PCERR6           ;EXIT
                 379
                 380   ;*     (A+OR+D AND PNT+REC(ADP).FR+CNTR = 0 -->)
                 381   ;*     IF
                 382   ;*           MES(AD).CMND = PNT+REC(ADP).STATUS -->
                 383   ;*           IF
                 384   ;*                 PNT+REC(ADP).RES+PRIORITY = RES+PRIORITY -->
                 385   ;*                 ERR := 11
                 386   ;*           !     PNT+REC(ADP).RES+PRIORITY <> RES+PRIORITY -->
                 387   ;*                 PNT+REC(ADP).RES+PRIORITY := RES+PRIORITY -->
                 388   ;*                 ERR := 6
                 389   ;*           FI
                 390   ;*           !MES(AD).CMND += PNT+REC(ADP).STATUS -->
                 391   ;*           ERR := 0
                 392   ;*     FI
                 393   ;*FI
                 394
00A2 8B460C      395   PCD70:      MOV AX,[BP+P2]       ;FR COUNTER = 0
00A5 8A500A      396              MOV BL,[DI+STATUS]   ;STATUS
00A8 80E303      397              AND BL,STSMSK        ;MASK
00AB 3AC3        398              CMP AL,BL
00AD 75BE        399              JNZ PCERR0           ;EXIT NOT EQUAL
00AF 8B4608      400              MOV AX,[BP+P4]       ;RES+PRIORITY
00B2 8A650D      401              MOV AH,[DI+RESPRY]   ;GET PNT RES PRIORITY
00B5 80E41F      402              AND AH,1FH           ;ISOLATE
00B8 3AE0        403              CMP AH,AL            ;CHECK FOR EQUALITY
00BA 74A8        404              JE PCERR6            ;JUMP IF EQUAL
00BC 80650DE0    405              AND BYTE PTR [DI+RESPRY],0E0H
00C0 02450D      406              OR [DI+RESPRY],AL    ;PLACE IN POINT FILE
00C3 EBA2        407              JMP PCERR6
                 408
                 409   ;*IF
                 410   ;*    ERR () 0 -->
                 411   ;*    IF
                 412   ;*          PNT+REC(ADP).FR+CNTR = 0 -->
                 413   ;*          PNT+REC(ADP).CID := MES(AD).CID;
                 414   ;*          PNT+REC(ADP).CPARA := MES(AD).CPARA;
                 415   ;*    !     PNT+REC(ADP).FR+CNTR <> 0 -->
                 416   ;*          PNT+REC(ADP).TPCID := MES(AD).CID;
                 417   ;*          PNT+REC(ADP).TPCDPR := MES(AD).CPARA;
                 418   ;*    FI
                 419   ;*!
                 420   ;*    ERR = 0 -->
                 421   ;*    SKIP;
                 422   ;*FI
                 423
00C5 8B5E06      424   PCERREND:   MOV BX,[BP+P5]       ;GET THE CMND ID
00C8 86FB        425              XCHG BH,BL           ;FLOP FOR PROPER FILE ENTRY
00CA B103        426              MOV CL,3
00CC D3E3        427              SHL BX,CL            ;POSITION CID FOR INSERTION
00CE 0B5E04      428              OR BX,[BP+P6]        ;MERGE IN CID
00D1 86DF        429              XCHG BL,BH           ;FLOP FOR PROPER FILE ENTRY
00D3 F64508B3F   430              TEST BYTE PTR [DI+FRCTR],FRMSK  ;TEST FOR COMMAND IN PROGRESS
00D7 7506        431              JNZ PCERRENDS        ;JUMP IF IN PROGRESS
00D9 895D10      432              MOV [DI+CMDID],BX    ;PLACE CID AND CPARA IN EXECUTED AREA
00DC E80490      433              JMP PCOUT            ;EXIT
00DF 895D0E      434   PCERRENDS:  MOV [DI+TPCID],BX    ;PLACE CID AND CPARA IN TEMPORARY AREA
                 435
00E2 5F          436   PCOUT:      POP DI               ;EXIT AND RESTORE REGISTERS
00E3 59          437              POP CX
00E4 5B          438              POP BX
00E5 50          439              POP BP
00E6 C20C00      440              RET 12
                 441
                 442   PRIORCHNG   ENDP
                 443   CODE        ENDS
                 444               END
```

XREF SYMBOL TABLE LISTING

| NAME | TYPE | VALUE | ATTRIBUTES, XREFS |
|---|---|---|---|
| ??SEG | SEGMENT | | SIZE=0000H PARA PUBLIC |
| ABASLN | NUMBER | 0015H | 201# |
| ABIT | NUMBER | 0006H | 192# 103 |
| ABITMSK | NUMBER | 0080H | 230# |
| AEMSK | NUMBER | 0002H | 79# |
| ACTL | NUMBER | 000AH | 100# 101 |
| ACTLMSK | NUMBER | 000CH | 233# |
| ADPMSK | NUMBER | 0007H | 255# |
| ADYM | NUMBER | 0004H | 199# 201 |
| AMA | NUMBER | 002BH | 208# 209 |
| AND | NUMBER | 001BH | 156# 157 |
| ANDECP | NUMBER | 0017H | 185# 186 197 |
| ANHIL | NUMBER | 001BH | 189# 190 |
| ANLCKOUT | NUMBER | 0027H | 195# 197 205 |
| ANLOL | NUMBER | 001DH | 190# 191 |
| ANOFST1 | NUMBER | 0021H | 192# 193 |
| ANOFST2 | NUMBER | 0025H | 194# 195 |
| ANPD1 | NUMBER | 0028H | 205# 206 |
| ANPD2 | NUMBER | 0029H | 206# 207 |
| ANPD3 | NUMBER | 002AH | 207# 208 |
| ANSCFC1 | NUMBER | 001FH | 191# 192 |
| ANSCFC2 | NUMBER | 0023H | 193# 194 |
| ANVAL | NUMBER | 0013H | 181# 182 199 325 |
| ASTAT | NUMBER | 0011H | 197# 201 |
| ATTMSK | NUMBER | 00F0H | 217# |
| ATTRIB | NUMBER | 009AH | 98# 99 118 |
| AVALMSK | NUMBER | FFF0H | 251# |
| BITRLOS | NUMBER | 0001H | 89# 90 |
| BUSNO | NUMBER | 0018H | 163# 164 175 |
| BUSNUM | NUMBER | 001CH | 140# 141 |
| C | NUMBER | 0018H | 165# 166 |
| CBASLN | NUMBER | 0013H | 129# |
| CDY | NUMBER | 0009H | 118# 120 |
| CHNL | NUMBER | 001DH | 143# 144 |
| CIMSK | NUMBER | 00F8H | 226# |
| CLRMSK | NUMBER | 0008H | 245# |
| CMDDLY | NUMBER | 0014H | 125# 126 130 |
| CMDID | NUMBER | 0010H | 114# 115 432 |
| CMDPAM | NUMBER | 0010H | 115# 116 |
| CMDSMK | NUMBER | 0060H | 221# 365 |
| CMDSTS | NUMBER | 000CH | 106# 107 364 |
| CMFHI | NUMBER | 0018H | 138# 139 149 |
| CMFLOW | NUMBER | 001AH | 139# 140 |
| CNTL | NUMBER | 0080H | 99# 100 |
| CNTLMSK | NUMBER | 0004H | 234# |
| CODE | SEGMENT | | SIZE=00E9H BYTE PUBLIC 260# 262 443 |
| CPMSK | NUMBER | 07FFH | 227# |
| DBASLN | NUMBER | 0005H | 134# |
| DDYM | NUMBER | 0001H | 133# 134 |
| DECPMK | NUMBER | 0007H | 237# |
| DCPID1 | NUMBER | 0004H | 92# 93 |
| DCPID2 | NUMBER | 0005H | 93# 94 |
| DLEN | NUMBER | 0005H | 159# |
| DLYFLG | NUMBER | 0040H | 220# |
| DMSK | NUMBER | 0002H | 241# |
| DPD1 | NUMBER | 0018H | 153# 154 159 |
| DPD2 | NUMBER | 0019H | 154# 155 |
| DPD3 | NUMBER | 001AH | 155# 156 |
| DSTAT | NUMBER | 0004H | 130# 134 |
| E | NUMBER | 0018H | 164# 165 |
| EMSLEN | NUMBER | 0038H | 149# |
| EMSMSK | NUMBER | 0008H | 243# |
| ENAMSK | NUMBER | 0020H | 246# |
| ERR11 | NUMBER | 000BH | 44# |
| ERR6 | NUMBER | 0006H | 43# 342 |
| EU | NUMBER | 0003H | 91# 92 |
| FRCNT | NUMBER | 0007H | 97# 98 120 |

```
FRCTR . . .   NUMBER    000BH    144# 105 291 360 430
FRMSK . . .   NUMBER    003FH    219# 292 361 430
GRP1. . . .   NUMBER    001EH    145# 146
GRP10 . . .   NUMBER    001EH    144# 145
HYSTER. . .   NUMBER    001AH    188# 189
L6LMSK. . .   NUMBER    0004H    239#
LCKPT . . .   NUMBER    0007H    95# 96
LKCRMK. . .   NUMBER    003FH    240#
LKDLCT. . .   NUMBER    0016H    184# 185
LOGCMSK . .   NUMBER    003FH    254#
MAXOFF. . .   NUMBER    0015H    126# 127
MCMSK . . .   NUMBER    0001H    228#
MIMXMSK . .   NUMBER    00FFH    235#
MIMXTH. . .   NUMBER    0013H    124# 125 132 132
MINCTR. . .   NUMBER    0012H    116# 118 124 181
MINOFF. . .   NUMBER    0016H    127# 128
MINON . . .   NUMBER    0017H    128# 130 138 153 163
MOD1. . . .   NUMBER    001DH    142# 143
MOD10 . . .   NUMBER    001CH    141# 142
MODE. . . .   NUMBER    0018H    166# 167
MODEMSK . .   NUMBER    0002H    247#
MODNUM. . .   NUMBER    0019H    167# 168
NRA . . . .   NUMBER    0002H    74#
NRB . . . .   NUMBER    0001H    75#
OUTID1. . .   NUMBER    0006H    94# 95
OV. . . . .   NUMBER    000CH    105# 106
OVMSK . . .   NUMBER    0080H    238#
P1. . . . .   NUMBER    000EH    37# 38 287
P2. . . . .   NUMBER    000CH    38# 39 295 324 363 395
P3. . . . .   NUMBER    000AH    39# 40 288
P4. . . . .   NUMBER    000DH    40# 41 301 331 371 400
P5. . . . .   NUMBER    0006H    41# 42 424
P6. . . . .   NUMBER    0004H    42# 428
PCA1. . . .   L NEAR    0000H CODE 282#
PCA10 . . .   L NEAR    0029H CODE 301#
PCA20 . . .   L NEAR    0040H CODE 294 324#
PCA25 . . .   L NEAR    0050H CODE 331#
PCD50 . . .   L NEAR    0072H CODE 298 368#
PCD55 . . .   L NEAR    008CH CODE 369 371#
PCD70 . . .   L NEAR    00A2H CODE 362 375#
PCERR0. . .   L NEAR    00D6H CODE 300 330 343# 378 399
PCERR6. . .   L NEAR    0067H CODE 305 308 335 338 340# 375 378 404 407
PCERREND.     L NEAR    00C5H CODE 341 424#
PCERREND5     L NEAR    00DFH CODE 431 434#
PCOUT . . .   L NEAR    00E2H CODE 344 433 436#
PHAC. . . .   NUMBER    0000H    77#
PHED. . . .   NUMBER    0001H    88# 89 126
PHGRD . . .   NUMBER    0004H    78#
PHGRP . . .   NUMBER    0002H    67# 68
PHMXPT. . .   NUMBER    0005H    70# 71
PHNR. . . .   NUMBER    0004H    69# 70
PHPNTADD.     NUMBER    0006H    71#
PHSCAN. . .   NUMBER    0003H    68# 69
PHTYCHN . .   NUMBER    0001H    66# 67
PHTYP . . .   NUMBER    00F0H    76#
PHUCNT. . .   NUMBER    0000H    65# 66
PNT1. . . .   NUMBER    001FH    147#
PNT10 . . .   NUMBER    001FH    146# 147 149
PRIORCHNG     L NEAR    0030H CODE PUBLIC 27 280# 442
R . . . . .   NUMBER    000DH    108# 109
RD. . . . .   NUMBER    0008H    86# 87
RDMSK . . .   NUMBER    0080H    213#
REPRNG. . .   NUMBER    0018H    186# 187
RESPRY. . .   NUMBER    000DH    111# 112 332 336 337 401 405 406
RMSK. . . .   NUMBER    0080H    231#
RP. . . . .   NUMBER    0009H    109# 110
RPMSK . . .   NUMBER    0040H    232#
RPTPRI. . .   NUMBER    0053H    96# 97
RPTPYMK . .   NUMBER    001FH    236#
RSPRMK. . .   NUMBER    001FH    223#
RTC . . . .   NUMBER    001CH    170# 171 173
RTC2. . . .   NUMBER    001DH    171# 173
RT1 . . . .   NUMBER    001AH    168# 169 178
```

| | | | |
|---|---|---|---|
| RTI2... | NUMBER | 0018H | 169# 175 |
| RTLDYN.. | NUMBER | 0053H | 173# 177 |
| RTLEN.. | NUMBER | 0024H | 177# |
| RTMSK.. | NUMBER | 0010H | 242# |
| RTSLEN.. | NUMBER | 0004H | 175# 177 |
| SCMASK.. | NUMBER | 0001H | 241# |
| SEGMSK.. | NUMBER | 00F0H | 215# |
| SEGTYP.. | NUMBER | 0002H | 90# 91 |
| STATUS.. | NUMBER | 000AH | 101# 102 396 |
| STKMSK.. | NUMBER | 000CH | 218# 397 |
| TARVAL.. | NUMBER | 0014H | 182# 183 296 |
| TC.... | NUMBER | 0008H | 103# 104 |
| TCIDMSK. | NUMBER | 00F0H | 224# |
| TMA... | NUMBER | 002CH | 209# |
| TMD... | NUMBER | 001CH | 157# 159 |
| TMRES.. | NUMBER | 000CH | 107# 108 302 306 307 372 376 377 |
| TPERR.. | NUMBER | 0220H | 113# 114 |
| TPCID.. | NUMBER | 000EH | 112# 113 434 |
| TPPMMK.. | NUMBER | 07FFH | 225# |
| TPRSMK.. | NUMBER | 001FH | 222# |
| TRVLMK.. | NUMBER | 0FFFH | 252# 297 |
| TYPMSK.. | NUMBER | 000FH | 216# |
| UCMSK.. | NUMBER | 007FH | 214# |
| UCNTMSK. | NUMBER | 00C0H | 253# |
| UNRCNT.. | NUMBER | 0016H | 183# 184 199 |
| UNREAS.. | NUMBER | 0019H | 187# 188 |
| USERCT.. | NUMBER | 0020H | 87# 88 |
| WL.... | NUMBER | 000DH | 110# 111 |
| WLMSK.. | NUMBER | 0020H | 229# |

ASSEMBLY COMPLETE, NO ERRORS FOUND

ISIS-II MCS-86 MACRO ASSEMBLER V2.0 ASSEMBLY OF MODULE FAILSF
OBJECT MODULE PLACED IN :F1:FAILSF.OBJ
ASSEMBLER INVOKED BY: ASM86 :F1:FAILSF.SRC OBJECT(:F1:FAILSF.OBJ) XREF EP(:F1:FAILSF.EPL) PW(132) DA(02/25/81) PR(:F1:FAILSF

```
LOC  OBJ           LINE    SOURCE

1      $TITLE ('FAILSAF+CHK')
                    2      ;          REV 0   056-DG-000-0000
                    3
                    4      ;    1.    REVISION HISTORY:
                    5
                    6      ;          REV 0   02/26/80      L. LYON
                    7
                    8      ;    2.    FUNCTION:
                    9
                   10      ;          THIS MODULE WILL DETERMINE IF THE MINIMUM ON
                   11      ;          AND OFF TIMES HAVE BEEN SATISFIED FOR A POINT
                   12      ;          BEFORE A NEW COMMAND CAN BE SENT TO A POINT.
                   13
                   14      ;    3.    CALL AND RETURN SETUP:
                   15
                   16      ;          CALL:   STACK - ADP; A+OR+D; CTYP; MES(AD).CID
                   17      ;          RETURN: AX - ERROR
                   18
                   19      ;    4.    ENTRY POINT:
                   20
                   21                 PUBLIC FAILSAF+CHK
                   22
                   23      ;    5.    CALLED ROUTINES:
                   24
                   25      ;    6.    EXTERNAL VARIABLES DEFINED:
                   26
                   27      ;    7.    EXTERNAL VARIABLES USED:
                   28
                   29      ;    8.    EQUATED SYMBOLS: (INCLUDE PHYEQU.SRC)
                   30
000A               31                 P1      EQU     10    ;PARAMETER STACK OFFSETS
0008               32                 P2      EQU     P1-2
0006               33                 P3      EQU     P2-2
```

```
0004              34              P4      EQU     P3-2
                  35
0005              36              FIVE    EQU     5
                  37
                  38   ;   9.   INTERNAL SYMBOLS:
                  39
                  40   ;   10:  REGISTERS USED:
                  41
                  42   ;        ALL RESTORED UPON EXIT EXCEPT AX.
                  43
                  44 +1  $EJECT
                  45
                  46
                  47
                  48 +1  $SAVE
                  49 +1  $NOLIST
                 247 +1  $EJECT
                 248
                 249
                 250        ASSUME CS:CODE
                 251
----             252        CODE SEGMENT BYTE PUBLIC
                 253
                 254   ;
                 255   ;J := 0
                 256   ;IF
                 257   ;     A+OR+D = 1 OR CTYP = 0 OR MES(AD).CID = MANUAL -->
                 258   ;     J := 1
                 259   ;   | A+OR+D += 1 AND CTYP += 0 AND MES(AD).CID += MANUAL -->
                 260   ;     SKIP
                 261   ;FI
                 262   ;
0000             263   FAILSAF+CHK    PROC            NEAR
                 264
0000 55          265   FSC1:          PUSH BP              ;SAVE REGISTERS USED
0001 8BEC        266                  MOV BP,SP            ;BP = TOP OF STACK
0003 53          267                  PUSH BX
0004 51          268                  PUSH CX
0005 8B4608      269                  MOV AX,[BP+P2]       ;A+OR+D
0008 3C01        270                  CMP AL,1
000A 7470        271                  JE FSCERR0           ;EXIT = 1
000C 8B4606      272                  MOV AX,[BP+P3]       ;CTYP
000F 0BC0        273                  OR AX,AX
0011 7469        274                  JZ FSCERR0           ;EXIT = 0
0013 8B4604      275                  MOV AX,[BP+P4]       ;MES(AD).CID
0016 3C01        276                  CMP AL,1
0018 7462        277                  JZ FSCERR0           ;EXIT = MANUAL (=1)
                 278   ;
                 279   ;IF
                 280   ;     J = 0 AND PNT+REC(ADP).FR+CNTR = 0 --> J := 2
                 281   ;   | J = 0 AND PNT+REC(ADP).TMP+STATUS = 1 --> J := 1
                 282   ;   | J = 0 AND PNT+REC(ADP).TMP+STATUS += 1 --> J := 3
                 283   ;   | J+= 0 --> SKIP
                 284   ;
001A 8B5E0A      285   FSC00:         MOV BX,[BP+P1]       ;ADDRESS PHYSICAL FILE
001D 8A4709      286                  MOV AL,[BX+FRCNT]
0020 243F        287                  AND AL,FRMSK
0022 7426        288                  JZ FSC30             ;JUMP FR+CNTR = 0
0024 8A470C      289                  MOV AL,[BX+CMDSTS]   ;GET TEMP STATUS
0027 2460        290                  AND AL,CMDSMK        ;ISOLATE AND POSITION
0029 B90500      291                  MOV CX,FIVE
002C D2E8        292                  SHR AL,CL
002E 3C01        293                  CMP AL,1
0030 744A        294                  JZ FSCERR0           ;EXIT STATUS = 1
                 295   ;
                 296   ;IF
                 297   ;     J = 3 AND PNT+REC(ADP).TMP+STATUS = 0 --> J := 4
                 298   ;   | J = 3 AND PNT+REC(ADP).TMP+STATUS += 0 AND PNT+REC(ADP).MIN+ON += 0
                 299   ;     --> J := 5
                 300   ;   | J = 3 AND PNT+REC(ADP).TMP+STATUS += 0 AND PNT+REC(ADP).MIN+ON = 0
                 302   ;   | J += 3 --> SKIP
                 303   ;FI
                 304   ;
```

```
0032 3C00      305    FSC10:     CMP AL,0
0034 740A      306               JZ FSC20          ;JUMP STATUS = 0
0036 8A4717    307               MOV AL,[BX+MINON] ;MIN ON
0039 0AC0      308               OR AL,AL
003B 743F      309               JZ FSCERR0        ;EXIT MINON = 0
003D EB3790    310               JMP FSCERR5       ;EXIT MINON += 0
               311    ;
               312    ;IF
               313    ;   J = 4 AND PNT+REC(ADP).MIN+OFF = 0 --> J := 1
               314    ;  | J = 4 AND PNT+REC(ADP).MIN+OFF += 0 --> J := 5
               315    ;  +| J += 4 --> SKIP
               316    ;FI
               317    ;
0040 8A4716    318    FSC20:     MOV AL,[BX+MINOFF]
0043 0AC0      319               OR AL,AL
0045 7435      320               JZ FSCERR0        ;EXIT MINOFF = 0
0047 EB2D90    321               JMP FSCERR5       ;EXIT MINOFF += 0
               322    ;
               323    ;IF
               324    ;   J = 2 AND PNT+REC(ADP).STATUS = 1 --> J := 1
               325    ;  | J = 2 AND PNT+REC(ADP).STATUS += 1 --> J := 6
               326    ;  +| J += 2 --> SKIP
               327    ;FI
               328    ;
004A 8A470A    329    FSC30:     MOV AL,[BX+STATUS]
004D 2403      330               AND AL,STSMSK
004F 3C01      331               CMP AL,1
0051 7429      332               JZ FSCERR0        ;EXIT STATUS = 1
               333    ;
               334    ;IF
               335    ;   J = 6 AND PNT+REC(ADP).STATUS += 0 --> J := 7
               336    ;  | J = 6 AND PNT+REC(ADP).STATUS = 0 AND PNT+REC(ADP).MIN+OFF = 0
               337    ;    --> J := 1
               338    ;  | J = 6 AND PNT+REC(ADP).STATUS = 0 AND PNT+REC(ADP).MIN+OFF += 0
               339    ;    AND PNT+REC(ADP).MIN+MAX+TIMER >= PNT+REC(ADP).MIN+OFF --> J := 1
               340    ;  | J = 6 AND PNT+REC(ADP).STATUS = 0 AND PNT+REC(ADP).MIN+OFF += 0
               341    ;    AND PNT+REC(ADP).MIN+MAX+TIMER < PNT+REC(ADP).MIN+OFF --> J := 5
               342    ;  | J += 6 --> SKIP
               343    ;
0053 3C00      344    FSC40:     CMP AL,0
0055 7511      345               JNZ FSC50         ;JUMP STATUS += 0
0057 8A4716    346               MOV AL,[BX+MINOFF]
005A 0AC0      347               OR AL,AL
005C 741E      348               JZ FSCERR0        ;EXIT MINOFF = 0
005E 8A6713    349               MOV AH,[BX+MIMXTM]
0061 3AE0      350               CMP AH,AL
0063 7D17      351               JGE FSCERR0       ;EXIT MINMAXTIM >= MINOFF
0065 EB0F90    352               JMP FSCERR5       ;EXIT MINMAXTIM < MINOFF
               353    ;
               354    ;IF
               355    ;   J = 7 AND PNT+REC(ADP).MIN+ON = 0 --> J := 1
               356    ;  | J = 7 AND PNT+REC(ADP).MIN+ON += 0 AND PNT+REC(ADP).MIN+MAX+TIMER >=
               357    ;    PNT+REC(ADP).MIN+ON --> J := 1
               358    ;  | J = 7 AND PNT+REC(ADP).MIN+ON += 0 AND PNT+REC(ADP).MIN+MAX+TIMER <
               359    ;    PNT+REC(ADP).MIN+ON --> J := 5
               360    ;  | J += 7 --> SKIP
               361    ;FI
               362    ;
0068 8A4717    363    FSC50:     MOV AL,[BX+MINON]
006B 0AC0      364               OR AL,AL
006D 740D      365               JZ FSCERR0        ;EXIT MINON = 0
006F 8A6713    366               MOV AH,[BX+MIMXTM]
0072 3AE0      367               CMP AH,AL
0074 7D06      368               JGE FSCERR0       ;EXIT MINMAXTIM >= MINON
               369    ;
               370    ;IF
               371    ;   J := 1 --> ERR := 0
               372    ;  | J += 1 --> ERR := 5
               373    ;FI
               374    ;
0076 B80500    375    FSCERR5:   MOV AX,5          ;ERROR EXIT = 5
0079 EB0490    376               JMP FSCEXIT
007C B80000    377    FSCERR0:   MOV AX,0          ;ERROR EXIT = 0
```

```
007F 59              378    FSCEXIT:    POP CX
0080 5B              379                POP BX
0081 5D              380                POP BP
0082 C20800          381                RET 8
                     382
                     383    FAILSAF+CHK ENDP
----                 384    CODE        ENDS
                     385                END
```

XREF SYMBOL TABLE LISTING
---- ------ ----- -------

| NAME | TYPE | VALUE | ATTRIBUTES, XREFS |
|------|------|-------|-------------------|
| ??SEG . . . | SEGMENT | | SIZE=0000H PARA PUBLIC |
| ABASLN. . | NUMBER | 0015H | 190# |
| ABIT. . . . | NUMBER | 000BH | 92# 93 |
| ABITMSK . . | NUMBER | 0080H | 220# |
| ADMSK . . . | NUMBER | 0002H | 69# |
| ACTL. . . . | NUMBER | 000AH | 90# 91 |
| ACTLMSK . . | NUMBER | 0000H | 223# |
| ADPMSK. . . | NUMBER | 0007H | 245# |
| ADYM. . . . | NUMBER | 0004H | 189# 191 |
| AMA . . . . | NUMBER | 002BH | 198# 199 |
| AMD . . . . | NUMBER | 001BH | 146# 147 |
| ANDECP. . . | NUMBER | 0017H | 175# 176 187 |
| ANHIL . . . | NUMBER | 001BH | 179# 180 |
| ANLCKOUT. . | NUMBER | 0027H | 185# 187 195 |
| ANLOL . . . | NUMBER | 001DH | 180# 181 |
| ANOFST1 . . | NUMBER | 0021H | 182# 183 |
| ANOFST2 . . | NUMBER | 0025H | 184# 185 |
| ANPD1 . . . | NUMBER | 0028H | 195# 196 |
| ANPD2 . . . | NUMBER | 0029H | 196# 197 |
| ANPD3 . . . | NUMBER | 002AH | 197# 198 |
| ANSCFC1 . . | NUMBER | 001FH | 181# 182 |
| ANSCFC2 . . | NUMBER | 0023H | 183# 184 |
| ANVAL . . . | NUMBER | 0013H | 171# 172 189 |
| ASTAT . . . | NUMBER | 0011H | 187# 191 |
| ATTMSK. . . | NUMBER | 00F0H | 207# |
| ATTRIB. . . | NUMBER | 000AH | 88# 89 108 |
| AVALMSK . . | NUMBER | FFF0H | 241# |
| BITRLDS . . | NUMBER | 0001H | 79# 80 |
| BUSNO . . . | NUMBER | 0018H | 153# 154 165 |
| BUSNUM. . . | NUMBER | 001CH | 130# 131 |
| C . . . . . | NUMBER | 0018H | 155# 156 |
| CBASLN. . . | NUMBER | 0013H | 110# |
| CDY . . . . | NUMBER | 0009H | 108# 110 |
| CHNL. . . . | NUMBER | 001DH | 133# 134 |
| CIMSK . . . | NUMBER | 00F8H | 216# |
| CLRMSK. . . | NUMBER | 0003H | 235# |
| CMDDLY. . . | NUMBER | 0014H | 115# 116 120 |
| CMDIO . . . | NUMBER | 0018H | 104# 105 |
| CMDPAM. . . | NUMBER | 001DH | 105# 106 |
| CMDSMK. . . | NUMBER | 006EH | 211# 290 |
| CMDSTS. . . | NUMBER | 000CH | 96# 97 289 |
| CMFHI . . . | NUMBER | 0018H | 128# 129 139 |
| CMFLOW. . . | NUMBER | 001AH | 129# 130 |
| CNIL. . . . | NUMBER | 000AH | 89# 90 |
| CNTLMSK . . | NUMBER | 0004H | 224# |
| CODE. . . . | SEGMENT | | SIZE=0085H BYTE PUBLIC   250# 252 384 |
| CPMSK . . . | NUMBER | 07FFH | 217# |
| DBASLN. . . | NUMBER | 0005H | 124# |
| D. . . . . | NUMBER | 0001H | 127# 124 |
| DECPMK. . . | NUMBER | 0007H | 227# |
| DCPID1. . . | NUMBER | 0004H | 82# 83 |
| DCPID2. . . | NUMBER | 0005H | 83# 84 |
| DLEN. . . . | NUMBER | 0005H | 149# |
| DLYFLG. . . | NUMBER | 0043H | 210# |
| DMSK. . . . | NUMBER | 0002H | 234# |
| DPD1. . . . | NUMBER | 0018H | 143# 144 149 |
| DPD2. . . . | NUMBER | 0019H | 144# 145 |

```
DPD3. . . .   NUMBER    001AH    145# 146
DSTAT . . .   NUMBER    0004H    120# 124
E . . . . .   NUMBER    0018H    154# 155
ENGLEN. . .   NUMBER    0008H    139#
ENSMSK. . .   NUMBER    0008H    233#
ENAMSK. . .   NUMBER    0020H    236#
EU. . . . .   NUMBER    0003H    81# 82
FAILSAF+CHK   L NEAR    0038H    CODE PUBLIC  21 263# 383
FIVE. . . .   NUMBER    0005H    36# 291
FRCNT . . .   NUMBER    0009H    87# 88 110 286
FRCTR . . .   NUMBER    0005H    94# 95
FRMSK . . .   NUMBER    003FH    209# 287
FSC00 . . .   L NEAR    001AH    CODE 285#
FSC1. . . .   L NEAR    0009H    CODE 265#
FSC10 . . .   L NEAR    0032H    CODE 305#
FSC20 . . .   L NEAR    0046H    CODE 306 318#
FSC30 . . .   L NEAR    004AH    CODE 288 329#
FSC40 . . .   L NEAR    0053H    CODE 344#
FSC50 . . .   L NEAR    0068H    CODE 345 363#
FSCERR0 . .   L NEAR    007CH    CODE 271 274 277 294 309 320 332 348 351 365 368 377#
FSCERR5 . .   L NEAR    0076H    CODE 310 321 352 375#
FSCEXIT . .   L NEAR    007FH    CODE 376 378#
GRP1. . . .   NUMBER    001EH    135# 136
GRP10 . . .   NUMBER    001EH    134# 135
HYSTER. . .   NUMBER    001AH    178# 179
L6LMSK. . .   NUMBER    0004H    227#
LCKPT . . .   NUMBER    0007H    85# 86
LKCRMK. . .   NUMBER    003FH    230#
LKDLCT. . .   NUMBER    0016H    174# 175
LODCMSK . .   NUMBER    003FH    244#
MAXOFF. . .   NUMBER    0015H    116# 117
MCMSK . . .   NUMBER    0001H    218#
MIMXMSK . .   NUMBER    00FFH    225#
MIMXTH. . .   NUMBER    0013H    114# 115 122 122 349 366
MINCTR. . .   NUMBER    0012H    106# 108 114 171
MINOFF. . .   NUMBER    0016H    117# 118 318 346
MINON . . .   NUMBER    0017H    118# 120 128 143 153 307 363
MOD1. . . .   NUMBER    001DH    132# 133
MOD10 . . .   NUMBER    001CH    131# 132
MODE. . . .   NUMBER    0018H    156# 157
MODEMSK . .   NUMBER    0002H    237#
MODNUM. . .   NUMBER    0019H    157# 158
NRA . . . .   NUMBER    0002H    64#
NRB . . . .   NUMBER    0001H    65#
OUTID1. . .   NUMBER    0006H    84# 85
OV. . . . .   NUMBER    0020H    95# 96
OVMSK . . .   NUMBER    0080H    228#
P1. . . . .   NUMBER    000AH    31# 32 285
P2. . . . .   NUMBER    0008H    32# 33 269
P3. . . . .   NUMBER    0006H    33# 34 272
P4. . . . .   NUMBER    0004H    34# 275
PHAC. . . .   NUMBER    0008H    67#
PHED. . . .   NUMBER    0001H    78# 79 110
PHGRD . . .   NUMBER    0004H    68#
PHGRP . . .   NUMBER    0002H    57# 58
PHMXPT. . .   NUMBER    0005H    60# 61
PHNR. . . .   NUMBER    0004H    59# 60
PHPNTADD. .   NUMBER    0006H    61#
PHSCAN. . .   NUMBER    0003H    58# 59
PHTYCHN . .   NUMBER    0001H    56# 57
PHTYP . . .   NUMBER    00F0H    66#
PHUCNT. . .   NUMBER    0000H    55# 56
PNT1. . . .   NUMBER    001FH    137#
PNT10 . . .   NUMBER    001FH    136# 137 139
R . . . . .   NUMBER    000DH    98# 99
RD. . . . .   NUMBER    0000H    76# 77
RDMSK . . .   NUMBER    0080H    203#
REPCNC. . .   NUMBER    0018H    176# 177
RESPRY. . .   NUMBER    000DH    101# 102
RMSK. . . .   NUMBER    0080H    221#
RP. . . . .   NUMBER    000DH    99# 100
RPMSK . . .   NUMBER    0040H    222#
RPTFR1. . .   NUMBER    0008H    86# 87
```

```
RPTPYMK . .  NUMBER   001FH    226#
RSPRMK. . .  NUMBER   001FH    213#
RTC . . . .  NUMBER   001CH    160# 161 163
RTC2. . . .  NUMBER   001DH    161# 163
RTI . . . .  NUMBER   001AH    158# 159 160
RTI2. . . .  NUMBER   001BH    159# 165
RTLDYM. . .  NUMBER   0000H    163# 167
RTLEN . . .  NUMBER   0004H    167#
RTMSK . . .  NUMBER   0010H    232#
RTSLEN. . .  NUMBER   0004H    165# 167
SCRMSK. . .  NUMBER   0091H    231#
SEGMSK. . .  NUMBER   00F0H    205#
SEGTYP. . .  NUMBER   0002H    80# 81
STATUS. . .  NUMBER   000AH    91# 92 329
STSMSK. . .  NUMBER   0003H    203# 330
TARVAL. . .  NUMBER   0014H    172# 173
TC. . . . .  NUMBER   000BH    93# 94
TCIDMSK . .  NUMBER   00F8H    214#
TMA . . . .  NUMBER   002CH    199#
TMD . . . .  NUMBER   001CH    147# 149
TMPRES. . .  NUMBER   000CH    97# 98
TPLDFR. . .  NUMBER   000EH    103# 104
TPCID . . .  NUMBER   000EH    102# 103
TPFMMK. . .  NUMBER   07FFH    215#
TPRSMK. . .  NUMBER   001FH    212#
TRVLMK. . .  NUMBER   0FFFH    242#
TFVL.. . .   NUMBER   0F0 H    200#
UCMSK . . .  NUMBER   007FH    204#
UCNTMSK . .  NUMBER   00C6H    243#
UNRCNT. . .  NUMBER   0016H    173# 174 189
UNREAS. . .  NUMBER   0019H    177# 178
USERCT. . .  NUMBER   0020H    77# 78
WL. . . . .  NUMBER   000DH    100# 101
WLMSK . . .  NUMBER   0020H    219#

ASSEMBLY COMPLETE, NO ERRORS FOUND

ISIS-II MCS-86 MACRO ASSEMBLER V2.0 ASSEMBLY OF MODULE UPDPF
OBJECT MODULE PLACED IN :F1:UPDPF.OBJ
ASSEMBLER INVOKED BY: ASM86 :F1:UPDPF.SRC OBJECT(:F1:UPDPF.OBJ) XREF EP(:F1:UPDPF.EPL) PW(132) DA(02/25/81) PR(:F1:UPDPF.LST)

LOC  OBJ           LINE    SOURCE

1      $TITLE ('UPD+PNTFIL')
                    2      ;      UPDATE POINT FILE  REV 0  D56-DC-000-0000
                    3
                    4      ;   1.   REVISION HISTORY:
                    5
                    6      ;            REV 0   06/05/80     L. LYON
                    7      ;            REV 1   01/23/81     R. FISHER
                    8
                    9      ;   2.   FUNCTION:
                   10
                   11      ;            THIS MODULE WILL UPDATE THE POINT FILE WITH THE POSITION
                   12      ;            OR STATE, THE RESIDUAL PRIORITY, THE COMMAND IDENTIFICATION
                   13      ;            AND THE COMMAND PRIORITY.  WHERE THIS INFORMATION IS PLACED
                   14      ;            IN THE POINT FILE DEPENDS UPON WHETHER THE POINT IS AN
                   15      ;            ANALOG OR A DIGITAL POINT AND IF A SECOND ID IS PRESENT
                   16      ;            IN THE FILE.
                   17
                   18      ;   3.   CALL AND RETURN SETUP:
                   19
                   20      ;            CALL:   STACK - A+OR+D; ANA+VAL/MES(AD),CMND;
                   21      ;                            RES+PRIORITY; CID; C+PARA; ADP
                   22      ;            RETURN: N/A
                   23
                   24      ;   4.   ENTRY POINT:
                   25
                   26                  PUBLIC UPD+PNTFIL
                   27
                   28      ;   5.   CALLED ROUTINES:
```

```
                    29
                    30              EXTRN DIG+UPDATE:NEAR
                    31
                    32      ;   6.  EXTERNAL VARIABLES DEFINED:
                    33
                    34      ;   7.  EXTERNAL VARIABLES USED:
                    35
                    36      ;   8.  EQUATED SYMBOLS USED:
                    37
00FE                38              P1      EQU     14              ;PARAMETER STACK OFFSETS
00FC                39              P2      EQU     P1-2
00FA                40              P3      EQU     P2-2
00F8                41              P4      EQU     P3-2
00F6                42              P5      EQU     P4-2
00F4                43              P6      EQU     P5-2
                    44
                    45      ;   9.  INTERNAL VARIABLES USED:
                    46
                    47      ;  10.  REGISTERS USED:
                    48
                    49      ;           ALL REGISTERS RESTORED UPON EXIT.
                    50 +1   $EJECT
                    51
                    52
                    53
                    54
                    55
                    56 +1   $SAVE
                    57 +1   $NOLIST
                   255
                   256 +1   $EJECT
                   257
                   258
                   259      ASSUME CS:CODE
                   260
----               261      CODE SEGMENT BYTE PUBLIC
                   262
0000               263      UPD+PNTFIL  PROC            NEAR
                   264
0000 55            265      UPDP1:      PUSH BP                     ;SAVE REGISTERS USED
0001 8BEC          266                  MOV BP,SP
0003 50            267                  PUSH AX
0004 53            268                  PUSH BX
0005 51            269                  PUSH CX
0006 8B5E04        270                  MOV BX,[BP+P6]              ;GET THE POINT FILE ADDRESS
0009 8B460E        271                  MOV AX,[BP+P1]              ;A+OR+D
000C 0BC0          272                  OR AX,AX
000E 7448          273                  JZ UPDP30                   ;JUMP DIGITAL POINT
0010 8A4705        274                  MOV AL,[BX+DCPID2]          ;ID2
0013 247F          275                  AND AL,07FH                 ;MASK
0015 0AC0          276                  OR AL,AL                    ;JUMP ID2 += 0
0017 752D          277                  JNZ UPDP10
                   278      ;*IF
                   279      ;*A+OR+D += 0 AND PNT+REC(ADP).ID2 = 0 -->
                   280      ;*PNT+REC(ADP).A+VAL := TAR+VAL
                   281      ;*PNT+REC(ADP).RES+PRIORITY := RES+PRIORITY
                   282      ;*PNT+REC(ADP).CID := CID
                   283      ;*PNT+REC(ADP).C+PARA := C+PARA
                   284
0019 8B460C        285                  MOV AX,[BP+P2]              ;ANALOG POINT - ID2 NOT PRESENT
001C 8167141F000   286                  AND WORD PTR [BX+TARVAL],0F0H
0021 86E0          287                  XCHG AH,AL
0023 240F          288                  AND AL,0FH
0025 094714        289                  OR [BX+TARVAL],AX           ;TARGET VALUE
0028 8B460A        290                  MOV AX,[BP+P3]              ;RESIDUAL PRIORITY
002B 20670DE0      291                  AND BYTE PTR [BX+RESPRY],0E0H
002F 08476D        292                  OR [BX+RESPRY],AL
0032 8B4608        293                  MOV AX,[BP+P4]              ;CID
0035 B103          294                  MOV CL,3
0037 D2E0          295                  SHL AL,CL
0039 86E0          296                  XCHG AH,AL                  ;MERGE IN COMMAND PARAMETER
003B 0B4606        297                  OR AX,[BP+P5]
003E 86E0          298                  XCHG AH,AL
```

```
0040 89470E          299              MOV [BX+TPCID],AX
0043 E83190          300              JMP UPDP40
                     301
                     302     !=!A+OR+D += 0 AND PNT+REC(ADP).ID2 += 0 -->
                     303     !*PNT+REC(ADP).TRGT := ANA+VAL
                     304     !*DIG+UPDATE(IN RESPRIORITY,CID,CPARA,ADP;OUT)
                     305
0046 8B460C          306     UPDP10:  MOV AX,[BP+P2]           !ANA+VAL
0049 816714F000      307              AND WORD PTR [BX+TARVAL],0F00H
004E 86E0            308              XCHG AH,AL
0050 240F            309              AND AL,0FH
0052 094714          310              OR [BX+TARVAL],AX        !TARGET VALUE
0055 EB0F90          311              JMP UPDP35
                     312
                     313     !=!A+OR+D = 0 -->
                     314     !*PNT+REC(ADP).TMP+STAT := RES(AD).CHNO
                     315     !*DIG+UPDATE(IN RES+PRIORITY,CID,CPARA,ADP;OUT)
                     316     !*FI
0058 8B460C          317     UPDP30:  MOV AX,[BP+P2]           !RES+AD(CHNO)
005B 8105            318              MOV CL,5
005D D3E0            319              SHL AX,CL
005F 81670C9F        320              AND BYTE PTR [BX+CHDSTS],(TPRSMK+0H)
0063 08470C          321              OR [BX+CHDSTS],AL
0066 8B460A          322     UPDP35:  MOV AX,[BP+P3]           !RES+PRIORITY
0069 50              323              PUSH AX
006A 884608          324              MOV AX,[BP+P4]           !CID
006D 50              325              PUSH AX
006E 884606          326              MOV AX,[BP+P5]           !CPARA
0071 50              327              PUSH AX
0072 53              328              PUSH BX
0073 E80000     E    329              CALL DIG+UPDATE
0076 59              330     UPDP40:  POP CX
0077 5B              331              POP BX
0078 58              332              POP AX
0079 5D              333              POP BP
007A C20C00          334              RET 12
                     335
                     336     UPD+PNTFIL    ENDP
----                 337     CODE          ENDS
                     338                   END
```

XREF SYMBOL TABLE LISTING
---- ------ ----- -------

```
NAME        TYPE     VALUE  ATTRIBUTES, XREFS

??SEG . . . SEGMENT         SIZE=0000H PARA PUBLIC
ABASLN. . . NUMBER   0015H  199#
ABIT. . . . NUMBER   0000H  100# 101
ABITMSK . . NUMBER   0080H  228#
ABMSK . . . NUMBER   0002H  77#
ACTL. . . . NUMBER   000AH  98# 99
ACTLMSK . . NUMBER   0008H  231#
ADPMSK. . . NUMBER   0007H  253#
ADTM. . . . NUMBER   0004H  197# 199
AMA . . . . NUMBER   002BH  206# 207
AMD . . . . NUMBER   001BH  154# 155
ANDECP. . . NUMBER   0017H  183# 184 195
ANHIL . . . NUMBER   001BH  187# 188
ANLCKOUT. . NUMBER   0027H  193# 195 203
ANLOL . . . NUMBER   001DH  188# 189
ANOFST1 . . NUMBER   0021H  190# 191
ANOFST2 . . NUMBER   0025H  192# 193
ANPD1 . . . NUMBER   0028H  203# 204
ANPD2 . . . NUMBER   0029H  204# 205
ANPD3 . . . NUMBER   002AH  205# 206
ANSCFC1 . . NUMBER   001FH  189# 190
ANSCFC2 . . NUMBER   0023H  191# 192
ANVAL . . . NUMBER   0013H  179# 180 197
ASTAT . . . NUMBER   0011H  195# 199
ATTMSK. . . NUMBER   00F0H  215#
ATTRIB. . . NUMBER   000AH  96# 97 116
```

| Symbol | Type | Value | References |
|---|---|---|---|
| AVALMSK | NUMBER | FFF0H | 249# |
| BITPLUS | NUMBER | 0001H | 87# 88 |
| BUSNO | NUMBER | 001BH | 161# 162 173 |
| BUSNUM | NUMBER | 001CH | 138# 139 |
| C | NUMBER | 0018H | 163# 164 |
| CBASLN | NUMBER | 0013H | 118# |
| CDY | NUMBER | 0029H | 116# 118 |
| CHNL | NUMBER | 0010H | 141# 142 |
| CIMSK | NUMBER | 03F8H | 224# |
| CLRMSK | NUMBER | 0003H | 243# |
| CMDDLY | NUMBER | 0014H | 123# 124 128 |
| CMDID | NUMBER | 0010H | 112# 113 |
| CMDPAM | NUMBER | 0018H | 113# 114 |
| CMDSMK | NUMBER | 0050H | 219# |
| CMDSTS | NUMBER | 000CH | 104# 105 320 321 |
| CMFHI | NUMBER | 0018H | 136# 137 147 |
| CMFLOW | NUMBER | 001AH | 137# 138 |
| CNIL | NUMBER | 000AH | 97# 98 |
| CNTLMSK | NUMBER | 0004H | 232# |
| CODE | SEGMENT | SIZE=0970H BYTE PUBLIC | 259# 261 337 |
| CPMSK | NUMBER | 07FFH | 225# |
| DBASLN | NUMBER | 0005H | 132# |
| DCM | NUMBER | 0001H | 126# 132 |
| DECFMK | NUMBER | 0007H | 235# |
| DGPID1 | NUMBER | 0004H | 90# 91 |
| DGPID2 | NUMBER | 0005H | 91# 92 274 |
| DIG-UPDATE | L NEAR | 0000H | EXTRN 30# 329 |
| DLEN | NUMBER | 0005H | 157# |
| DLYFLG | NUMBER | 0040H | 210# |
| DMSK | NUMBER | 0002H | 242# |
| DPD1 | NUMBER | 0018H | 151# 152 157 |
| DPD2 | NUMBER | 0019H | 152# 153 |
| DPD3 | NUMBER | 001AH | 153# 154 |
| DSTAT | NUMBER | 0004H | 128# 132 |
| E | NUMBER | 0018H | 162# 163 |
| EMSLEN | NUMBER | 0008H | 147# |
| EMSMSK | NUMBER | 0008H | 241# |
| ENAMSK | NUMBER | 0020H | 244# |
| EU | NUMBER | 0003H | 89# 90 |
| FRCNT | NUMBER | 0009H | 95# 96 118 |
| FRCTR | NUMBER | 0005H | 102# 103 |
| FRMSK | NUMBER | 003FH | 217# |
| GRP1 | NUMBER | 001EH | 143# 144 |
| GRP10 | NUMBER | 001EH | 142# 143 |
| HYSTER | NUMBER | 001AH | 186# 187 |
| L6LMSK | NUMBER | 0004H | 237# |
| LCKPT | NUMBER | 0007H | 93# 94 |
| LKCRMK | NUMBER | 003FH | 238# |
| LKDLCT | NUMBER | 0016H | 182# 183 |
| LODEMSK | NUMBER | 003FH | 252# |
| MAXOFF | NUMBER | 0015H | 124# 125 |
| MCMSK | NUMBER | 0001H | 226# |
| MIMXMSK | NUMBER | 00FFH | 233# |
| MIMXTM | NUMBER | 0013H | 122# 123 130 130 |
| MINCTR | NUMBER | 0012H | 114# 116 122 179 |
| MINOFF | NUMBER | 0016H | 125# 126 |
| MINON | NUMBER | 0017H | 126# 128 136 151 161 |
| MOD1 | NUMBER | 001DH | 140# 141 |
| MOD10 | NUMBER | 001CH | 139# 140 |
| MODE | NUMBER | 0018H | 164# 165 |
| MODEMSK | NUMBER | 0002H | 245# |
| MODNUM | NUMBER | 0019H | 165# 166 |
| NRA | NUMBER | 0002H | 72# |
| NRB | NUMBER | 0001H | 73# |
| OUTID1 | NUMBER | 0036H | 92# 93 |
| OV | NUMBER | 000CH | 103# 104 |
| OVMSK | NUMBER | 000H | 236# |
| P1 | NUMBER | 002EH | 38# 39 271 |
| P2 | NUMBER | 000CH | 39# 40 285 306 317 |
| P3 | NUMBER | 000AH | 40# 41 290 322 |
| P4 | NUMBER | 0003H | 41# 42 293 324 |
| P5 | NUMBER | 0004H | 42# 43 297 326 |
| P6 | NUMBER | 0004H | 43# 270 |
| PHAC | NUMBER | 0200H | 75# |
| PHED | NUMBER | 0001H | 86# 87 118 |
| PHCRD | NUMBER | 0204H | 76# |
| PHCRP | NUMBER | 0252H | 65# 66 |
| PHMXPT | NUMBER | 0005H | 68# 69 |
| PHNR | NUMBER | 0004H | 67# 68 |
| PHPNTADD | NUMBER | 0006H | 69# |
| PHSCAN | NUMBER | 0003H | 66# 67 |
| PHTYCHN | NUMBER | 0001H | 64# 65 |
| PHTYP | NUMBER | 00F0H | 74# |
| PHUCNT | NUMBER | 0006H | 63# 64 |
| PNTL | NUMBER | 001FH | 145# |
| PNT10 | NUMBER | 001FH | 144# 145 147 |
| R | NUMBER | 000DH | 106# 107 |
| RD | NUMBER | 0020H | 84# 85 |
| RDMSK | NUMBER | 0030H | 211# |
| REPRNG | NUMBER | 0018H | 184# 185 |
| RESPRY | NUMBER | 000DH | 109# 110 291 292 |
| RMSK | NUMBER | 0080H | 229# |
| RP | NUMBER | 000DH | 107# 108 |
| RPMSK | NUMBER | 0040H | 230# |
| RPTPRI | NUMBER | 0008H | 94# 95 |
| RPTPYMK | NUMBER | 001FH | 234# |
| RSPRMK | NUMBER | 001FH | 221# |
| RTC | NUMBER | 001CH | 168# 169 171 |
| RTC2 | NUMBER | 0010H | 169# 171 |
| RTI | NUMBER | 001AH | 166# 167 168 |
| RTI2 | NUMBER | 0018H | 167# 173 |
| RTLDYM | NUMBER | 0020H | 171# 175 |
| RTLEN | NUMBER | 0004H | 175# |
| RTMSK | NUMBER | 0010H | 240# |
| RTSLEN | NUMBER | 0004H | 173# 175 |
| SCNMSK | NUMBER | 0001H | 239# |
| SEGMSK | NUMBER | 00F0H | 213# |
| SEGTYP | NUMBER | 0002H | 88# 89 |
| STATUS | NUMBER | 003AH | 99# 100 |
| STSMSK | NUMBER | 0003H | 216# |
| TARVAL | NUMBER | 0014H | 180# 181 286 289 307 310 |
| TC | NUMBER | 000BH | 101# 102 |
| TCIDMSK | NUMBER | 00F3H | 222# |
| TMA | NUMBER | 002CH | 207# |
| TM0 | NUMBER | 001CH | 155# 157 |
| THRES | NUMBER | 000CH | 105# 106 |
| TPCOPR | NUMBER | 000EH | 111# 112 |
| TPCID | NUMBER | 000EH | 110# 111 299 |
| TPPNMK | NUMBER | 07FFH | 223# |
| TPRSMK | NUMBER | 001FH | 220# 320 |
| TRVLMK | NUMBER | 0FFFH | 250# |
| TYPMSK | NUMBER | 003FH | 214# |
| UCMSK | NUMBER | 007FH | 217# |
| UCNTMSK | NUMBER | 00C0H | 251# |
| UNACNT | NUMBER | 0016H | 181# 182 197 |
| UNITAS | NUMBER | 0019H | 105# 106 |
| UPDPNTFIL | L NEAR | 0000H | CODE PUBLIC 26 263# 336 |
| UPDP1 | L NEAR | 0000H | CODE 265# |
| UPDP10 | L NEAR | 004AH | CODE 277 306# |
| UPDP30 | L NEAR | 0058H | CODE 273 317# |
| UPDP35 | L NEAR | 0064H | CODE 311 327# |
| UPDP40 | L NEAR | 0076H | CODE 309 330# |
| USERCT | NUMBER | 0000H | 85# 86 |
| WL | NUMBER | 000DH | 108# 109 |
| WLMSK | NUMBER | 0020H | 227# |

ASSEMBLY COMPLETE, NO ERRORS FOUND

```
ISIS-II MCS-86 MACRO ASSEMBLER V2.0 ASSEMBLY OF MODULE DICUP
OBJECT MODULE PLACED IN :F1:DICUP.OBJ
ASSEMBLER INVOKED BY: ASM86 :F1:DICUP.SRC OBJECT(:F1:DICUP.OBJ) XREF EP(:F1:DICUP.EPL) PW(132) DA(02/25/81) PR(:F1:DICUP.LST)

LOC  OBJ        LINE   SOURCE

1       $TITLE ('DIC+UPDATE')
             2       ;     REV #  D56-DC-000-00:0
             3
             4       ;  1.   REVISION HISTORY:
             5
             6       ;          REV #  03/01/80     1. LYON
             7
             8       ;  2.   FUNCTION:
             9
            10       ;          THE ONLY FUNCTION IS TO PLACE THE INPUT PARAMETERS
            11       ;          INTO THE POINT FILE DEFINED BY THE LAST PARAMETER.
            12
            13       ;  3.   CALL AND RETURN SETUP:
            14
            15       ;          CALL:   STACK - RES+PRIORITY; CID; CPARA; ADP
            16       ;          RETURN: N/A
            17
            18       ;  4.   ENTRY POINT:
            19
            20              PUBLIC DIC+UPDATE
            21
            22       ;  5.   CALLED ROUTINES:
            23
            24       ;  6.   EXTERNAL VARIABLES DEFINED:
            25
            26       ;  7.   EXTERNAL VARIABLES USED:
            27
            28       ;  8.   EQUATED SYMBOLS:
            29
000A        30              P1     EQU    10        ;PARAMETER STACK OFFSETS
0008        31              P2     EQU    P1-2
0006        32              P3     EQU    P2-2
0004        33              P4     EQU    P3-2
            34
            35       ;  9.   INTERNAL SYMBOLS:
            36
            37       ; 10.   REGISTERS USED:
            38
            39       ;          ALL REGISTERS RESTORED UPON EXIT.
            40
            41 +1   $EJECT
            42
```

```
                           43
                           44
                           45
                           46
                           47 +1   $SAVE
                           48 +1   $NOLIST
                           246
                           247 +1  $EJECT
                           248
                           249     ASSUME CS:CODE
                           250
----                       251     CODE    SEGMENT BYTE PUBLIC
                           252
                           253
                           254     ;*PNT+REC(ADP).TMP+RES+PRIORITY := RES+PRIORITY
                           255     ;*PNT+REC(ADP).TMP+CID := CID
                           256     ;*PNT+REC(ADP).TMP+CPARA := C+PARA
                           257
0000                       258     DIG+UPDATE   PROC          NEAR
                           259
0000 55                    260     DG1:         PUSH BP                   ;SAVE REGISTERS USED
0001 8BEC                  261                  MOV  BP,SP
0003 50                    262                  PUSH AX
0004 53                    263                  PUSH BX
0005 51                    264                  PUSH CX
0006 8B5E04                265                  MOV  BX,[BP+P4]           ;ADDRESS OF POINT FILE
0009 8B460A                266                  MOV  AX,[BP+P1]           ;RESIDUAL PRIORITY
000C 80670CE0              267                  AND  BYTE PTR [BX+TMPRES],0E0H  ;MASK TEMP RES PRI OFF
0010 08470C                268                  OR   [BX+TMPRES],AL       ;PLACE IN POINT FILE
0013 8B4608                269                  MOV  AX,[BP+P2]           ;COMMAND ID
0016 B103                  270                  MOV  CL,3
0018 D2E0                  271                  SHL  AL,CL
001A 8B4E06                272                  MOV  CX,[BP+P3]           ;GET COMMAND PARAMETER
001D 86E9                  273                  XCHG CH,CL                ;REARRANGE
001F 80E107                274                  AND  CL,7                 ;ISOLATE
0022 0AC8                  275                  OR   CL,AL                ;MERGE IN COMMAND ID
0024 894F0E                276                  MOV  [BX+TPCID],CX        ;PLACE IN TEMP CID AND TEMP CPARA
0027 59                    277                  POP  CX                   ;RESTORE REGISTERS
0028 5B                    278                  POP  BX
0029 58                    279                  POP  AX
002A 5D                    280                  POP  BP
002B C20800                281                  RET  8
                           282
                           283     DIG+UPDATE   ENDP
----                       284     CODE         ENDS
                           285                  END
```

XREF SYMBOL TABLE LISTING
---- ------ ----- -------

| NAME      | TYPE    | VALUE   | ATTRIBUTES, XREFS           |
|-----------|---------|---------|------------------------------|
| ??SEG . . . | SEGMENT |         | SIZE=0000H PARA PUBLIC     |
| ABASLN. . . | NUMBER  | 0015H   | 190#                        |
| ABIT . . . | NUMBER  | 000BH   | 91# 92                      |
| ABITMSK . . | NUMBER  | 0008H   | 219#                        |
| ABMSK . . . | NUMBER  | 0002H   | 68#                         |
| ACTL . . . | NUMBER  | 000AH   | 89# 90                      |
| ACTLMSK . . | NUMBER  | 0006H   | 222#                        |
| ADPMSK . . | NUMBER  | 0007H   | 244#                        |
| ADYM . . . | NUMBER  | 0004H   | 188# 190                    |
| AMA . . . | NUMBER  | 0028H   | 197# 198                    |
| AND . . . | NUMBER  | 001BH   | 145# 146                    |
| ANDECP. . . | NUMBER  | 0017H   | 174# 175 186                |
| ANHIL . . . | NUMBER  | 001BH   | 178# 179                    |
| ANLCKOUT . . | NUMBER | 0027H   | 184# 186 194                |
| ANLOL . . . | NUMBER  | 001DH   | 179# 180                    |
| ANOFST1 . . | NUMBER  | 0021H   | 181# 182                    |
| ANOFST2 . . | NUMBER  | 0025H   | 183# 184                    |
| ANPD1 . . . | NUMBER  | 0028H   | 194# 195                    |
| ANPD2 . . . | NUMBER  | 0029H   | 195# 196                    |
| ANPD3 . . . | NUMBER  | 002AH   | 196# 197                    |

```
ANSCFC1  . . NUMBER   001FH    180# 181
ANSCFC2  . . NUMBER   0023H    182# 183
ANVAL  . . . NUMBER   0013H    170# 171 180
ASTAT  . . . NUMBER   0011H    186# 190
ATTMSK . . . NUMBER   00F0H    206#
ATTRIB . . . NUMBER   000AH    87# 89 107
AVALMSK  . . NUMBER   FFFFH    240#
BITRLDS  . . NUMBER   0001H    78# 79
BUSNO  . . . NUMBER   0018H    152# 153 164
BUSNUM . . . NUMBER   001CH    129# 130
C  . . . . . NUMBER   0018H    154# 155
CBASLN . . . NUMBER   0013H    109#
CDY  . . . . NUMBER   0009H    107# 109
CHNL . . . . NUMBER   001DH    132# 133
CIMSK  . . . NUMBER   00F8H    215#
CLRMSK . . . NUMBER   0038H    231#
CMDDLY . . . NUMBER   0014H    114# 115 119
CMDID  . . . NUMBER   0018H    103# 104
CMDPAM . . . NUMBER   0018H    104# 105
CMDSMK . . . NUMBER   0060H    218#
CMDSTS . . . NUMBER   000CH    95# 96
CNFHI  . . . NUMBER   0018H    127# 128 138
CMFLOW . . . NUMBER   001AH    128# 129
CNTL . . . . NUMBER   000AH    88# 89
CNTLMSK  . . NUMBER   0024H    223#
CODE . . . . SEGMENT           SIZE=002EH BYTE PUBLIC   249# 251 284
CPMSK  . . . NUMBER   07FFH    216#
DBASLN . . . NUMBER   0005H    123#
DCD. . . . . NUMBER   0009H    121# 123
DECPMK . . . NUMBER   0007H    226#
DCI  . . . . L NEAR   0000H    CODE 260#
DCPID1 . . . NUMBER   0004H    81# 82
DCPID2 . . . NUMBER   0005H    82# 83
DIG+UPDATE . L NEAR   0003H    CODE PUBLIC 20 258# 283
DLEN . . . . NUMBER   0005H    148#
DLYFLG . . . NUMBER   0040H    209#
DMSK . . . . NUMBER   0002H    233#
DPD1 . . . . NUMBER   0018H    142# 143 146
DPD2 . . . . NUMBER   0019H    143# 144
DPD3 . . . . NUMBER   001AH    144# 145
DSTAT  . . . NUMBER   0004H    119# 123
E  . . . . . NUMBER   0018H    153# 154
EMSLEN . . . NUMBER   0203H    138#
EMSMSK . . . NUMBER   0008H    232#
ENANSK . . . NUMBER   0020H    235#
EU . . . . . NUMBER   0003H    80# 81
FRCNT  . . . NUMBER   0009H    86# 87 109
FRCTR  . . . NUMBER   000BH    93# 94
FRMSK  . . . NUMBER   003FH    208#
GRP1 . . . . NUMBER   001EH    134# 135
GRP10  . . . NUMBER   001EH    133# 134
HYSTER . . . NUMBER   001AH    177# 178
L6LMSK . . . NUMBER   0004H    228#
LCKPT  . . . NUMBER   0007H    84# 85
LKCRMK . . . NUMBER   003FH    229#
LKDLCT . . . NUMBER   0016H    173# 174
LODCMSK  . . NUMBER   003FH    243#
MAXOFF . . . NUMBER   0015H    115# 116
MCMSK  . . . NUMBER   0001H    217#
MIMXMSK  . . NUMBER   00FFH    224#
MIMXTM . . . NUMBER   0013H    113# 114 121 121
MIMCTR . . . NUMBER   0012H    105# 107 113 170
MINOFF . . . NUMBER   0016H    116# 117
MINON  . . . NUMBER   0017H    117# 119 127 142 152
MOD1 . . . . NUMBER   001DH    131# 132
MOD10  . . . NUMBER   001CH    130# 131
MODE . . . . NUMBER   0018H    155# 156
MODEMSK  . . NUMBER   0002H    236#
NODNUM . . . NUMBER   0019H    156# 157
NRA  . . . . NUMBER   0002H    63#
NRB  . . . . NUMBER   0001H    64#
OUTID1 . . . NUMBER   0006H    83# 84
OV . . . . . NUMBER   000CH    94# 95
```

| Symbol | Type | Value | References |
|---|---|---|---|
| OVMSK | NUMBER | 0008H | 227# |
| P1 | NUMBER | 000AH | 30# 31 266 |
| P2 | NUMBER | 0008H | 31# 32 269 |
| P3 | NUMBER | 0006H | 32# 33 272 |
| P4 | NUMBER | 0004H | 33# 265 |
| PHAC | NUMBER | 0008H | 66# |
| PHED | NUMBER | 0001H | 77# 78 109 |
| PHGRD | NUMBER | 0004H | 67# |
| PHGRP | NUMBER | 0002H | 56# 57 |
| PHKPT | NUMBER | 0035H | 59# 60 |
| PHNR | NUMBER | 0004H | 58# 59 |
| PHPNTADD | NUMBER | 0006H | 68# |
| PHSCAN | NUMBER | 0003H | 57# 58 |
| PHTTCHN | NUMBER | 0001H | 55# 56 |
| PHTYP | NUMBER | 00F0H | 65# |
| PHUCNT | NUMBER | 0050H | 54# 55 |
| PNT1 | NUMBER | 001FH | 136# |
| PNT10 | NUMBER | 001FH | 135# 136 138 |
| R | NUMBER | 000DH | 97# 98 |
| RD | NUMBER | 0003H | 75# 76 |
| RDMSK | NUMBER | 0008H | 202# |
| REPRNC | NUMBER | 0018H | 175# 176 |
| RESPRY | NUMBER | 002DH | 100# 101 |
| RMSK | NUMBER | 0008H | 220# |
| RP | NUMBER | 000DH | 98# 99 |
| RPMSK | NUMBER | 0040H | 221# |
| RPTPRI | NUMBER | 0008H | 85# 86 |
| RPTPYMK | NUMBER | 001FH | 225# |
| RSPRMK | NUMBER | 001FH | 212# |
| RTC | NUMBER | 001CH | 159# 160 162 |
| RTC2 | NUMBER | 001DH | 160# 162 |
| RTI | NUMBER | 001AH | 157# 158 159 |
| RTI2 | NUMBER | 001BH | 158# 164 |
| RTLDYM | NUMBER | 0000H | 162# 166 |
| RTLEN | NUMBER | 0004H | 166# |
| RTMSK | NUMBER | 0010H | 231# |
| RTSLEN | NUMBER | 0204H | 164# 166 |
| SCNMSK | NUMBER | 0001H | 238# |
| SEGMSK | NUMBER | 00F0H | 204# |
| SEGTYP | NUMBER | 0002H | 79# 80 |
| STATUS | NUMBER | 000AH | 90# 91 |
| STSMSK | NUMBER | 0003H | 207# |
| TARVAL | NUMBER | 0014H | 171# 172 |
| TC | NUMBER | 0008H | 92# 93 |
| TCIDMSK | NUMBER | 00F8H | 213# |
| THA | NUMBER | 002CH | 198# |
| TMB | NUMBER | 001CH | 146# 148 |
| TMPRES | NUMBER | 000CH | 96# 97 267 268 |
| TPCDPR | NUMBER | 000EH | 102# 103 |
| TPCID | NUMBER | 000EH | 101# 102 274 |
| TPPMMK | NUMBER | 07FFH | 214# |
| TPRSMK | NUMBER | 001FH | 211# |
| TRVLMK | NUMBER | 0FFFH | 241# |
| TYPMSK | NUMBER | 000FH | 205# |
| UCMSK | NUMBER | 007FH | 203# |
| UCNTMSK | NUMBER | 00C0H | 242# |
| UNRCNT | NUMBER | 0016H | 172# 173 188 |
| UNREAS | NUMBER | 0019H | 176# 177 |
| USLRCT | NUMBER | 0000H | 76# 77 |
| WL | NUMBER | 000DH | 99# 100 |
| WLMSK | NUMBER | 0020H | 218# |

ASSEMBLY COMPLETE, NO ERRORS FOUND

ISIS-II MCS-86 MACRO ASSEMBLER V2.0 ASSEMBLY OF MODULE SENCOM
OBJECT MODULE PLACED IN :F1:SENCOM.OBJ
ASSEMBLER INVOKED BY: ASM86 :F1:SENCOM.SRC OBJECT(:F1:SENCOM.OBJ) XREF EP(:F1:SENCOM.EPL) PW(132) DA(02/25/81) PR(:F1:SENCOM

LOC OBJ          LINE    SOURCE

1      $TITLE ('SEN+COM')
                  2      ;           SEND+COMMAND   REV # DS6-DC-000-0000

```
 3
 4      ;    1.   REVISION HISTORY
 5
 6      ;         REV #    06/05/80       L. LYON
 7      ;         REV 1    01/09/81       R. FISHER
 8
 9      ;    2.   FUNCTION:
10
11      ;         THIS MODULE WILL FORM A COMMAND MESSAGE AND
12      ;         SCHEDULE IT TO BE SENT TO THE POINT.
13
14      ;    3.   CALL AND RETURN SETUP:
15
16      ;         CALL:   STACK - A+GR+D; MES(AD).CMND/AHA+VAL;
17      ;                         GRP+REC(ADC).TYP; CHNL; ADP;
18      ;                         GRP; DELAY+C; PNT
19
20      ;         RETURN: AX - NO MORE:BOOLEAN
21
22      ;    4.   ENTRY POINT
23
24                PUBLIC SEN+COM
25
26      ;    5.   CALLED ROUTINES:
27
28                EXTRN HXMEM:FAR        ;EXECUTIVE MEMORY ALLOCATION
29                EXTRN HXSUSPEND:FAR    ;EXECUTIVE SUSPEND
30                EXTRN CMDSCH:NEAR      ;COMMAND SCHEDULER
31
32      ;    6.   EXTERNAL VARIABLES DEFINED:
33
34      ;    7.   EXTERNAL VARIABLES USED:
35
36      ;    8.   EQUATED SYMBOLS:
37
0012    38                P1    EQU    18         ;PARAMETER STACK OFFSETS
0010    39                P2    EQU    P1-2
000E    40                P3    EQU    P2-2
000C    41                P4    EQU    P3-2
000A    42                P5    EQU    P4-2
0008    43                P6    EQU    P5-2
0006    44                P7    EQU    P6-2
0004    45                P8    EQU    P7-2
        46
0000    47                TW1   EQU    0          ;TOP WORD #1
0002    48                TW2   EQU    TW1+2      ;TOP WORD #2
0000    49                BT1   EQU    0          ;BYTE EQUATES FOR MSG
0001    50                BT2   EQU    BT1+1
0002    51                BT3   EQU    BT2+1
0003    52                BT4   EQU    BT3+1
0004    53                BT5   EQU    BT4+1
0005    54                BT6   EQU    BT5+1
0006    55                BT7   EQU    BT6+1
0007    56                BT8   EQU    BT7+1
0008    57                BT9   EQU    BT8+1
0009    58                BT10  EQU    BT9+1
000A    59                BT11  EQU    BT10+1
000B    60                BT12  EQU    BT11+1
000C    61                BT13  EQU    BT12+1
000D    62                BT14  EQU    BT13+1
        63
0010    64                MEM16 EQU    16
        65
        66      ;    9.   INTERNAL SYMBOLS:
        67
        68      ;    10.  REGISTERS USED:
        69
        70      ;         ALL RESTORED UPON EXIT EXCEPT AX.
        71
        72 +1   $EJECT
        73
        74
        75
        76
```

```
                    77
                    78 +1  $SAVE
                    79 +1  $NOLIST
                    277
                    278 +1 $EJECT
                    279
                    280    ASSUME CS:CODE
                    281
                    282    CODE SEGMENT BYTE PUBLIC
                    283
                    284
                    285    ;*HIMEM (IN 12; OUT ADMO)
                    286    ;*      IF
                    287    ;*              ADMO = 0 --> SUSPEND (IN SEND+COMMAND)
                    288    ;*              ; ADMO += 0 -->)
                    289    ;*                      IF
                    290    ;*                              0 < GRP+REC(ADC).TYP <= 3 --> AA := 2
                    291    ;*                              ; 0 > GRP+REC(ADC).TYP OR 3 < GRP+REC(ADC).TYP
                    292    ;*                                      --> AA := 1
                    293    ;*                      FI
                    294    ;*      FI
                    295
0000                296    SEN+COM   PROC          NEAR
                    297
0000 55             298    SEN01:    PUSH BP                ;SAVE REGISTERS USED
0001 8BEC           299              MOV BP,SP              ;BP = TOP OF STACK
0003 53             300              PUSH BX
0004 51             301              PUSH CX
0005 52             302              PUSH DX
0006 56             303              PUSH SI
0007 B81000         304    SEN02:    MOV AX,MEM16           ;REQUEST 16 BYTES MEMORY
000A 50             305              PUSH AX                ;TO FORM COMMAND MESSAGE
000B 9A0000---- E   306              CALL HIMEM             ;EXECUTIVE CALL
0010 7507           307              JNZ SEN05              ;BX=ADDRESS OF MEMORY
0012 9A0000---- E   308              CALL HISUSPEND         ;SUSPEND UNTIL MEMORY RETURNED
0017 EBEE           309              JMP SEN02
0019 8B760A         310    SEN05:    MOV SI,[BP+P5]         ;ADDRESS OF PHYSICAL FILE
001C 8B460E         311              MOV AX,[BP+P3]         ;GRP+REC(ADC).TYP
001F 3D0300         312              CMP AX,3
0022 7F03           313              JG SEN+EIA             ;JUMP TYPE > 3
0024 3D0000         314              CMP AX,0               ;CONTINUE TYPE < 0
0027 7E03           315              JLE SEN+EIA
0029 E99400         316              JMP SEN+D1K            ;JUMP 0<TYPE<=3
                    317
                    318    ;*      IF
                    319    ;*              AA += 1 --> SKIP
                    320    ;*              ; AA = 1 -->)
                    321    ;*                 MES+0(ADMO).W21 = GRP
                    322    ;*                 MES+0(ADMO).W22 = 2
                    323    ;*                      IF
                    324    ;*                              A+OR+D = 1 --> AA := 3
                    325    ;*                              ; A+OR+D += 1 --> AA := 4
                    326    ;*                      FI
                    327    ;*      FI
                    328
002C 8B4608         329    SEN+EIA:  MOV AX,[BP+P6]         ;GRP
002F D0E0           330              SHL AL,1
0031 D0E0           331              SHL AL,1
0033 D0E0           332              SHL AL,1
0035 B402           333              MOV AH,02
0037 02C4           334              ADD AL,AH
0039 8807           335              MOV [BX+BT1],AL        ;PLACE INTO MSG
003B 8B4612         336              MOV AX,[BP+P1]         ;A+OR+D
003E A801           337              TEST AL,1
0040 7442           338              JZ SEN40               ;JUMP A+OR+D += 1
                    339
                    340    ;*      IF
                    341    ;*              AA += 3 --> SKIP
                    342    ;*              ;AA = 3 -->)
                    343    ;*                 MES+0(ADMO).W33 := 5
                    344    ;*                 MES+0(ADMO).W34 := 6
                    345    ;*                 MES+0(ADMO).W35 := PKT+REC(ADP).OUTID1
                    346    ;*                 MES+0(ADMO).W36 := ANA+VAL
```

```
                     347   !*            MES+0(ADM0).W37 := 0
                     348   !*            MES+0(ADM0).W38 := 0
                     349   !*            MES+0(ADM0).W39 := CHNL
                     350   !*            MES+0(ADM0).W391 := GRP
                     351   !*            MES+0(ADM0).W392 := PNT
                     352   !*            MES+0(ADM0).W393 := 0
                     353   !*         AA := 9
                     354   !*    FI
                     355
0042 C6470105        356   SEN30:   MOV BYTE PTR [BX+BT2],00000101B
0046 C6470206        357            MOV BYTE PTR [BX+BT3],00000110B
004A 33C0            358            XOR AX,AX              ;CLEAR AX
004C 8A6406          359            MOV AH,[SI+OUTID1]     ;OUTPUT ID #1
004F 8B5610          360            MOV DX,[BP+P2]         ;ANA+VAL
0052 D1EA            361            SHR DX,1
0054 D1EA            362            SHR DX,1
0056 8AC2            363            MOV AL,DL
0058 B106            364            MOV CL,6
005A D2E6            365            SHL DH,CL
005C 80E43F          366            AND AH,3FH
005F 0AE6            367            OR AH,DH
0061 86E0            368            XCHG AH,AL
0063 894703          369            MOV [BX+BT4],AX
0066 C7470500        370            MOV WORD PTR [BX+BT6],0
006B 88460C          371            MOV AX,[BP+P4]         ;CHANNEL
006E 88470A          372            MOV [BX+BT11],AL
0071 884608          373            MOV AX,[BP+P6]         ;GROUP
0074 88470B          374            MOV [BX+BT12],AL
0077 884604          375            MOV AX,[BP+P8]         ;POINT
007A 88470C          376            MOV [BX+BT13],AL
007D C6470D00        377            MOV BYTE PTR [BX+BT14],0
0081 E9DE00          378            JMP SEN90              ;EXIT
                     379
                     380   !*    IF
                     381   !*       AA +=4 --> SKIP
                     382   !*       ( AA = 4 -->)
                     383   !*         MES+0(ADM0).W23 := 4
                     384   !*         MES+0(ADM0).W24 := 2
                     385   !*         MES+0(ADM0).W25 := MES(AD).CMND
                     386   !*         MES+0(ADM0).W26 := PNT+REC(ADP).OUTID1
                     387   !*         MES+0(ADM0).W27 := 0
                     388   !*         MES+0(ADM0).W28 := 0
                     389   !*         MES+0(ADM0).W29 := CHNL
                     390   !*         MES+0(ADM0).W291 := GRP
                     391   !*         MES+0(ADM0).W292 := PNT
                     392   !*         MES+0(ADM0).W293 := DELAY+C
                     393   !*         AA := 9
                     394   !*    FI
                     395
0084 C6470104        396   SEN40:   MOV BYTE PTR [BX+BT2],00000100B
0088 C6470202        397            MOV BYTE PTR [BX+BT3],00000010B
008C 8B4610          398            MOV AX,[BP+P2]         ;MES(AD).CMND
008F B106            399            MOV CL,6
0091 D2E0            400            SHL AL,CL
0093 8A5406          401            MOV DL,[SI+OUTID1]     ;OUT ID #1
0096 80EA17          402            SUB DL,23              ;TO ADJUST FOR 540 BOARD CONVENTIONS
0099 D0EA            403            SHR DL,1               ;  FINISH ADJUSTMENTS
009B 02C2            404            ADD AL,DL
009D 894703          405            MOV [BX+BT4],AL
00A0 C7470500        406            MOV WORD PTR [BX+BT5],0
00A5 88460C          407            MOV AX,[BP+P4]         ;CHANNEL
00A8 88470A          408            MOV [BX+BT11],AL
00AB 884608          409            MOV AX,[BP+P6]         ;GROUP
00AE 88470B          410            MOV [BX+BT12],AL
00B1 884604          411            MOV AX,[BP+P8]         ;POINT
00B4 88470C          412            MOV [BX+BT13],AL
00B7 884606          413            MOV AX,[BP+P7]         ;DELAY+C
00BA 88470D          414            MOV [BX+BT14],AL
00BD E9A200          415            JMP SEN90              ;EXIT
                     416
                     417   !*    IF
                     418   !*       AA += 2 --> SKIP
                     419   !*       ( AA = 2 -->)
```

```
                420   ;*         MES+0(ADMO).W01 := 6
                421   ;*         MES+0(ADMO).W02 := GRP+REC(ADC).GRP+NUM
                422   ;*         MES+0(ADMO).W03 := 24(D)
                423   ;*         MES+0(ADMO).W04 := 0
                424   ;*         IF
                425   ;*             A+OR+D = 1 --> AA := 6
                426   ;*             | A+OR+D += 1 --> AA := 5
                427   ;*         FI
                428   ;*      FI
                429
00C0 B4C0       430   SEN+01K:   MOV AH,11000000B
00C2 32C0       431              XOR AL,AL          ;CLEAR AL
00C4 8B5606     432              MOV DX,[BP+P6]     ;GROUP
00C7 B105       433              MOV CL,5
00C9 D3E2       434              SHL DX,CL
00CB 03C2       435              ADD AX,DX
00CD BA1800     436              MOV DX,24
00D0 03C2       437              ADD AX,DX
00D2 8907       438              MOV [BX+TW1],AX
00D4 C747020000 439              MOV WORD PTR [BX+TW2],0
00D9 8B4612     440              MOV AX,[BP+P1]     ;A+OR+D
00DC 3D0100     441              CMP AX,1
00DF 744D       442              JZ SEN60           ;JUMP A+OR+D = 1
                443
                444   ;*      IF
                445   ;*         AA += 5 --> SKIP
                446   ;*         | AA = 5 -->
                447   ;*             MES+0(ADMO).W06 := 8
                448   ;*             MES+0(ADMO).W07 := MES(AD).CMND
                449   ;*             MES+0(ADMO).W09 := 0
                450   ;*             MES+0(ADMO).W91 := 0
                451   ;*             MES+0(ADMO).W92 := CHNL
                452   ;*             MES+0(ADMO).W93 := GRP
                453   ;*             MES+0(ADMO).W94 := PNT
                454   ;*             MES+0(ADMO).W95 := DELAY+C
                455   ;*         IF
                456   ;*             GRP+REC(ADC).TYP += 3 --> AA := 7
                457   ;*             | GRP+REC(ADC).TYP = 3 --> AA := 8
                458   ;*         FI
                459   ;*      FI
                460
00E1 B80800     461   SEN50:     MOV AX,8
00E4 8B5610     462              MOV DX,[BP+P2]     ;MES(AD).CMND
00E7 B105       463              MOV CL,5
00E9 D3E2       464              SHL DX,CL
00EB 03C2       465              ADD AX,DX
00ED 894702     466              MOV [BX+TW2],AX
00F0 8B460C     467              MOV AX,[BP+P4]     ;CHANNEL
00F3 884708     468              MOV [BX+BT11],AL
00F6 8B4608     469              MOV AX,[BP+P6]     ;GROUP
00F9 88470B     470              MOV [BX+BT12],AL
00FC 8B4604     471              MOV AX,[BP+P3]     ;POINT
00FF 88470C     472              MOV [BX+BT13],AL
0102 8B4606     473              MOV AX,[BP+P7]     ;DELAY+C
0105 88470D     474              MOV [BX+BT14],AL
0108 C7470F0000 475              MOV WORD PTR [BX+BT5],0
010D 8B460E     476              MOV AX,[BP+P3]     ;GRP+REC(ADC).TYP
0110 3C03       477              CMP AL,3
0112 740D       478              JE SEN58
                479
                480   ;*      IF
                481   ;*         AA += 7 --> SKIP
                482   ;*         | AA = 7 -->
                483   ;*             MES+0(ADMO).W05 = PNT+REC(ADP).RLY+NUM
                484   ;*             MES+0(ADMO).W06 = 0
                485   ;*             AA := 9
                486   ;*      FI
                487
0114 8B5406     488   SEN57:     MOV DX,[SI+OUT1D1]  ;RELAY NUMBER
0117 B105       489              MOV CL,5
0119 D3E2       490              SHL DX,CL
011B 015702     491              ADD [BX+TW2],DX
011E EB4290     492              JMP SEN90           ;EXIT
```

```
                493
                494   ;*    IF
                495   ;*         AA += 8 --> SKIP
                496   ;*         ( AA = 8 -->
                497   ;*            MES+0(ADMO).W85 := 0
                498   ;*            MES+0(ADMO).W86 := PNT+REC(ADP).RLY+NUM
                499   ;*            AA := 9
                500   ;*    FI
                501
 0121 8B5406    502   SEN58:    MOV DX,[SI+OUTID1]    ;RELAY NUMBER
 0124 D1E2      503             SHL DX,1
 0126 D1E2      504             SHL DX,1
 0128 015702    505             ADD [BX+TW2],DX
 012B EB3590    506             JMP SEN90
                507
                508   ;*    IF
                509   ;*         AA += 6 --> SKIP
                510   ;*         ( AA = 6 -->
                511   ;*            MES+0(ADMO).W18 := 0
                512   ;*            MES+0(ADMO).W17 := ANA+VA
                513   ;*            MES+0(ADMO).W16 := PNT+REC(ADP).RLY+NUM
                514   ;*            MES+0(ADMO).W18 := 0
                515   ;*            MES+0(ADMO).W19 := 0
                516   ;*            MES+0(ADMO).W191 := CHNL
                517   ;*            MES+0(ADMO).W192 := GRP
                518   ;*            MES+0(ADMO).W193 := PNT
                519   ;*            MES+0(ADMO).W194 := 0
                520   ;*            AA := 9
                521   ;*    FI
                522
 012E 33C0      523   SEN60:    XOR AX,AX             ;CLEAR AX
 0130 8B5610    524             MOV DX,[BP+P2]        ;ANA+VAL
 0133 B105      525             MOV CL,5
 0135 D3E2      526             SHL DX,CL
 0137 03C2      527             ADD AX,DX
 0139 33D2      528             XOR DX,DX
 013B 8A5406    529             MOV DL,[SI+OUTID1]    ;RELAY NUMBER
 013E D1E2      530             SHL DX,1
 0140 D1E2      531             SHL DX,1
 0142 03C2      532             ADD AX,DX
 0144 894702    533             MOV [BX+TW2],AX
 0147 8B460C    534             MOV AX,[BP+P4]        ;CHANNEL
 014A 88470A    535             MOV [BX+BT11],AL
 014D 8B460B    536             MOV AX,[BP+P6]        ;GROUP
 0150 88470B    537             MOV [BX+BT12],AL
 0153 8B4604    538             MOV AX,[BP+P8]        ;POINT
 0156 88470C    539             MOV [BX+BT13],AL
 0159 C6470D00  540             MOV BYTE PTR [BX+BT14],0
 015D C747040000 541            MOV WORD PTR [BX+BT5],0
                542
                543   ;*CMDSCH (IN ADMO, ADP; OUT NO+MORE)
                544
 0162 53        545   SEN90:    PUSH BX               ;ADMO
 0163 56        546             PUSH SI               ;AUP
 0164 E80000 E  547             CALL CMDSCH           ;SCHEDULE COMMAND
 0167 5E        548             POP SI
 0168 5A        549             POP DX
 0169 59        550             POP CX
 016A 5B        551             POP BX
 016B 50        552             POP BP
 016C C21000    553             RET 16
                554
                555   SEN+COM   ENDP
                556   CODE      ENDS
                557             END

XREF SYMBOL TABLE LISTING
---- ------ ----- -------

NAME      TYPE     VALUE    ATTRIBUTES, XREFS

??SEG . . SEGMENT           SIZE=0000H PARA PUBLIC
ABASLN. . NUMBER   0015H    221#
```

```
ABIT. . .   NUMBER    060BH    122# 123
ABITMSK .   NUMBER    0080H    250#
ABMSK . .   NUMBER    0002H    99#
ACTL. . .   NUMBER    000AH    120# 121
ACTLMSK .   NUMBER    0006H    253#
ADPMSK. .   NUMBER    0007H    275#
ADYN. . .   NUMBER    0004H    219# 221
ANA . . .   NUMBER    0028H    228# 229
AND . . .   NUMBER    0016H    176# 177
ANDECP. .   NUMBER    0017H    205# 206 217
ANHIL . .   NUMBER    001BH    209# 210
ANLCKOUT.   NUMBER    0027H    215# 217 225
ANLOL . .   NUMBER    001DH    210# 211
ANOFST1 .   NUMBER    0021H    212# 213
ANOFST2 .   NUMBER    0025H    214# 215
ANPD1 . .   NUMBER    0028H    225# 226
ANPD2 . .   NUMBER    0029H    226# 227
ANPD3 . .   NUMBER    002AH    227# 228
ANSCFC1 .   NUMBER    001FH    211# 212
ANSCFC2 .   NUMBER    0023H    213# 214
ANVAL . .   NUMBER    0013H    201# 202 219
ASTAT . .   NUMBER    0011H    217# 221
ATTMSK. .   NUMBER    00F0H    237#
ATTRIB. .   NUMBER    000AH    118# 119 138
AVALMSK .   NUMBER    FFF0H    271#
BITRLOS .   NUMBER    0001H    109# 110
BT1 . . .   NUMBER    0000H    49# 50 335
BT10. . .   NUMBER    0009H    58# 59
BT11. . .   NUMBER    000AH    59# 60 372 408 468 535
BT12. . .   NUMBER    000BH    60# 61 374 410 470 537
BT13. . .   NUMBER    000CH    61# 62 376 412 472 539
BT14. . .   NUMBER    000DH    62# 377 414 474 540
BT2 . . .   NUMBER    0001H    50# 51 356 396
BT3 . . .   NUMBER    0002H    51# 52 357 397
BT4 . . .   NUMBER    0003H    52# 53 369 405
BT5 . . .   NUMBER    0004H    53# 54 406 475 541
BT6 . . .   NUMBER    0005H    54# 55 370
BT7 . . .   NUMBER    0006H    55# 56
BT8 . . .   NUMBER    0007H    56# 57
BT9 . . .   NUMBER    0008H    57# 58
BUSNO . .   NUMBER    0018H    183# 184 195
BUSNUM. .   NUMBER    001CH    160# 161
C . . . .   NUMBER    0010H    185# 186
CCASLN. .   NUMBER    0013H    140#
CDY . . .   NUMBER    0009H    138# 140
CHNL. . .   NUMBER    001DH    163# 164
CIMSK . .   NUMBER    0020H    246#
CLRMSK. .   NUMBER    0008H    265#
CMDDLY. .   NUMBER    0014H    145# 146 150
CMDID . .   NUMBER    0010H    134# 135
CMDPAM. .   NUMBER    0010H    135# 136
CMDSCH. .   L NEAR    0000H    EXTRN  30# 547
CMDSMK. .   NUMBER    0060H    241#
CMDSTS. .   NUMBER    000CH    126# 127
CNFHI . .   NUMBER    0018H    158# 159 169
CNFLOW. .   NUMBER    001AH    159# 160
CNTL. . .   NUMBER    000AH    119# 120
CNTLMSK .   NUMBER    0004H    254#
CODE. . .   SEGMENT            SIZE=016FH BYTE  PUBLIC   280# 282 556
CPMSK . .   NUMBER    07FFH    247#
DCASLN. .   NUMBER    0035H    153#
DDYN. . .   NUMBER    0001H    152# 154
DECPMK. .   NUMBER    0007H    257#
DCP1D1. .   NUMBER    0004H    112# 113
DCP1D2. .   NUMBER    0005H    113# 114
DLEN. . .   NUMBER    0005H    179#
DLYFLG. .   NUMBER    0040H    240#
DMSK. . .   NUMBER    0002H    264#
DPD1. . .   NUMBER    0018H    173# 174 179
DPD2. . .   NUMBER    0019H    174# 175
DPD3. . .   NUMBER    001AH    175# 176
DSTAT . .   NUMBER    0004H    150# 154
E . . . .   NUMBER    0018H    184# 185
```

```
EKSLEN. . NUMBER  0028H  169#
ENSMSK. . NUMBER  0008H  263#
ENAMSK. . NUMBER  0020H  266#
EU. . . . NUMBER  0003H  111# 112
FRCNT . . NUMBER  0009H  117# 118 140
FRCTR . . NUMBER  000BH  124# 125
FRMSK . . NUMBER  003FH  239#
GRP1. . . NUMBER  001EH  165# 166
GRP10 . . NUMBER  001EH  164# 165
HIMEM . . L FAR   0030H  EXTRN  28# 306
HXSUSPEND L FAR   003CH  EXTRN  29# 308
HYSTER. . NUMBER  001AH  208# 209
L6LMSK. . NUMBER  0004H  259#
LCKPT . . NUMBER  0007H  115# 116
LKCRNK. . NUMBER  003FH  260#
LKDLCT. . NUMBER  0016H  204# 205
LODCMSK . NUMBER  003FH  274#
MAXOFF. . NUMBER  0015H  146# 147
MCMSK . . NUMBER  0001H  246#
MEM16 . . NUMBER  0010H  44# 304
MINIMSK . NUMBER  00FFH  255#
MINITM. . NUMBER  0013H  144# 145 152 152
MINCTR. . NUMBER  0012H  136# 138 144 201
MINOFF. . NUMBER  0016H  147# 148
MINON . . NUMBER  0017H  140# 158 158 173 183
MOD1. . . NUMBER  001DH  162# 163
MOD10 . . NUMBER  001CH  161# 162
MOV . . . NUMBER  001SH  186# 187
MODEMSK . NUMBER  0002H  267#
MODNUM. . NUMBER  0019H  187# 188
NRA . . . NUMBER  0002H  94#
NRB . . . NUMBER  0001H  95#
OUTID1. . NUMBER  0006H  114# 115 359 401 408 502 529
OV. . . . NUMBER  000CH  125# 126
OVMSK . . NUMBER  0008H  258#
P1. . . . NUMBER  0012H  38# 39 336 440
P2. . . . NUMBER  0010H  39# 40 360 398 462 324
P3. . . . NUMBER  000EH  40# 41 311 476
P4. . . . NUMBER  000CH  41# 42 371 407 467 334
P5. . . . NUMBER  000AH  42# 43 310
P6. . . . NUMBER  0008H  43# 44 329 373 409 432 469 536
P7. . . . NUMBER  0006H  44# 45 413 473
P8. . . . NUMBER  0004H  45# 375 411 471 538
PHAC. . . NUMBER  0008H  97#
PHED. . . NUMBER  0001H  108# 109 140
PHGRD . . NUMBER  0004H  98#
PHGRP . . NUMBER  0002H  87# 88
PHMXPT. . NUMBER  0005H  90# 91
PHNR. . . NUMBER  0004H  89# 90
PHPNTADD. NUMBER  0006H  91#
PHSCAN. . NUMBER  0003H  88# 89
PHTYCHN . NUMBER  0001H  86# 87
PHTYP . . NUMBER  00F0H  96#
PHUCNT. . NUMBER  0000H  85# 86
PNT1. . . NUMBER  001FH  167#
PNT10 . . NUMBER  001FH  166# 167 169
R . . . . NUMBER  000DH  128# 129
RD. . . . NUMBER  0009H  106# 107
RDMSK . . NUMBER  0080H  233#
REPRNG. . NUMBER  0016H  206# 207
RESPRY. . NUMBER  000DH  131# 132
RMSK. . . NUMBER  0008H  251#
RP. . . . NUMBER  000DH  129# 130
RPMSK . . NUMBER  0040H  252#
RPTPRI. . NUMBER  0008H  116# 117
RPTPYMK . NUMBER  001FH  256#
RSPRMK. . NUMBER  001FH  243#
RTC . . . NUMBER  001CH  190# 191 193
RTC2. . . NUMBER  001DH  191# 193
RTI . . . NUMBER  001AH  188# 189 190
RTI2. . . NUMBER  001BH  189# 195
RTLBYM. . NUMBER  0020H  193# 197
RTLEN . . NUMBER  0004H  197#
```

| | | | |
|---|---|---|---|
| RTMSK . . | NUMBER | 0010H | 262# |
| RTSLEN. . | NUMBER | 0004H | 195# 197 |
| SCNMSK. . | NUMBER | 0001H | 261# |
| SEGMSK. . | NUMBER | 00FEH | 235# |
| SECTYP. . | NUMBER | 0002H | 110# 111 |
| SEN+COM . | L NEAR | 0020H | CODE PUBLIC 24 296# 555 |
| SEN+DIK . | L NEAR | 0006H | CODE 316 436# |
| SEN+EIA . | L NEAR | 002CH | CODE 313 315 329# |
| SE...   . | L NEAR | 0...H | CODE 298# |
| SEN62 . . | L NEAR | 0007H | CODE 304# 309 |
| SEN85 . . | L NEAR | 0019H | CODE 307 310# |
| SEN30 . . | L NEAR | 0042H | CODE 356# |
| SEN40 . . | L NEAR | 0004H | CODE 338 396# |
| SEN50 . . | L NEAR | 00E1H | CODE 461# |
| SEN57 . . | L NEAR | 0114H | CODE 403# |
| SEN58 . . | L NEAR | 0121H | CODE 478 502# |
| SEN60 . . | L NEAR | 012EH | CODE 442 523# |
| SEN90 . . | L NEAR | 0162H | CODE 378 415 492 506 545# |
| STATUS. . | NUMBER | 000AH | 121# 122 |
| STSMSK. . | NUMBER | 0003H | 238# |
| TARVAL. . | NUMBER | 0014H | 202# 203 |
| TC. . . . | NUMBER | 000DH | 123# 124 |
| TCIDMSK . | NUMBER | 00F8H | 244# |
| THA . . . | NUMBER | 002CH | 229# |
| THD . . . | NUMBER | 001CH | 177# 179 |
| TMPRES. . | NUMBER | 000CH | 127# 128 |
| TPCDPR. . | NUMBER | 020EH | 133# 134 |
| TPCID . . | NUMBER | 000EH | 132# 133 |
| TPPKMK. . | NUMBER | 07FFH | 245# |
| TPRSMK. . | NUMBER | 001FH | 242# |
| TRVLMK. . | NUMBER | 0FFFH | 272# |
| TW1 . . . | NUMBER | 0020H | 47# 48 438 |
| TW2 . . . | NUMBER | 0002H | 43# 439 466 491 505 533 |
| TYPMSK. . | NUMBER | 000FH | 236# |
| UCMSK . . | NUMBER | 007FH | 234# |
| UCNTMSK . | NUMBER | 00C0H | 273# |
| UNACNT. . | NUMBER | 0016H | 203# 204 219 |
| UNAEAS. . | NUMBER | 0019H | 207# 208 |
| USERCT. . | NUMBER | 0060H | 107# 108 |
| WL. . . . | NUMBER | 020DH | 130# 131 |
| WLMSK . . | NUMBER | 0020H | 249# |

ASSEMBLY COMPLETE, NO ERRORS FOUND

ISIS-II MCS-86 MACRO ASSEMBLER V2.0 ASSEMBLY OF MODULE PRICHK
OBJECT MODULE PLACED IN :F1:PRICHK.OBJ
ASSEMBLER INVOKED BY: ASM86 :F1:PRICHK.SRC OBJECT(:F1:PRICHK.OBJ) XREF EP(:F1:PRICHK.EPL) PW(132) DA(02/25/81) PR(:F1:PRICHK.

LOC  OBJ            LINE    SOURCE

```
                      1     $TITLE ('PRIOR+CHK')
                      2     ;      REV 0   DS6-DC-000-0000
                      3
                      4     ;      1.    REVISION HISTORY:
                      5
                      6     ;             REV 0   02/18/80      L. LYON
                      7
                      8     ;      2.    FUNCTION:
                      9
                     10     ;             THIS MODULE WILL COMPARE THE PRIORITY PASSED AS AN
                     11     ;             INPUT PARAMETER TO THE RESIDUAL PRIORITY IN THE
                     12     ;             POINT FILE WHOSE ADDRESS IS PASSED AS AN INPUT
                     13     ;             PARAMETER. IF THE COMMAND PRIORITY IS INSUFFICIENT
                     14     ;             TO COMMAND THE POINT, AN ERROR INDICATION OF 4 WILL
                     15     ;             BE RETURNED TO THE CALLING MODULE. IF THE PRIORITY
                     16     ;             IS GREATER OR EQUAL TO THE RESIDUAL PRIORITY, THE
                     17     ;             ERROR INDICATOR WILL BE RETURNED BEING EQUAL TO
                     18     ;             ZERO.
                     19
                     20     ;      3.    CALL AND RETURN SETUP:
                     21
                     22     ;             CALL:   STACK - PRIORITY; ADP
```

```
                          23  ;            RETURN: AX - ERROR
                          24
                          25  ;       4.   ENTRY POINT:
                          26
                          27              PUBLIC PRIOR+CHK
                          28
                          29  ;       5.   CALLED ROUTINES:
                          30
                          31  ;       6.   EXTERNAL VARIABLES DEFINED:
                          32
                          33  ;       7.   EXTERNAL VARIABLES USED:
                          34
                          35  ;       8.   EQUATED SYMBOLS:
                          36
0006                      37              PARM1    EQU    6       ;PARAMETER STACK OFFSETS
0004                      38              PARM2    EQU    4
0004                      39              ERR4     EQU    4       ;ERROR = 4
0000                      40              ERR0     EQU    0       ;ERROR = 0
                          41
                          42  ;       9.   INTERNAL SYMBOLS:
                          43
                          44  ;      10.   REGISTERS USED:
                          45
                          46  ;            ALL RESTORED UPON EXIT EXCEPT DX.
                          47 +1 $EJECT
                          48
                          49
                          50
                          51
                          52
                          53 +1 $SAVE
                          54 +1 $NOLIST
                         252
                         253 +1 $EJECT
                         254
                         255    ASSUME CS:CODE
                         256
----                     257    CODE SEGMENT BYTE PUBLIC
                         258
                         259  ;
                         260  ;*IF
                         261  ;*   (PNT+REC(ADP).FR+TIMER = 0 AND PRIORITY <= PNT+REC(ADP).RES+PRIORITY)
                         262  ;*   OR (PNT+REC(ADP).FR+TIMER += 0 AND PRIORITY <= PNT+REC(ADP).TMP+RES+
                         263  ;*   PRIORITY) --> ERR := 0
                         264  ;
                         265  ;*   !(PNT+REC(ADP).FR+TIMER = 0 AND PRIORITY > PNT+REC(ADP).RES+PRIORITY OR
                         266  ;*   (PNT+REC(ADP).FR+TIMER += 0 AND PRIORITY > PNT+REC(ADP).TMP+RES+
                         267  ;*   PRIORITY) --> ERR := 4
                         268  ;*FI
                         269
0000                     270    PRIOR+CHK    PROC           NEAR
                         271
0000 55                  272    PCHK1:       PUSH BP                ;SAVE REGISTERS USED
0001 8BEC                273                 MOV BP,SP
0003 53                  274                 PUSH BX
0004 51                  275                 PUSH CX
0005 8B5E04              276                 MOV BX,[BP+PARM2]      ;ADDRESS PHYSICAL FILE
0008 8B4E06              277                 MOV CX,[BP+PARM1]      ;PRIORITY
000B 8A470B              278                 MOV AL,[BX+FRCTR]      ;FAIL TO RESPOND COUNTER
000E 243F                279                 AND AL,FRMSK           ;MASK OFF COUNTER
0010 0AC0                280                 OR AL,AL               ;JUMP IF NOT ZERO
0012 750C                281                 JNZ PCHK10
0014 8A470D              282                 MOV AL,[BX+RESPRY]     ;F-T-R COUNTER = 0
0017 241F                283                 AND AL,RSPRMK          ;MASK RESIDUAL PRIORITY
0019 3AC8                284                 CMP CL,AL              ;COMPARE WITH PRIORITY
001B 7F0C                285                 JG PERR04              ;PRIORITY > RES PRIOR = ERR 4
001D EB1000              286                 JMP PERR0              ;PRIORITY <= RES PRIOR = ERR 0
0020 8A470C              287    PCHK10:      MOV AL,[BX+TMPRES]     ;F-T-R COUNT += 0
0023 241F                288                 AND AL,TPRSMK          ;MASK TEMP RESIDUAL PRIORITY
0025 3AC8                289                 CMP CL,AL              ;COMPARE WITH PRIORITY
0027 7E06                290                 JLE PERR0              ;PRIORITY <= RES PRIOR = ERR 0
0029 B80400              291    PERR04:      MOV AX,ERR4            ;PRIORITY > RES PRIOR = ERR 4
002C EB0490              292                 JMP PCHKOUT
```

```
002F B80000      293    PERR0:      MOV AX,ERR0
0032 59          294    PCHKOUT:    POP CX        ;RESTORE REGISTERS
0033 5B          295                POP BX
0034 5D          296                POP BP
0035 C20400      297                RET 4
                 298
                 299    PRIOR+CHK   ENDP
----             300    CODE        ENDS
                 301                END
```

XREF SYMBOL TABLE LISTING
---- ------ ----- -------

| NAME | TYPE | VALUE | ATTRIBUTES, XREFS |
|------|------|-------|-------------------|
| ??SEG . . | SEGMENT | | SIZE=0000H PARA PUBLIC |
| ABASLN. . | NUMBER | 0015H | 196# |
| ABIT. . . | NUMBER | 000BH | 97# 98 |
| ABITMSK . | NUMBER | 0080H | 225# |
| ABMSK . . | NUMBER | 0002H | 74# |
| ACTL. . . | NUMBER | 000AH | 95# 96 |
| ACTLMSK . | NUMBER | 0008H | 228# |
| ADPMSK. . | NUMBER | 0007H | 250# |
| ADYN. . . | NUMBER | 0004H | 194# 196 |
| AKA . . . | NUMBER | 002BH | 203# 204 |
| AMD . . . | NUMBER | 001BH | 151# 152 |
| ANDECP. . | NUMBER | 0017H | 180# 181 192 |
| ANHIL . . | NUMBER | 001BH | 184# 185 |
| ANLCKOUT. | NUMBER | 0027H | 198# 192 200 |
| ANLOL . . | NUMBER | 001DH | 185# 186 |
| ANOFST1 . | NUMBER | 0021H | 187# 188 |
| ANOFST2 . | NUMBER | 0025H | 189# 190 |
| ANPD1 . . | NUMBER | 0028H | 200# 201 |
| ANPD2 . . | NUMBER | 0029H | 201# 202 |
| ANPD3 . . | NUMBER | 002AH | 202# 203 |
| ANSCFC1 . | NUMBER | 001FH | 186# 187 |
| ANSCFC2 . | NUMBER | 0023H | 188# 189 |
| ANVAL . . | NUMBER | 0013H | 176# 177 194 |
| ASTAT . . | NUMBER | 0011H | 192# 196 |
| ATTMSK. . | NUMBER | F0F8H | 212# |
| ATTRIB. . | NUMBER | 0005H | 93# 94 113 |
| AVALMSK . | NUMBER | FFF0H | 246# |
| BITRLDS . | NUMBER | 0001H | 84# 85 |
| BUSNO . . | NUMBER | 0018H | 158# 159 170 |
| BUSNUM. . | NUMBER | 001CH | 135# 136 |
| C . . . . | NUMBER | 0018H | 160# 161 |
| CBASLN. . | NUMBER | 0013H | 115# |
| CDY . . . | NUMBER | 0009H | 113# 115 |
| CHNL. . . | NUMBER | 001DH | 138# 139 |
| CIMSK . . | NUMBER | 00F8H | 221# |
| CLRMSK. . | NUMBER | 0008H | 240# |
| CMDDLY. . | NUMBER | 0014H | 120# 121 125 |
| CMDID . . | NUMBER | 0010H | 109# 110 |
| CMDFAM. . | NUMBER | 0010H | 110# 111 |
| CMDMSK. . | NUMBER | 0060H | 216# |
| CMDSTS. . | NUMBER | 000CH | 101# 102 |
| CMFHI . . | NUMBER | 0013H | 133# 134 144 |
| CMFLOW. . | NUMBER | 001AH | 134# 135 |
| CNTL. . . | NUMBER | 000AH | 94# 95 |
| CNTLMSK . | NUMBER | 0004H | 229# |
| CODE. . . | SEGMENT | | SIZE=0035H BYTE PUBLIC 255# 257 300 |
| CPMSK . . | NUMBER | 07FFH | 222# |
| DBASLN. . | NUMBER | 0005H | 128# |
| DDYN. . . | NUMBER | 0029H | 127# 129 |
| DECPMK. . | NUMBER | 0007H | 232# |
| DGPID1. . | NUMBER | 0004H | 87# 88 |
| DGPID2. . | NUMBER | 0005H | 88# 89 |
| DLEN. . . | NUMBER | 0005H | 154# |
| DLYFLG. . | NUMBER | 0040H | 215# |
| DMSK. . . | NUMBER | 0002H | 239# |
| DPD1. . . | NUMBER | 0018H | 148# 149 154 |
| DPD2. . . | NUMBER | 0019H | 149# 150 |

| | | | |
|---|---|---|---|
| DPD3... | NUMBER | 001AH | 158# 151 |
| DSTAT.. | NUMBER | 0004H | 125# 129 |
| E..... | NUMBER | 0018H | 159# 160 |
| EMSLEN. | NUMBER | 0063H | 144# |
| EMSHSK. | NUMBER | 0098H | 239# |
| ENQMSK. | NUMBER | 0020H | 241# |
| ERR0... | NUMBER | 000DH | 40# 293 |
| ERR4... | NUMBER | 0004H | 39# 291 |
| EU..... | NUMBER | 0003H | 86# 87 |
| FRCNT.. | NUMBER | 0009H | 92# 93 115 |
| FRCTR.. | NUMBER | 003DH | 99# 100 278 |
| FRMSK.. | NUMBER | 003FH | 214# 279 |
| GRP1... | NUMBER | 001EH | 140# 141 |
| GRP10.. | NUMBER | 001EH | 139# 140 |
| HYSTER. | NUMBER | 001AH | 183# 184 |
| L&LMSK. | NUMBER | 0004H | 234# |
| LCKPT.. | NUMBER | 0007H | 90# 91 |
| LKCRMK. | NUMBER | 003FH | 235# |
| LKDLCT. | NUMBER | 0016H | 179# 180 |
| LODCMSK | NUMBER | 003FH | 249# |
| MAXOFF. | NUMBER | 0015H | 121# 122 |
| MCMSK.. | NUMBER | 0001H | 223# |
| MINMSK. | NUMBER | 00FFH | 238# |
| MIMXTM. | NUMBER | 0013H | 119# 120 127 127 |
| MINCTR. | NUMBER | 0012H | 111# 113 119 176 |
| MINOFF. | NUMBER | 0016H | 122# 123 |
| MINON.. | NUMBER | 0017H | 123# 125 133 148 158 |
| MOD1... | NUMBER | 001DH | 137# 138 |
| MOD10.. | NUMBER | 001CH | 136# 137 |
| MODE... | NUMBER | 0018H | 161# 162 |
| MODEMSK | NUMBER | 0002H | 242# |
| MODNUM. | NUMBER | 0019H | 162# 163 |
| NRA.... | NUMBER | 0002H | 69# |
| NRB.... | NUMBER | 0001H | 70# |
| OUT1D1. | NUMBER | 0006H | 89# 90 |
| OV..... | NUMBER | 000CH | 100# 101 |
| OVMSK.. | NUMBER | 0080H | 233# |
| PARM1.. | NUMBER | 0006H | 37# 277 |
| PARM2.. | NUMBER | 0004H | 38# 276 |
| PCHK1.. | L NEAR | 0000H | CODE 272# |
| PCHK10. | L NEAR | 0020H | CODE 281 287# |
| PCHKOUT | L NEAR | 0032H | CODE 292 294# |
| PERR0.. | L NEAR | 002FH | CODE 286 290 293# |
| PERR04. | L NEAR | 0029H | CODE 285 291# |
| PHAC... | NUMBER | 0008H | 72# |
| PHEO... | NUMBER | 0070H | 82# 84 115 |
| PHGRD.. | NUMBER | 0004H | 73# |
| PHGRP.. | NUMBER | 0002H | 62# 63 |
| PHMXPT. | NUMBER | 0005H | 65# 66 |
| PHNR... | NUMBER | 0004H | 64# 65 |
| PHPNTADD. | NUMBER | 0006H | 66# |
| PHSCAN. | NUMBER | 0003H | 63# 64 |
| PHTYCHN | NUMBER | 0001H | 61# 62 |
| PHTYP.. | NUMBER | 00F0H | 71# |
| PHUCNT. | NUMBER | 00C0H | 60# 61 |
| PNT1... | NUMBER | 001FH | 142# |
| PNT10.. | NUMBER | 001FH | 141# 142 144 |
| PRIOR+CHK | L NEAR | 0000H | CODE PUBLIC 27 270# 299 |
| R...... | NUMBER | 000DH | 103# 104 |
| R0..... | NUMBER | 00C0H | 81# 82 |
| RDMSK.. | NUMBER | 0080H | 208# |
| REPRNG. | NUMBER | 0018H | 181# 182 |
| RESPRY. | NUMBER | 002DH | 186# 187 282 |
| RMSK... | NUMBER | 0080H | 226# |
| RP..... | NUMBER | 000DH | 104# 105 |
| RPMSK.. | NUMBER | 0040H | 227# |
| RPTFR1. | NUMBER | 0008H | 91# 92 |
| RPTFYHK | NUMBER | 001FH | 231# |
| RSPRMK. | NUMBER | 001FH | 218# 283 |
| RTC.... | NUMBER | 001CH | 165# 166 168 |
| RTC2... | NUMBER | 001DH | 166# 168 |
| RTI.... | NUMBER | 001AH | 163# 164 165 |
| RTI2... | NUMBER | 001BH | 164# 170 |

```
RTLDYM . . NUMBER   0006H   168# 172
RTLEN  . . NUMBER   0004H   172#
RTMSK  . . NUMBER   0010H   237#
RTSLEN . . NUMBER   0004H   170# 172
SCMSK  . . NUMBER   0001H   236#
SECMSK . . NUMBER   00F0H   210#
SECTYP . . NUMBER   0002H   85# 86
STATUS . . NUMBER   000AH   96# 97
STSMSK . . NUMBER   0003H   213#
TARVAL . . NUMBER   0014H   177# 178
TC . . . . NUMBER   0005H   98# 99
TCIDMSK. . NUMBER   00F8H   219#
TMA    . . NUMBER   002CH   204#
TMD    . . NUMBER   001CH   152# 154
TMPRES . . NUMBER   000CH   102# 103 287
TPCOFR . . NUMBER   000EH   108# 109
TPCID  . . NUMBER   000EH   107# 108
TPFMMK . . NUMBER   07FFH   220#
TPRSMK . . NUMBER   001FH   217# 288
TRVLMK . . NUMBER   0FFFH   247#
TYPMSK . . NUMBER   000FH   211#
UCMSK  . . NUMBER   007FH   209#
UCNTMSK. . NUMBER   00C0H   243#
UNRCNT . . NUMBER   0016H   178# 179 194
UNREAS . . NUMBER   0019H   182# 183
USERCT . . NUMBER   0000H   82# 83
W . . . . . NUMBER  0000H   105# 106
WLMSK  . . NUMBER   0020H   224#
```

ASSEMBLY COMPLETE, NO ERRORS FOUND

ISIS-II MCS-86 MACRO ASSEMBLER V2.0 ASSEMBLY OF MODULE PHYCOM
OBJECT MODULE PLACED IN :F1:PHYCOM.OBJ
ASSEMBLER INVOKED BY: ASM86 :F1:PHYCOM.SRC OBJECT(:F1:PHYCOM.OBJ) XREF EP(:F1:PHYCOM.EPL) PW(132) DA(02/25/81) PR(:F1:PHYCOM

```
LOC OBJ              LINE   SOURCE

1      $TITLE(PHYCOM REV.0 07/30/80 PHYCOM D56-DC-000-000)
                     2
                     3      ;1.   REVISION HISTORY:
                     4
                     5      ;       REV. 0  07/30/80      R. FISHER
                     6      ;       REV. 2  01/21/81      JHB. AND RTB.
                     7      ;       REV  3  02/11/81  JHB
                     8
                     9
                     10     ;2.   FUNCTION:
                     11
                     12     ;     THIS MODULE FUNCTIONS AS THE TOP LEVEL MODULE FOR THE POINT COMMAND
                     13     ;     TASK. TYPE AND COMMAND VALIDITY CHECKS ARE PREFORMED PRIOR TO
                     14     ;     SELECTING THE PROPER SERVICE ROUTINE.  WHEN THE SERVICE ROUTINE
                     15     ;     HAS RETURNED TO THIS UPPER MODULE, THE RESULTS OF THE COMMAND ARE
                     16     ;     RETURNED TO THE TASK WHO ORIGINATED THE COMMAND.
                     17
                     18
                     19     ;3.   CALL AND RETURN SETUP:
                     20
                     21     ;     CALL SETUP:
                     22
                     23     ;     THIS IS A QUEUE DRIVEN TASK. A COMMUNICATION BLOCK IS DEQUEUED WHICH
                     24     ;     CONTAINS 3 ITEMS. THE TASK IDENTIFICATION NUMBER OF THE ORIGINATING
                     25     ;     TASK, THE ADDRESS OF THE COMMAND DATA BLOCK AND A BYTE WHICH STATES
                     26     ;     WHETHER THE COMMAND IS A PHYSICAL OR A LOGICAL COMMAND.
                     27
                     28     ;     RETURN SETUP:
                     29
                     30     ;     THIS MODULE DOES NOT RETURN INFORMATION IN THE CONVENTIONAL MANNER.
                     31     ;     DATA IS INSERTED INTO THE COMMAND DATA BLOCK. THIS DATA SHOWS THE
                     32     ;     RESULT OF THE COMMAND AND WHETHER OR NOT THE ORIGINATING TASK SHOULD
                     33     ;     REFRAIN FROM SENDING NEW COMMANDS FOR A WHILE. THE ORIGINATING TASK
                     34     ;     IS AWAKENED BY THE ACT OF RELEASING THE COMMUNICATION DATA BLOCK TO
```

```
35  ;    THE SYSTEM MEMORY POOL.
36
37
38  ;4.  ENTRY POINT:
39
40       PUBLIC  PHYCOM
41
42
43  ;5.  CALLED ROUTINES:
44
45       EXTRN   HXTERMINATE:FAR      ;TASK TERMINATION
46       EXTRN   HXSUSPEND:FAR        ;TASK SUSPENSION
47       EXTRN   HXTIMESEC:FAR        ;TASK TIME WAIT
48       EXTRN   HXDQ:FAR             ;DEQUEUE FUNCTION
49       EXTRN   HXRSL:FAR            ;MEMORY RELEASE AND TASK WAKE UP
50       EXTRN   CLOSE:FAR            ;FILE CLOSING FUNCTION
51       EXTRN   NXTGRP:FAR           ;FETCH GROUP FILE FUNCTION
52       EXTRN   ACKNOW:NEAR          ;ACKNOWLEDGE ALARM FUNCTION
53       EXTRN   DIGITAL:NEAR         ;DIGITAL COMMAND FUNCTION
54       EXTRN   ANALOG:NEAR          ;ANALOG COMMAND FUNCTION
55       EXTRN   CMDNOP:NEAR          ;NOP COMMAND FUNCTION
56
57
58  ;6.  EXTERNAL VARIABLES DEFINED:
59
60
61       DYNAMIC+BYTE    SEGMENT BYTE PUBLIC
62
63       PUBLIC  PCCTYP               ;STORAGE FOR COMMAND TYPE
64       PUBLIC  PCCHNL               ;STORAGE FOR CHANNEL NUMBER
65       PUBLIC  PCGRP                ;STORAGE FOR GROUP NUMBER
66       PUBLIC  PCPNT                ;STORAGE FOR POINT NUMBER
67       PUBLIC  PCERR                ;STORAGE FOR ERROR NUMBER
68       PUBLIC  PCNOMOR              ;STORAGE FOR NOMORE FLAG
69       PUBLIC  PCCMND               ;STORAGE FOR COMMAND
70       PUBLIC  NOPFLG               ;STORAGE FOR NOP FLAG
71
72       PCCTYP   DB     0
73       PCCHNL   DB     0
74       PCGRP    DB     0
75       PCPNT    DB     0
76       PCERR    DB     0
77       PCNOMOR  DB     0
78       PCCMND   DB     0
79       NOPFLG   DB     0
80
81       DYNAMIC+BYTE    ENDS
82
83
84       DATA+POINTER    SEGMENT WORD PUBLIC
85
86       PUBLIC  PCAD                 ;STORAGE FOR DATA BLOCK ADDRESS
87       PUBLIC  PCADG                ;STORAGE FOR GROUP ADDRESS
88       PUBLIC  PCADP                ;STORAGE FOR POINT ADDRESS
89
90       PCAD    DW      0
91       PCADG   DW      0
92       PCADP   DW      0
93
94       DATA+POINTER    ENDS
95
96
97  ;7.  EXTERNAL VARIABLES USED
98
99       DYNAMIC+BYTE    SEGMENT BYTE PUBLIC
100
101      EXTRN   RCAPFG:BYTE          ;RECAP FLAG
102
103      DYNAMIC+BYTE    ENDS
```

```
104
105           DATA+FILE     SEGMENT WORD PUBLIC
106
107           EXTRN   SCHDIR:WORD    ;ADDRESS OF SCAN DIRECTORY
108
109           DATA+FILE     ENDS
110
111
112     ;8.   EQUATED SYMBOLS:
113
0001    114           SEC1      EQU     1         ;1 SECOND
0001    115           WRD2      EQU     1         ;OFFSET FOR 2ND PARAMETER IN COM BLOCK
0003    116           WRD3      EQU     3         ;OFFSET FOR 3RD PARAMETER IN COM BLOCK
0000    117           BUFLCS    EQU     0         ;OFFSET IN SCAN BUFFER FOR CONTROL BITS
000F    118           CMNDMSK   EQU     0FH       ;MASK FOR PHYSICAL COMMAND TYPE
00C1    119           SEARCH    EQU     0C1H      ;SEARCH MASK FORNEXT GROUP
0007    120           ERR7      EQU     7         ;ERROR SEVEN MESSAGE
0001    121           SMASK     EQU     1         ;MASK FOR ASSIGN TO SCAN BIT IN POINT FILE
0002    122           NRAMSK    EQU     2         ;MASK FOR LOOP A NO RESPONSE
0002    123           LINTYPMSK EQU     2         ;MASK FOR CHANNEL LINE CLASS
0001    124           NRBMSK    EQU     1         ;MASK FOR LOOP B NO RESPONSE
000A    125           ERR10     EQU     10        ;ERROR TEN MESSAGE
00F0    126           ERMASK    EQU     0F0H      ;MASK FOR ERROR NUMBER IN DATA BLOCK
00E0    127           NMMASK    EQU     0E0H      ;MASK FOR NO MORE FLAG IN DATA BLOCK
000F    128           NIBLO     EQU     0FH       ;MASK FOR LOW NIBBLE
00F0    129           NIBHI     EQU     0F0H      ;MASK FOR HIGH NIBBLE
0008    130           ERR8      EQU     8         ;ERROR EIGHT MESSAGE
0001    131           ONE       EQU     1
0002    132           TWO       EQU     2
0003    133           THREE     EQU     3
0004    134           FOUR      EQU     4
0005    135           FIVE      EQU     5
0006    136           SIX       EQU     6
0007    137           SEVEN     EQU     7
000A    138           TENH      EQU     10
0080    139           EIGHTY    EQU     80H
140
141     ;     INCLUDED FILES:   SYSEQU.SRC
142     ;                       PCOMEQ.SRC
143     ;                       DMISEQ.SRC
144     ;                       PHYEQU.SRC
145
146
147     ;9.   INTERNAL SYMBOLS:
148
149     ;     NONE
150
151
152     ;10.  REGISTERS USED:
153
154     ;     AX,BX,CX,DX,SI,DI,BP
155
156
157 +1  $EJECT
158
159
160
161
162 +1  $SAVE
163 +1  $NOLIST
476 +1  $EJECT
477
478     DATA    GROUP  DYNAMIC+BYTE,DYNAMIC+WORD,DATA+POINTER,DATA+FILE
479
480     ASSUME  CS:CODE,DS:DATA
481
482
483
484     CODE    SEGMENT BYTE PUBLIC
485
486
0000    487     PHYCOM  PROC    FAR
488
489             ;#D0
```

```
                            490    ;* RECAP = 1 -->
                            491    ;* HXWAIT(IN:1 ; OUT: );
                            492    ;*OD
                            493
0000 803E000000    E        494    PH1:    CMP     RCAPFG,0
0005 7408                   495            JE      PH5             ;JUMP IF RECAP NOT WAITING
0007 B80100                 496            MOV     AX,SEC1         ;OTHERWISE WAIT FOR ONE SECOND
000A 50                     497            PUSH    AX
000B 9A0000----  E          498            CALL    HXTIMESEC
0010 EBEE                   499            JMP     PH1             ;AFTER ONE SECOND TRY AGAIN
                            500
                            501    ;*ADZ := 0FFFFH;
                            502    ;*ERR := 0;
                            503    ;*NO+MORE := 0;
                            504    ;*DO
                            505    ;* ADZ () 0 AND NOT NO+MORE -->
                            506    ;* HXDQ(IN:Q+PHY+COM ;OUT:ADZ );
                            507    ;* IF
                            508    ;*    ADZ = 0 --) SKIP;
                            509
0012 32C0                   510    PH5:    XOR     AL,AL
0014 A2040W        R        511            MOV     PCERR,AL        ;CLEAR ERROR NUMBER
0017 A20500        R        512            MOV     PCNOMOR,AL      ;CLEAR NOMORE FLAG
001A B80800                 513            MOV     AX,Q+PHY+COM    ;PHYCOM QUEUE NUMBER
001D 50                     514            PUSH    AX              ; TO STACK
001E 9A0000----   E         515            CALL    HXDQ            ;GET COMMUNICATION BLOCK ADDRESS
0023 0BDB                   516            OR      BX,BX           ; IF ANY
0025 7503                   517            JNZ     PH7             ;JUMP IF ONE FOUND
0027 E97501                 518            JMP     PH800           ; OTHERWISE GO TO EXIT ROUTINE
                            519
                            520    ;* ;ADZ () 0 -->
                            521    ;*    AD := A(ADZ).W2;
                            522    ;*    CTYP := A(ADZ).W3;
                            523    ;*    HXRSL (IN:ADZ ;OUT: );
                            524    ;*    IF
                            525    ;*    CTYP = 1-->
                            526    ;*       CHNL := MES(AD).CHNL;
                            527    ;*       GRP := MES(AD).C10S * 10 + MES(AD).C1S;
                            528    ;*       PNT := MES(AD).P10S * 10 + MES(AD).P1S;
                            529    ;*       CMND := MES(AD).CMND;
                            530
002A 8B7F02                 531    PH7:    MOV     DI,[BX+WRD2]    ;GET ADDRESS OF DATA BLOCK
002D 893E0000       R       532            MOV     PCAD,DI         ;SAVE FOR LATER
0031 8A5703                 533            MOV     DL,[BX+WRD3]    ;GET COMMAND TYPE - 1=PHYSICAL,0=LOGICAL
0034 83160000       R       534            MOV     PCCTYP,DL       ;SAVE FOR LATER
0038 1E                     535            PUSH    DS
0039 53                     536            PUSH    BX              ;COMMUNICATION BLOCK ADDRESS TO STACK
003A 9A0000----   E         537            CALL    HXRSL           ;RELEASE THE MEMORY AND WAKE UP CALLING TASK
003F 0AD2                   538            OR      DL,DL           ;CHECK COMMAND TYPE
0041 7422                   539            JZ      PH10            ;JUMP IF LOGICAL
                            540                                    ;IF PHYSICAL
0043 8A05                   541            MOV     AL,[DI+PC+CHNL] ;GET CHANNEL NUMBER FROM DATA BLOCK
0045 A201W          R       542            MOV     PCCHNL,AL       ;SAVE CHANNEL NUMBER
0048 8A4501                 543            MOV     AL,[DI+PC+GRP]  ;GET GROUP NUMBER IN BCD
004B E87701                 544            CALL    CONVER          ;CONVERT TO BINARY
004E A20290        R        545            MOV     PCGRP,AL        ;SAVE GROUP NUMBER
0051 8A4502                 546            MOV     AL,[DI+PC+PNT]  ;GET POINT NUMBER IN BCD
0054 E86E01                 547            CALL    CONVER          ;CONVERT TO BINARY
0057 A20300        R        548            MOV     PCPNT,AL        ;SAVE POINT NUMBER
005A 8A4503                 549            MOV     AL,[DI+PC+COMTYP] ;GET COMMAND
005D 240F                   550            AND     AL,CMNDMSK      ;ISOLATE COMMAND
005F A20600        R        551            MOV     PCCMND,AL       ;SAVE COMMAND
0062 EB1990                 552            JMP     PH15
                            553
                            554    ;*  ;CTYP () 1 -->
                            555    ;*     CHNL := MES(AD).WORD1;
                            556    ;*     GRP := MES(AD).WORD2;
                            557    ;*     PNT := MES(AD).WORD3;
                            558    ;*     CMND := MES(AD).CMND;
                            559    ;*  FI
                            560
                            561    ;THIS SEQUENCE IS EXECUTED FOR A LOGICAL COMMAND - CTYP=0
                            562
```

```
0065 8A4501           563  PH10:  MOV    AL,[DI+WORD1]    ;GET CHANNEL NUMBER
0068 A20100     R     564         MOV    PCCHNL,AL        ;SAVE FOR LATER
006B 8A4502           565         MOV    AL,[DI+WORD2]    ;GET GROUP NUMBER
006E A20200     R     566         MOV    PCGRP,AL         ;SAVE FOR LATER
0071 8A4503           567         MOV    AL,[DI+WORD3]    ;GET POINT NUMBER
0074 A20300     R     568         MOV    PCPNT,AL         ;SAVE FOR LATER
0077 8A4513           569         MOV    AL,[DI+DM15CI]   ;GET COMMAND
007A A20600     R     570         MOV    PCCMND,AL        ;SAVE FOR LATER
                      571
                      572   ;*  ERR := 0;
                      573   ;*  TYP := @CIH;
                      574   ;*  NEXT+GROUP (IN:GRP,CHNL,TYP; OUT:CHNL,GRP,ADG,L);
                      575   ;*  IF
                      576   ;*     ADG = 0 -->
                      577
                      578  ;THIS IS DONE FOR BOTH LOGICAL AND PHYSICAL COMMANDS
                      579
007D A00200     R     580  PH15:  MOV    AL,PCGRP         ;GET THE GROUP NUMBER
0080 32E4             581         XOR    AH,AH            ; CLEAN HIGH BYTE
0082 50               582         PUSH   AX               ;GROUP NUMBER TO STACK
0083 A00100     R     583         MOV    AL,PCCHNL        ;CHANNEL NUMBER
0086 50               584         PUSH   AX               ; TO STACK
0087 B8C100           585         MOV    AX,SEARCH        ;SEARCH TYPE COMMAND
008A 50               586         PUSH   AX               ; TO STACK
008B 9A0000----  E    587         CALL   NXTGRP           ;GET GROUP ADDRESS
0090 58               588         POP    AX               ; REMOVE RETURNED PARAMETERS
0091 58               589         POP    AX
0092 0BDB             590         OR     BX,BX            ;CHECK FOR GROUP ADDRESS
0094 7505             591         JNZ    PH20             ;IF FOUND GROUP, SKIP ERROR
                      592
                      593  ;*  ERR := 7;
                      594
0096 B007             595  PH18:  MOV    AL,ERR7          ;SETUP ERROR MESSAGE 7
0098 E9B900           596         JMP    PH100            ;GO ERROR EXIT
                      597
                      598  ;*  (ADG <> 0 -->
                      599  ;*    NOP+FLAG := 0 ;
                      600  ;*    ADP := GRP+REC(ADG).PNT+DIR(PNT);
                      601  ;*    IF
                      602  ;*      ADP = 0 -->
                      603  ;*        CLOSE(IN:ADG; OUT: );
                      604  ;*        ERR := 7;
                      605  ;*      (ADP <> 0 -->
                      606  ;*        SKIP;
                      607  ;*      FI
                      608  ;*    FI
                      609  ;*  FI
                      610
009B C606070000  R    611  PH20:  MOV    NOPFLG,0         ;CLEAR NOP CMND INDICATOR
00A0 9A0000----  E    612         CALL   CLOSE            ;CLOSE THE OPEN GROUP FILE
00A5 891E0200   R     613         MOV    PCADG,BX         ;SAVE GROUP ADDRESS
00A9 8BF3             614         MOV    SI,BX
00AB 33DB             615         XOR    BX,BX
00AD 8A1E0300   R     616         MOV    BL,PCPNT         ;POSITION OF ENTRY IN POINT DIRECTORY =
                      617                                 ;   (2 * CHNL + OFFSET IN
                      618                                 ;    GROUP FILE TO START OF DIRECTORY +
                      619                                 ;    ADDRESS OF GROUP FILE)
00B1 D1E3             620         SHL    BX,1
00B3 8B5806           621         MOV    BX,[BX+SI+PHPNTADD]
00B6 0BDB             622         OR     BX,BX
00B8 7502             623         JNZ    PH22             ;JUMP IF POINT FILE FOUND
00BA E8DA             624         JMP    PH18             ;GO FORM ERROR 7 MESSAGE
                      625  ;*IF
                      626  ;*  NES(AD).CMD = 0
                      627  ;*  SKIP
                      628  ;*OTHERWISE
                      629
                      630  ;*  IF
                      631  ;*    ADZ = 0 OR ERR <> 0 -->
                      632  ;*      SKIP;
                      633  ;*    (ADZ.<> 0 AND ERR = 0 -->
                      634  ;*      IF
```

```
                635  ;*      GRP+REC(ADC).S = 1 OR PNT+REC(ADP).S = 1 OR (SCAN+BUF(SCAN+BUF+DIR(CHNL)).TYP = 0 AND
                636  ;*      GRP+REC(ADC).NRA AND NRB = 1) OR (SCAN+BUF(SCAN+BUF+DIR(CHNL)).TYP = 1 AND
                637  ;*      GRP+REC(ADC).NRA = 1) -->
                638  ;*   ERR := 10
                639
00DC 891E0400  R  640  PH22:  MOV    PCADP,BX           ;SAVE POINT FILE ADDRESS
00C0 A00600    R  641         MOV    AL,PCCMND
00C3 0AC0         642         OR     AL,AL              ;IS THIS ACK COMMAND
00C5 7436         643         JZ     PH31               ;YES
00C7 F6470101     644         TEST   BYTE PTR [BX+BITRLDS],SMASK    ;TEST POINT SCAN ASSIGN
00CB 7522         645         JNZ    PH25               ;IF POINT DELETED FROM SCAN EXIT ERROR 10
00CD F6440402     646         TEST   BYTE PTR [SI+PHNR],NRAMSK      ;IF LINE A OPEN SKP OTHER TESTS
00D1 7421         647         JZ     PH30               ;JUMP IF LINE OPEN
00D3 33DB         648         XOR    BX,BX              ;DEVELOP SCAN BUFFER ADDRESS
00D5 8A1E0100  R  649         MOV    BL,PCCHNL
00D9 D1E3         650         SHL    BX,1
00DB 8B9F0000  E  651         MOV    BX,SCNDIR[BX]      ;GET SCAN BUFFER ADDRESS
00DF F6470102     652         TEST   BYTE PTR [BX+BUFLCS+1],LINTYPMSK  ;CHECK CLASS OF CHANNEL
00E3 8B1E0400  R  653         MOV    BX,PCADP           ;RESTORE ADDRESS OF POINT FILE
00E7 7506         654         JNZ    PH25               ;IF CLASS B, EXIT ERROR 10
00E9 F6440401     655         TEST   BYTE PTR [SI+PHNR],NRBMSK   ;CHECK IF LINE B OPEN
00ED 7405         656         JZ     PH30               ;JUMP IF LINE B OPEN
                657
00EF B00A         658  PH25:  MOV    AL,ERR10
00F1 E86190       659         JMP    PH100              ;EXIT ERROR
                660
                661  ;*   (GRP+REC(ADC).S <> 1 AND PNT+REC(ADP).S <> 1 AND (GRP+REC(ADC).NRA <> 1
                662  ;*   OR (SCAN+BUF(SCAN+BUF+DIR(CHNL)).TYP = 0 AND GRP+REC(ADC).NRB <> 1)) -->
                663  ;*   IF
                664  ;*      MES(AD).CMND = 0 -->
                665  ;*      ACKNOWLEDGE (IN: AD,ADC,ADP,CTYP,CHNL,GRP,PNT; OUT: ERR,NO+MORE);
                666
00F4 A00600    R  667  PH30:  MOV    AL,PCCMND          ;GET COMMAND
00F7 0AC0         668         OR     AL,AL
00F9 78F4         669         JS     PH25               ;JUMP IF COMMAND LESS THAN ZERO
00FB 7509         670         JNZ    PH35               ;JUMP IF NOT ACKNOWLEDGE COMMAND
00FD E8A400       671  PH31:  CALL   PUSHER             ;PUT PARAMETERS ON STACK
0100 E80000    E  672         CALL   ACKNOW             ;CALL ACKNOWLEDGE SERVICE ROUTINE
0103 EB5790       673         JMP    PH122              ;GO RESPOND TO COMMAND
                674
                675  ;*   (MES(AD).CMND = 7 -->
                676  ;*      NOP+FLAG := 1
                677  ;*      CMDNOP(IN: AD,ADC,ADP,CTYP; OUT);
                678
0106 3C07         679  PH35:  CMP    AL,SEVEN           ;CHECK FOR NOP COMMAND
0108 7F48         680         JG     PH50               ;JUMP TO ERROR IF COMMAND GREATER THAN 7
010A 7508         681         JNE    PH36               ;JUMP TO CHECK FOR DIGITAL OR ANALOG
010C C606070001 R 682         MOV    NOPFLG,1           ;SET NOP CMND INDICATOR
0111 E80000    E  683         CALL   CMDNOP             ;CALL NOP SERVICE ROUTINE
                684
                685  ;*   (MES(AD).CMND = 1 OR 2 OR 3 AND PNT+REC(ADP).TYP = 2 -->
                686  ;*      DIGITAL(IN: AD,ADC,ADP,CTYP,CHNL,GRP,PNT; OUT: ERR,NO+MORE);
                687
0114 3C03         688  PH36:  CMP    AL,THREE           ;CHECK FOR DIGITAL COMMAND
0116 7F17         689         JG     PH40               ;JUMP IF NOT DIGITAL COMMAND
0118 8A4702       690         MOV    AL,[BX+SEGTYP]     ;GET TYPE OF POINT FROM POINT FILE
011B 240F         691         AND    AL,NIBLO           ;ISOLATE TYPE
011D 3C02         692         CMP    AL,TWO             ;CHECK FOR DIGITAL COMMAND POINT
011F 7405         693         JE     PH37               ;JUMP IF COMMAND POINT
0121 B00A         694         MOV    AL,ERR10
0123 EB2F90       695         JMP    PH100              ;ELSE GO FORM ERROR 10 RESPONSE
                696
0126 E87B00       697  PH37:  CALL   PUSHER             ;PUT PARAMETERS ON STACK
0129 E80000    E  698         CALL   DIGITAL            ;CALL DIGITAL SERVICE ROUTINE
012C EB2E90       699         JMP    PH122              ;GO RESPOND TO COMMAND
                700
                701  ;*   ((MES(AD).CMND = 4 OR 5 AND PNT+REC(ADP).TYP = 3) OR
                702  ;*    (MES(IAD).CMND = 6 AND PNT+REC(ADP).TYP = 3 AND CTYP = 1)) -->
                703  ;*      ANALOG (IN: AD,ADC,ADP,CTYP,CHNL,GRP,PNT; OUT: ERR, NO+MORE);
                704
012F 8A4F02       705  PH40:  MOV    CL,[BX+SEGTYP]     ;GET TYPE OF POINT FROM FILE
0132 80E10F       706         AND    CL,NIBLO           ;ISOLATE TYPE
0135 80F903       707         CMP    CL,THREE           ;CHECK FOR ANALOG COMMAND POINT
```

```
0138 7518          708          JNE     PH50            ;JUMP IF NOT AN ANALOG COMMAND POINT
013A 3C05          709          CMP     AL,FIVE         ;CHECK FOR ANALOG INC OR DEC COMMAND
013C 7F09          710          JG      PH45            ;JUMP IF NOT ANALOG INC OR DEC COMMAND
                   711
013E E86300        712  PH43:   CALL    PUSHER          ;PARAMETERS TO STACK
0141 E90000    E   713          CALL    ANALOG          ;CALL ANALOG SERVICE ROUTINE
0144 EB1690        714          JMP     PH122           ;GO RESPOND TO COMMAND
                   715
0147 3C06          716  PH45:   CMP     AL,SIX          ;CHECK FOR GO TO VALUE COMMAND
0149 7507          717          JNE     PH50            ;JUMP IF INVALID COMMAND
014B 80FA01        718          CMP     DL,ONE          ;CHECK COMMAND TYPE FOR PHYSICAL
014E 7502          719          JNE     PH50            ;JUMP IF NOT PHYSICAL COMMAND
0150 EBEC          720          JMP     PH43            ;JUMP TO SERVICE COMMAND
                   721
                   722  ;*              ;ELSE -->
                   723  ;*                  ERR := 8;
                   724  ;*              FI
                   725  ;*      FI
                   726  ;* FI
                   727
0152 B008          728  PH50:   MOV     AL,ERR8         ;EXIT WITH ERROR EQUAL 8
                   729
0154 A20400    R   730  PH100:  MOV     PCERR,AL        ;SAVE ERROR NUMBER
0157 32C0          731          XOR     AL,AL           ;CLEAR NOMORE FLAG
0159 A20500    R   732          MOV     PCNOMOR,AL      ;SAVE NO+MORE FLAG
                   733
                   734  ;* IF
                   735  ;*    CTYP = 1 -->
                   736  ;*       MES(AD).COP := ERR;
                   737  ;*       MES(AD).ERROR := ERR;
                   738  ;*       MES(AD).NO+MOR := NO+MORE;
                   739
015C 803E000001 R  740  PH122:  CMP     PCCTYP,ONE      ;CHECK COMMAND TYPE
0161 751D          741          JNE     PH125           ;JUMP IF LOGICAL COMMAND
0163 A60400    R   742          MOV     AL,PCERR        ;GET ERROR NUMBER
0166 B104          743          MOV     CL,FOUR
0168 D2E0          744          SHL     AL,CL           ;POSITION ERROR NUMBER
016A 80250F        745          AND     BYTE PTR [DI+PC+ERRTYP],NOT ERMASK  ;CLEAR SPACE
016D 0805          746          OR      [DI+PC+ERRTYP],AL    ;INSERT ERROR NUMBER
016F A00500    R   747          MOV     AL,PCNOMOR      ;GET NOMORE FLAG
0172 B105          748          MOV     CL,FIVE         ;POSITION NOMORE FLAG
0174 D2E0          749          SHL     AL,CL
0176 80656D1F      750          AND     BYTE PTR [DI+PC+COMPRI],NOT NMMASK  ;CLEAR SPACE
017A 084506        751          OR      [DI+PC+COMPRI],AL   ;INSERT NOMORE FLAG
017D E81890        752          JMP     PH130
                   753
                   754  ;* :CTYP <> 1 -->
                   755  ;*       MES(AD).CMND := MES(AD).CMND + 80H
                   756  ;*       MES(AD).WORD5 := ERR;
                   757  ;*       MES(AD).WORD6 := NO+MORE;
                   758  ;* FI
                   759  ;*OD
                   760
0180 803E040000 R  761  PH125:  CMP     PCERR,0         ;IF NO ERROR DON'T SET ERROR BIT
0185 7404          762          JE      PH128
0187 80401380      763          OR      BYTE PTR [DI+DM15CI],EIGHTY  ;SET MSB CMND BIT NEG
018B A00400    R   764  PH128:  MOV     AL,PCERR        ;GET ERROR NUMBER
018E 884505        765          MOV     [DI+WORD5],AL   ;PLACE IN DATA BLOCK
0191 A00500    R   766          MOV     AL,PCNOMOR      ;GET NOMORE FLAG
0194 884506        767          MOV     [DI+WORD6],AL   ;PLACE IN DATA BLOCK
                   768
                   769  ;*IF
                   770  ;* ADZ <> 0 -->
                   771  ;*   HXSUSPEND (IN: PHYCOM ;OUT: );
                   772
0197 9A0000----  E 773  PH130:  CALL    HXSUSPEND       ;GO WAIT FOR ONE ROUND ROBIN
019C E961FE        774          JMP     PH1
                   775  ;*:ADZ = 0 -->
                   776  ;*   HXTERMINATE (IN: ;OUT: )
                   777  ;*FI
                   778
019F 9A0000----  E 779  PH800:  CALL    HXTERMINATE     ;TASK FINISHED, TERMINATE
                   780
```

```
                          781  PHYCOM    ENDP
                          782
                          783  ;THIS IS A SUBROUTINE TO PUSH THE PARAMETERS ON THE STACK FOR LOWER LEVEL
                          784  ;MODULES.  USES AX AND BP.
                          785
01A4                      786  PUSHER    PROC      NEAR
                          787
01A4 5D                   788  PSH1:     POP       BP                  ;GET RETURN ADDRESS FROM STACK
01A5 FF360000       R     789            PUSH      PCAD                ;DATA ADDRESS
01A9 FF360200       R     790            PUSH      PCADG               ;GROUP ADDRESS
01AD FF360400       R     791            PUSH      PCADP               ;POINT ADDRESS
01B1 32E4                 792            XOR       AH,AH
01B3 A00000         R     793            MOV       AL,PCCTYP           ;COMMAND TYPE
01B6 50                   794            PUSH      AX
01B7 A00100         R     795            MOV       AL,PCCHNL           ;CHANNEL NUMBER
01BA 50                   796            PUSH      AX
01BB A00200         R     797            MOV       AL,PCGRP            ;GROUP NUMBER
01CE 50                   798            PUSH      AX
01BF A00300         R     799            MOV       AL,PCPNT            ;POINT NUMBER
01C2 50                   800            PUSH      AX
01C3 55                   801            PUSH      BP                  ;RESTORE RETURN ADDRESS
01C4 C3                   802            RET
                          803
                          804  PUSHER    ENDP
                          805
                          806  ;THIS IS A SUBROUTINE TO CONVERT BCD TO BINARY.  INPUT IS IN AL, AND OUTPUT
                          807  ;IS IN AL.  ALGORYTHM USED IS 10'S DIGIT BASE HEX DIVIDED BY 2 PLUS UNITS PLUS
                          808  ;10'S DIGIT BASE HEX DIVIDED 8.
                          809
01C5                      810  CONVER    PROC      NEAR
                          811
01C5 8AE0                 812            MOV       AH,AL               ;DUPLICATE
01C7 250FF0               813            AND       AX,0F00FH           ;ISOLATE 10'S AND 1'S DIGITS
01CA D0EC                 814            SHR       AH,1                ;10'S / 2
01CC 02C4                 815            ADD       AL,AH
01CE D0EC                 816            SHR       AH,1                ;10'S / 8
01D0 D0EC                 817            SHR       AH,1
01D2 02C4                 818            ADD       AL,AH
01D4 32E4                 819            XOR       AH,AH
01D6 C3                   820            RET
                          821
                          822  CONVER    ENDP
                          823
                          824
----                      825  CODE      ENDS
                          826            END
```

XREF SYMBOL TABLE LISTING
---- ------ ----- -------

| NAME | TYPE | VALUE | ATTRIBUTES, XREFS |
|---|---|---|---|
| ??SEG . . . . . . | SEGMENT | | SIZE=0000H PARA PUBLIC |
| ABASLN. . . . . . | NUMBER | 0015H | 426# |
| ABIT. . . . . . . | NUMBER | 0058H | 321# 322 |
| ABITMSK . . . . . | NUMBER | 0060H | 449# |
| ABMSK . . . . . . | NUMBER | 0002H | 298# |
| ACKNOW. . . . . . | L NEAR | 0000H | EXTRN 52# 672 |
| ACTL. . . . . . . | NUMBER | 000AH | 319# 320 |
| ACTLMSK . . . . . | NUMBER | 0058H | 452# |
| ADPMSK. . . . . . | NUMBER | 0007H | 474# |
| ADYM. . . . . . . | NUMBER | 0004H | 418# 420 |
| AMA . . . . . . . | NUMBER | 0028H | 427# 428 |
| AMD . . . . . . . | NUMBER | 001BH | 375# 376 |
| ANALOG. . . . . . | L NEAR | 0000H | EXTRN 54# 713 |
| ANDECP. . . . . . | NUMBER | 0017H | 404# 405 416 |
| ANHIL . . . . . . | NUMBER | 001BH | 408# 409 |
| ANLCKOUT. . . . . | NUMBER | 0027H | 414# 416 424 |
| ANLOL . . . . . . | NUMBER | 001DH | 409# 410 |
| ANOFST1 . . . . . | NUMBER | 0021H | 411# 412 |
| ANOFST2 . . . . . | NUMBER | 0025H | 413# 414 |

```
ANFD1 . . . . . . . NUMBER    0028H    424# 425
ANPD2 . . . . . . . NUMBER    0029H    425# 426
ANPD3 . . . . . . . NUMBER    002AH    426# 427
ANSCFC1 . . . . . . NUMBER    001FH    410# 411
ANSCFC2 . . . . . . NUMBER    0023H    412# 413
ANVAL . . . . . . . NUMBER    0013H    400# 401 418
ASTAT . . . . . . . NUMBER    0011H    416# 420
ATTMSK . . . . . . NUMBER    0CF0H    436#
ATTRIB . . . . . . NUMBER    000AH    317# 318 337
AVALMSK . . . . . . NUMBER    FFF0H    470#
BITFLDS . . . . . . NUMBER    0001H    308# 309 644
BUFLGS . . . . . . NUMBER    000FH    117# 652
BUSNO . . . . . . . NUMBER    0018H    382# 383 394
BUSNUM . . . . . . NUMBER    001CH    359# 360
C . . . . . . . . . NUMBER    0018H    384# 385
CBASLN . . . . . . NUMBER    0013H    339#
CDY . . . . . . . . NUMBER    0039H    337# 339
CHNL . . . . . . . NUMBER    0010H    362# 363
CIMSK . . . . . . . NUMBER    0CF0H    445#
CLOSE . . . . . . L FAR       0000H    EXTRN 500 612
CLRMSK . . . . . . NUMBER    0008H    464#
CMDDLY . . . . . . NUMBER    0014H    344# 345 349
CMDID . . . . . . . NUMBER    0010H    333# 334
CMDNOP . . . . . . L NEAR     0000H    EXTRN 555 683
CMDPAM . . . . . . NUMBER    0010H    334# 335
CMDCMK . . . . . . NUMBER    0060H    440#
CMDSTS . . . . . . NUMBER    003CH    325# 326
CMFHI . . . . . . . NUMBER    0018H    357# 358 360
CMFLOW . . . . . . NUMBER    001AH    358# 359
C . . . . . . . . . NUMBER    ....     ...
CNTL . . . . . . . NUMBER    000AH    318# 319
CNTLMSK . . . . . . NUMBER    0004H    453#
CODE . . . . . . . SEGMENT    SIZE=01D7H BYTE PUBLIC   400# 404 823
NVER . . . . . . . L NEAR    01C5H CODE
CPMSK . . . . . . . NUMBER    07FFH    446#
DATA . . . . . . . GROUP      DYNAMIC+BYTE DYNAMIC+WORD DATA+POINTER DATA+FILE  478# 480
DATA+FILE . . . . . SEGMENT   SIZE=0000H WORD PUBLIC   105# 109 478
DATA+POINTER . . . SEGMENT    SIZE=0006H WORD PUBLIC   84# 94 478
DBASLN . . . . . . NUMBER    0005H    353#
DDYM . . . . . . . NUMBER    0001H    351# 353
DECPMK . . . . . . NUMBER    0007H    456#
DGPID1 . . . . . . NUMBER    0004H    311# 312
DGPID2 . . . . . . NUMBER    0005H    312# 313
DIGITAL . . . . . L NEAR     0000H    EXTRN 53# 698
DLEN . . . . . . . NUMBER    0005H    378#
DLYFLG . . . . . . NUMBER    0040H    439#
DM15AI . . . . . . NUMBER    0014H    277# 278
DM15BUS . . . . . . NUMBER    000AH    267# 268
DM15CE . . . . . . NUMBER    000FH    272# 273
DM15CI . . . . . . NUMBER    0013H    276# 277 569 763
DM15E . . . . . . . NUMBER    0010H    273# 274
DM15LC . . . . . . NUMBER    0011H    274# 275
DM15LP . . . . . . NUMBER    0012H    275# 276
DM15ML . . . . . . NUMBER    000CH    269# 270
DM15P . . . . . . . NUMBER    0015H    278#
DM15RC . . . . . . NUMBER    000DH    270# 271
DM15S . . . . . . . NUMBER    000BH    268# 269
DM15SSA . . . . . . NUMBER    000EH    271# 272
DMSK . . . . . . . NUMBER    0002H    463#
DPD1 . . . . . . . NUMBER    0018H    372# 373 378
DPD2 . . . . . . . NUMBER    0019H    373# 374
DPD3 . . . . . . . NUMBER    001AH    374# 375
DSTAT . . . . . . . NUMBER    0004H    349# 353
DYNAMIC+BYTE . . . SEGMENT    SIZE=0008H BYTE PUBLIC   61# 81 99 103 478
DYNAMIC+WORD . . . SEGMENT    SIZE=0000H --UNDEFINED--  478#
E . . . . . . . . . NUMBER    0018H    383# 384
EIGHTY . . . . . . NUMBER    0080H    139# 763
EMSLEN . . . . . . NUMBER    0008H    368#
ENSMSK . . . . . . NUMBER    0008H    462#
ENAMSK . . . . . . NUMBER    0020H    465#
ERMASK . . . . . . NUMBER    00F0H    126# 745
ERR10 . . . . . . NUMBER    000AH    125# 658 694
ERR7 . . . . . . . NUMBER    0007H    125# 595
```

```
ERR8 . . . . . . . NUMBER    0038H    130# 728
EU . . . . . . . . NUMBER    0093H    310# 311
FIVE . . . . . . . NUMBER    0005H    135# 709 748
FOUR . . . . . . . NUMBER    0004H    134# 743
FRCNT . . . . . . NUMBER     0009H    316# 317 339
FRCTR . . . . . . NUMBER     000BH    323# 324
FRMSK . . . . . . NUMBER     003FH    430#
GRP1 . . . . . . . NUMBER    001EH    364# 365
GRP10 . . . . . . NUMBER     001EH    363# 364
HXDQ . . . . . . . L FAR     00   48# 515
    PC: EXTRN
HXRSL . . . . . . L FAR      0000H    EXTRN  49# 537
HXSUSPEND . . . . L FAR      0000H    EXTRN  46# 773
HXTERMINATE . . . L FAR      0000H    EXTRN  45# 779
HXTIMESEC . . . . L FAR      0000H    EXTRN  47# 498
HYSTER . . . . . . NUMBER    001AH    407# 408
L6LMSK . . . . . . NUMBER    0004H    458#
LCKPT . . . . . . NUMBER     0007H    314# 315
LINTYPMSK . . . . NUMBER     0002H    123# 652
LKCRMK . . . . . . NUMBER    003FH    459#
LKDLCT . . . . . . NUMBER    0016H    403# 404
LODCMSK . . . . . NUMBER     003FH    473#
MAXGRP . . . . . . NUMBER    0063H    228#
MAXOFF . . . . . . NUMBER    0015H    345# 346
MCMSK . . . . . . NUMBER     0001H    447#
MINXMSK . . . . . NUMBER     00FFH    544#
MINXTM . . . . . . NUMBER    0013H    343# 344 351 351
MINCTR . . . . . . NUMBER    0012H    335# 337 343 400
MINOFF . . . . . . NUMBER    0016H    346# 347
MINON . . . . . . NUMBER     0017H    347# 349 357 372 382
MOD1 . . . . . . . NUMBER    001DH    361# 362
MOD10 . . . . . . NUMBER     001CH    360# 361
MODE . . . . . . . NUMBER    0018H    385# 386
MODEMSK . . . . . NUMBER     0002H    466#
MODNUM . . . . . . NUMBER    0019H    386# 387
MXCHNL . . . . . . NUMBER    0009H    229#
NICHI . . . . . . NUMBER     00F0H    129#
NIBLO . . . . . . NUMBER     000FH    128# 691 706
NXMASK . . . . . . NUMBER    00E0H    127# 750
NOPFLG . . . . . . V BYTE    0007H    DYNAMIC+BYTE PUBLIC  70 79# 611 682
NRA . . . . . . . NUMBER     0002H    293#
NRAMSK . . . . . . NUMBER    0002H    122# 646
NRB . . . . . . . NUMBER     0001H    294#
NRBMSK . . . . . . NUMBER    0001H    124# 655
NXTGRP . . . . . . L FAR     0020H    EXTRN  51# 587
ONE . . . . . . . NUMBER     0001H    131# 718 748
OUTID1 . . . . . . NUMBER    0036H    313# 314
OV . . . . . . . . NUMBER    000CH    324# 325
OVMSK . . . . . . NUMBER     0030H    457#
OVRHD . . . . . . NUMBER     002AH    265#
PC+ANACOM . . . . NUMBER     0004H    244# 245
PC+CB . . . . . . NUMBER     0063H    242#
PC+CHNL . . . . . NUMBER     0009H    236# 237 541
PC+COMID . . . . . NUMBER    0020H    249# 250
PC+COMPRI . . . . NUMBER     0006H    246# 247 750 751
PC+COMPRM . . . . NUMBER     000CH    250#
PC+CONTYP . . . . NUMBER     0003H    243# 244 549
PC+DECPOS . . . . NUMBER     0006H    245# 246
PC+DL . . . . . . NUMBER     0005H    240# 241
PC+ERRTYP . . . . NUMBER     000BH    235# 236 745 746
PC+FL . . . . . . NUMBER     0003H    239# 240
PC+FLG . . . . . . NUMBER    0007H    247# 248
PC+GRP . . . . . . NUMBER    0001H    237# 238 543
PC+OV . . . . . . NUMBER     0003H    241# 242 243
PC+PRI . . . . . . NUMBER    0002H    230# 239 546
PC+RESPRI . . . . NUMBER     0007H    248# 249
PCAD . . . . . . . V WORD    0036H    DATA+POINTER PUBLIC  86 90# 532 789
PCADC . . . . . . V WORD     0002H    DATA+POINTER PUBLIC  87 91# 613 790
PCADP . . . . . . V WORD     0004H    DATA+POINTER PUBLIC  88 92# 640 653 791
PCCHNL . . . . . . V BYTE    0001H    DYNAMIC+BYTE PUBLIC  64 73# 542 564 583 649 795
PCCMND . . . . . . V BYTE    0006H    DYNAMIC+BYTE PUBLIC  69 78# 551 576 641 667
PCCTYP . . . . . . V BYTE    0000H    DYNAMIC+BYTE PUBLIC  63 72# 534 740 793
```

```
PCERR . . . . . . . V BYTE   0004H  DYNAMIC+BYTE PUBLIC   67 76# 511 738 742 761 764
PCGRP . . . . . . . V BYTE   0002H  DYNAMIC+BYTE PUBLIC   65 74# 545 566 588 797
PCNOMOR . . . . . . V BYTE   0005H  DYNAMIC+BYTE PUBLIC   68 77# 512 732 747 766
PCPNT . . . . . . . V BYTE   0003H  DYNAMIC+BYTE PUBLIC   66 75# 548 568 616 799
PH1 . . . . . . . . L NEAR   0005H  CODE   494# 499 774
PH10 . . . . . . . .L NEAR   0065H  CODE   539 563#
PH100 . . . . . . . L NEAR   0154H  CODE   596 659 695 730#
PH122 . . . . . . . L NEAR   015CH  CODE   673 699 714 740#
PH125 . . . . . . . L NEAR   0180H  CODE   741 761#
PH128 . . . . . . . L NEAR   018BH  CODE   762 764#
PH130 . . . . . . . L NEAR   0197H  CODE   752 773#
PH15 . . . . . . . .L NEAR   007DH  CODE   552 580#
PH18 . . . . . . . .L NEAR   0096H  CODE   595# 624
PH20 . . . . . . . .L NEAR   009DH  CODE   591 611#
PH22 . . . . . . . .L NEAR   00DCH  CODE   623 640#
PH25 . . . . . . . .L NEAR   00EFH  CODE   645 654 658# 669
PH30 . . . . . . . .L NEAR   00F4H  CODE   647 656 667#
PH31 . . . . . . . .L NEAR   00FDH  CODE   643 671#
PH35 . . . . . . . .L NEAR   0106H  CODE   670 679#
PH36 . . . . . . . .L NEAR   0114H  CODE   681 688#
PH37 . . . . . . . .L NEAR   0126H  CODE   693 697#
PH40 . . . . . . . .L NEAR   012FH  CODE   689 705#
PH43 . . . . . . . .L NEAR   013EH  CODE   712# 720
PH45 . . . . . . . .L NEAR   0147H  CODE   710 716#
PH5 . . . . . . . . L NEAR   0012H  CODE   495 510#
PH50 . . . . . . . .L NEAR   0152H  CODE   680 708 717 719 728#
PH7 . . . . . . . . L NEAR   002AH  CODE   517 531#
PH800 . . . . . . . L NEAR   019FH  CODE   518 779#
PHAC. . . . . . . . NUMBER   0008H  296#
PHEB. . . . . . . . NUMBER   0C01H  307# 308 339
PHCRD . . . . . . . NUMBER   0004H  297#
PHCRP . . . . . . . NUMBER   0002H  286# 287
PHHXPT. . . . . . . NUMBER   0005H  289# 290
PHNR. . . . . . . . NUMBER   0004H  288# 289 646 655
PHPNTADD. . . . . . NUMBER   0006H  298# 621
PHSCAN. . . . . . . NUMBER   0003H  287# 288
PHTYCHN . . . . . . NUMBER   0001H  285# 286
PHTTP . . . . . . . NUMBER   00F0H  295#
PHWCNT. . . . . . . NUMBER   0000H  284# 285
PHYCOM. . . . . . . L FAR    0000H  CODE PUBLIC   40 487# 781
PNTI. . . . . . . . NUMBER   001FH  366#
PNT10 . . . . . . . NUMBER   001FH  365# 366 368
PSHI. . . . . . . . L NEAR   01A4H  CODE   788#
PUSHER. . . . . . . L NEAR   01A4H  CODE   671 697 712 786# 804
Q+BUSOUT. . . . . . NUMBER   0012H  207#
Q+CMD+DELAY . . . . NUMBER   0015H  210#
Q+COFFSTUS. . . . . NUMBER   0011H  204#
Q+CRTMON. . . . . . NUMBER   0019H  214#
Q+DEBUG . . . . . . NUMBER   000CH  201#
Q+DFT . . . . . . . NUMBER   0017H  212#
Q+DIRECT. . . . . . NUMBER   000FH  204#
Q+DUTY+CYCLE. . . . NUMBER   000AH  199#
Q+EIP+CONTROL . . . NUMBER   0013H  208#
Q+GLBMSG. . . . . . NUMBER   000EH  203#
Q+GLBOUT. . . . . . NUMBER   0016H  211#
Q+GRPPROC . . . . . NUMBER   0014H  209#
Q+MONITOR . . . . . NUMBER   0010H  205#
Q+NRTIMEOUT . . . . NUMBER   0018H  213#
Q+PHY+CON . . . . . NUMBER   000BH  200# 513
Q+SCAN. . . . . . . NUMBER   0009H  198#
Q+SCHCOS. . . . . . NUMBER   000DH  202#
R . . . . . . . . . NUMBER   000DH  327# 328
RCAPFC. . . . . . . V BYTE   0000H  EXTRN  101# 494
RD. . . . . . . . . NUMBER   0060H  305# 306
RDMSK . . . . . . . NUMBER   0080H  432#
REPRNG. . . . . . . NUMBER   0018H  495# 496
RESPRY. . . . . . . NUMBER   000DH  330# 331
RMSK. . . . . . . . NUMBER   0086H  458#
RP. . . . . . . . . NUMBER   000DH  328# 329
RPMSK . . . . . . . NUMBER   0040H  451#
RPTPRI. . . . . . . NUMBER   0008H  315# 316
RPTPYMK . . . . . . NUMBER   001FH  455#
RSPRMK. . . . . . . NUMBER   001FH  442#
```

| | | | |
|---|---|---|---|
| RTC . . . . . . . . . | NUMBER | 001CH | 389# 390 392 |
| RTC2 . . . . . . . . | NUMBER | 001DH | 390# 392 |
| RTI . . . . . . . . . | NUMBER | 001AH | 387# 388 389 |
| RTI2 . . . . . . . . | NUMBER | 001BH | 388# 394 |
| RTID+BUSIN . . . . | NUMBER | 0001H | 219# |
| RTID+BUSOUT . . . | NUMBER | 0000H | 213# |
| RTID+HX315 . . . . | NUMBER | 0002H | 220# |
| RTID+HX320 . . . . | NUMBER | 000FH | 224# |
| RTID+MEM+MON . . | NUMBER | 0003H | 221# |
| RTID+SCAN . . . . | NUMBER | 000EH | 223# |
| RTID+STS+MON . . | NUMBER | 0004H | 222# |
| RTLDYN . . . . . . | NUMBER | 0000H | 392# 396 |
| RTLEN . . . . . . . | NUMBER | 0034H | 396# |
| RTMSK . . . . . . . | NUMBER | 0018H | 461# |
| RTSLEN . . . . . . | NUMBER | 0004H | 394# 396 |
| SCNDIR . . . . . . | V WORD | 05C0H | EXTRN 107# 651 |
| SCNMSK . . . . . . | NUMBER | 0001H | 460# |
| SEARCH . . . . . . | NUMBER | 00C1H | 119# 585 |
| SEC1 . . . . . . . . | NUMBER | 0001H | 114# 496 |
| SEGMSK . . . . . . | NUMBER | 00F0H | 434# |
| SEGTYP . . . . . . | NUMBER | 0002H | 309# 310 696 705 |
| SEVEN . . . . . . . | NUMBER | 0007H | 137# 671 |
| SIX . . . . . . . . . | NUMBER | 0006H | 136# 716 |
| SMASK . . . . . . . | NUMBER | 0001H | 121# 644 |
| STATUS . . . . . . | NUMBER | 000AH | 320# 321 |
| STSMSK . . . . . . | NUMBER | 0003H | 437# |
| TARVAL . . . . . . | NUMBER | 0014H | 401# 402 |
| TC . . . . . . . . . | NUMBER | 000CH | 322# 323 |
| TCIDMSK . . . . . | NUMBER | 00F0H | 443# |
| TENH . . . . . . . . | NUMBER | 000AH | 138# |
| THREE . . . . . . . | NUMBER | 0003H | 133# 688 707 |
| TID . . . . . . . . . | NUMBER | 0000H | 254# 255 |
| TKID+CMD+DELAY . . | NUMBER | 000FH | 189# |
| TKID+COS+MON . . . | NUMBER | 000DH | 187# |
| TKID+CRTMON . . . | NUMBER | 0013H | 193# |
| TKID+DEBUG . . . . | NUMBER | 0003H | 177# |
| TKID+DFT . . . . . | NUMBER | 0010H | 190# |
| TKID+DIRECT . . . | NUMBER | 000BH | 185# |
| TKID+DSKET . . . . | NUMBER | 0014H | 194# |
| TKID+DUTY+CYCLE . | NUMBER | 0001H | 175# |
| TKID+EIP+CONTROL . | NUMBER | 0008H | 182# |
| TKID+EIP+EXEC1 . . | NUMBER | 0009H | 183# |
| TKID+EIP+EXEC2 . . | NUMBER | 000AH | 184# |
| TKID+GLBMSG . . . | NUMBER | 0007H | 181# |
| TKID+GRP+PRC . . . | NUMBER | 000CH | 186# |
| TKID+NATIMEOUT . . | NUMBER | 0012H | 192# |
| TKID+PHY+COM . . . | NUMBER | 0002H | 176# |
| TKID+PSEUDO+CMD . | NUMBER | 0011H | 191# |
| TKID+RECAP . . . . | NUMBER | 0006H | 180# |
| TKID+SCHCOS . . . | NUMBER | 0005H | 179# |
| TKID+SCHTIM . . . | NUMBER | 0004H | 178# |
| TKID+START+UP . . | NUMBER | 0000H | 174# |
| TKID+SYS+STS . . . | NUMBER | 000EH | 188# |
| TMA . . . . . . . . | NUMBER | 002CH | 428# |
| TMD . . . . . . . . | NUMBER | 001CH | 376# 378 |
| TMPRES . . . . . . | NUMBER | 000CH | 326# 327 |
| TPCDPR . . . . . . | NUMBER | 000EH | 332# 333 |
| TPCID . . . . . . . | NUMBER | 000EH | 331# 332 |
| TPFMMK . . . . . . | NUMBER | 07FFH | 444# |
| TPRSMK . . . . . . | NUMBER | 001FH | 441# |
| TRVLMK . . . . . . | NUMBER | 0FFFH | 471# |
| TWO . . . . . . . . | NUMBER | 0002H | 132# 692 |
| TYPMSK . . . . . . | NUMBER | 0C0FH | 435# |
| UCMSK . . . . . . . | NUMBER | 007FH | 433# |
| UCNTMSK . . . . . | NUMBER | 00C0H | 472# |
| UHRCNT . . . . . . | NUMBER | 0016H | 402# 403 418 |
| UNREAS . . . . . . | NUMBER | 0019H | 406# 407 |
| USERCT . . . . . . | NUMBER | 0000H | 306# 307 |
| WL . . . . . . . . . | NUMBER | 000DH | 329# 330 |
| WLMSK . . . . . . . | NUMBER | 0020H | 448# |
| WORD1 . . . . . . . | NUMBER | 0001H | 255# 256 563 |
| WORD2 . . . . . . . | NUMBER | 0002H | 256# 257 563 |

```
WORD3 . . . . . . NUMBER    0003H    257#  258  567
WORD4 . . . . . . NUMBER    0004H    258#  259
WORD5 . . . . . . NUMBER    0005H    259#  260  765
WORD6 . . . . . . NUMBER    0006H    260#  261  767
WORD7 . . . . . . NUMBER    0007H    261#  262
WORD8 . . . . . . NUMBER    0008H    262#  263
WORD9 . . . . . . NUMBER    0009H    263#  267
WRD2. . . . . . . NUMBER    0001H    115#  531
WRD3. . . . . . . NUMBER    0003H    116#  533
```

ASSEMBLY COMPLETE, NO ERRORS FOUND

ISIS-II MCS-86 MACRO ASSEMBLER V2.0 ASSEMBLY OF MODULE DIG
OBJECT MODULE PLACED IN :F1:DIG.OBJ
ASSEMBLER INVOKED BY: ASM86 :F1:DIG.SRC OBJECT(:F1:DIG.OBJ) XREF EP(:F1:DIG.EPL) PW(132) DA(02/25/81) PR(:F1:DIG.LST)

```
LOC  OBJ          LINE    SOURCE

1      $TITLE ('DIGITAL')
                   2      ;          REV #   D56-DC-000-0000
                   3
                   4      ;      1.  REVISION HISTORY:
                   5
                   6      ;          REV #   07/30/80      L. LYON
                   7      ;          REV 2   01/21/81      JHB. AND RTB.
                   8      ;          REV 3   02/11/81      JHB
                   9      ;
                  10      ;      2.  FUNCTION:
                  11
                  12      ;          THIS MODULE COMPARES INFORMATION IN THE COMMAND TO
                  13      ;          INFORMATION IN THE POINT FILE TO DETERMINE IF A
                  14      ;          COMMAND CAN BE SENT TO THE POINT.  IF THE COMMAND
                  15      ;          CAN BE SENT TO THE POINT, THE INFORMATION IN THE
                  16      ;          COMMAND IS TRANSFERRED TO THE POINT FILE, A COMMAND
                  17      ;          FORMED AND SENT TO THE POINT AND AN INDICATION OF
                  18      ;          NO ERROR RETURNED TO THE CALLING MODULE. OTHERWISE,
                  19      ;          A CHANGE OF STATUS MESSAGE WILL BE SENT AND AN
                  20      ;          INDICATION OF THE TYPE OF ERROR RETURNED TO THE
                  21      ;          CALLING MODULE.
                  22
                  23      ;      3.  CALL AND RETURN SETUP:
                  24
                  25      ;          CALL:   STACK - AD; ADC; ADP; CTYP; CHNL; CRP; PNT
                  26      ;          RETURN: AX - ERROR/NO MORE
                  27
                  28      ;      4.  ENTRY POINT:
                  29
                  30                 PUBLIC DIGITAL
                  31
                  32      ;      5.  CALLED ROUTINES:
                  33
                  34                 EXTRN PRIOR+CHK:NEAR
                  35                 EXTRN PRIORCHNC:NEAR
                  36                 EXTRN FAILSAF+CHK:NEAR
                  37                 EXTRN UPD+PNTFIL:NEAR
                  38                 EXTRN COSTATUS:FAR
                  39                 EXTRN SEN+COM:NEAR
                  40                 EXTRN CHECK+BIT:NEAR
                  41
                  42      ;      6.  EXTERNAL VARIABLES DEFINED:
                  43
----              44                 DYNAMIC+WORD    SEGMENT WORD PUBLIC
                  45
0000 0000         46                 TEMP1   DW      0       ;RES+PRIORITY
0002 0000         47                 TEMP2   DW      0       ;PRIORITY
0004 0000         48                 TEMP3   DW      0       ;CID
0006 0000         49                 TEMP4   DW      0       ;CPARA
0008 0000         50                 TEMP5   DW      0       ;CMND
000A 0000         51                 TEMP6   DW      0       ;FLD
000C 0000         52                 TEMP7   DW      0       ;OVB
000E 0000         53                 TEMP8   DW      0       ;CKB
```

```
                        54
----                    55              DYNAMIC+WORD    ENDS
                        56
                        57      ;   7.  EXTERNAL VARIABLES USED:
                        58
----                    59              DYNAMIC+BYTE    SEGMENT BYTE PUBLIC
                        60
                        61                  EXTRN   PCERR:BYTE      ;STORAGE FOR ERROR NUMBER
                        62                  EXTRN   PCNOMOR:BYTE    ;STORAGE FOR NO+MORE FLAG
                        63                  EXTRN   NOFFLG:BYTE     ;STORAGE FOR NOP FLAG
                        64
----                    65              DYNAMIC+BYTE    ENDS
                        66
                        67      ;   8.  EQUATED SYMBOLS:
                        68
                        69      ;       INCLUDED FILE PCOMEQ.SRC(:F1:),DM15EQ.SRC(:F1:)
                        70      ;       PHYEQU.SRC(:F1:)
                        71
0010                    72              PRM1    EQU     16          ;PARAMETER STACK OFFSETS
000E                    73              PRM2    EQU     PRM1-2
000C                    74              PRM3    EQU     PRM2-2
000A                    75              PRM4    EQU     PRM3-2
0008                    76              PRM5    EQU     PRM4-2
0006                    77              PRM6    EQU     PRM5-2
0004                    78              PRM7    EQU     PRM6-2
                        79
                        80      ;   9.  INTERNAL SYMBOLS:
                        81
                        82      ;  10.  REGISTERS USED:
                        83
                        84      ;       ALL RESTORED UPON EXIT EXCEPT AX.
                        85
                        86 +1   $EJECT
                        87
                        88
                        89
                        90
                        91 +1   $SAVE
                        92 +1   $NOLIST
                       337 +1   $EJECT
                       338
                       339      DATA    GROUP   DYNAMIC+BYTE,DYNAMIC+WORD,DATA+POINTER,DATA+FILE
                       340
                       341              ASSUME CS:CODE,DS:DATA
                       342
----                   343      CODE    SEGMENT BYTE PUBLIC
                       344
0000                   345      DIGITAL         PROC            NEAR
                       346
                       347      ;*IF
                       348      ;* CTYP = 0 -->
                       349      ;*  RES+PRIORITY :=31;
                       350      ;*  PRIORITY := 1;
                       351      ;*  CID := 1;
                       352      ;*  CPARA := MES(AD).SSA;
                       353      ;*  CMND := MES(AD).CIP;
                       354      ;*  FLB := 0;
                       355      ;*  OVB := 1;
                       356      ;*  CKB := 0;
                       357
0000 55                358      DIG01:          PUSH BP             ;SAVE REGISTERS USED
0001 8BEC              359                      MOV BP,SP
0003 53                360                      PUSH BX
0004 51                361                      PUSH CX
0005 52                362                      PUSH DX
0006 57                363                      PUSH DI
0007 56                364                      PUSH SI
0008 8B7610            365                      MOV SI,[BP+PRM1]    ;AD OF MESSAGE
000B 8B460A            366                      MOV AX,[BP+PRM4]    ;CTYP
000E 0AC0              367                      OR AL,AL            ;CONTINUE CTYP = 0
0010 7535              368                      JNE DIG10           ;JUMP CTYP += 0
0012 C70600001F00  R   369                      MOV TEMP1,31        ;RES+PRIORITY
0018 C70602000100  R   370                      MOV TEMP2,1         ;PRIORITY
```

```
001E C70604000100  R  371                    MOV TEMP3,1            ;CID
0024 33C0             372                    XOR AX,AX
0026 8A440E            373                    MOV AL,[SI+DM15SSA]    ;SENDER'S STRAPPED ADD
0029 A30600        R  374                    MOV TEMP4,AX           ;CPARA
002C 8A4413            375                    MOV AL,[SI+DM15CI]
002F A30800        R  376                    MOV TEMP5,AX           ;CMND
0032 C7060A000100  R  377                    MOV TEMP6,1            ;FLB
0038 C7060C000100  R  378                    MOV TEMP7,1            ;OVB
003E C7060E000000  R  379                    MOV TEMP8,0            ;CKB
0044 E05590            380                    JMP DIG20              ;CONTINUE
                       381
                       382    ;*:CTTP () 0 -->
                       383    ;* RES+PRIORITY := MES(AD).RES+PRIORITY;
                       384    ;* PRIORITY := MES(AD).PRIORITY;
                       385    ;* CID := MES(AD).CID;
                       386    ;* CPARA := MES(AD).CPARA;
                       387    ;* CMND := MES(AD).CMND;
                       388    ;* FLB := MES(AD).FL;
                       389    ;* OVB := MES(AD).OV
                       390    ;*FI
                       391
0047 8A4407            392    DIG10:          MOV AL,[SI+PC+RESPRI]  ;RESIDUAL PRIORITY
004A 251F00            393                    AND AX,01FH            ;MASK OFF
004D A30200        R  394                    MOV TEMP1,AX           ;RES+PRIORITY
0050 8A4406            395                    MOV AL,[SI+PC+COMPRI]  ;PRIORITY
0053 251F00            396                    AND AX,01FH            ;MASK OFF
0056 A30200        R  397                    MOV TEMP2,AX           ;PRIORITY
0059 8A4408            398                    MOV AL,[SI+PC+COMID]   ;COMMAND ID
005C B103              399                    MOV CL,3
005E D3E8              400                    SHR AX,CL
0060 A30400        R  401                    MOV TEMP3,AX           ;CID
0063 8B4408            402                    MOV AX,[SI+PC+COMPRM]  ;COMMAND PARAMETER
0066 86E0              403                    XCHG AH,AL
0068 25FF07            404                    AND AX,07FFH           ;MASK OFF
006B A30600        R  405                    MOV TEMP4,AX           ;CPARA
006E 8A4403            406                    MOV AL,[SI+PC+COMTYP]  ;COMMAND
0071 251F00            407                    AND AX,01FH            ;MASK OFF
0074 A30800        R  408                    MOV TEMP5,AX           ;CMND
0077 8A4403            409                    MOV AL,[SI+PC+FL]      ;FL
007A B107              410                    MOV CL,7
007C D3E8              411                    SHR AX,CL
007E A30A00        R  412                    MOV TEMP6,AX           ;FLB
0081 8A4403            413                    MOV AL,[SI+PC+OV]      ;OV
0084 B105              414                    MOV CL,5               ;MOV TO LSB
0086 D3E8              415                    SHR AX,CL              ;AND MASK OFF
0088 250100            416                    AND AX,1
008B A30C00        R  417                    MOV TEMP7,AX           ;OVB
008E 8A4403            418                    MOV AL,[SI+PC+CB]      ;CB
0091 B104              419                    MOV CL,4               ;MOVE TO LSB
0093 D3E8              420                    SHR AX,CL              ;AND MASK OFF
0095 250100            421                    AND AX,1
0098 A30E00        R  422                    MOV TEMP8,AX           ;CKB
                       423
                       424    ;*IF
                       425    ;* CMND = 1 --> CMND := 2;
                       426    ;*:CMND = 2 --> CMND := 0;
                       427    ;*:CMND = 3 --> CMND := 1;
                       428    ;*FI
                       429    ;*CHECK+BIT(IN: AD,ADC,ADP,CB; OUT: ERR);
                       430    ;*IF
                       431    ;* ERR () 0 -->
                       432    ;* SKIP;
                       433    ;*:ERR = 0 -->
                       434    ;* A+OR+D := 0;
                       435    ;* PRIORITY+CHECK (IN: PRIORITY,ADP; OUT: ERR);
                       436    ;*FI
                       437    ;*IF
                       438    ;* ERR () 0 -->
                       439    ;* SKIP;
                       440
009B 832E080002    R  441    DIG20:          SUB TEMP5,2
00A0 7906              442                    JNS DIG20A
00A2 C70608000200  R  443                    MOV TEMP5,2
```

```
00A9 FF360E00   R   444   DIG20A:   PUSH TEMP8                      ;CKB
00AC E80000     E   445             CALL CHECK+BIT                  ;CALL CHECK+BIT SERVICE ROUTINE
00AF 0BC0           446             OR   AX,AX                      ;CHECK ERROR
00B1 7403           447             JZ   DIG21                      ;CONTINUE IF ERROR = 0
00B3 E9DF00         448             JMP  DIG100                     ;JUMP IF ERROR <> 0
00B6 FF360200   R   449   DIG21:    PUSH TEMP2                      ;PRIORITY
00BA 8B5E0C         450             MOV  BX,[BP+PRM3]               ;ADP
00BD 53             451             PUSH BX
00BE E80000     E   452             CALL PRIOR+CHK
00C1 0BC0           453             OR   AX,AX
00C3 7403           454             JZ   DIG22                      ;CONTINUE ERROR = 0
00C5 E9AD00         455             JMP  DIG100                     ;JUMP ERROR += 0
                    456   ;*;ERR = 0 -->
                    457   ;* IF
                    458   ;* ADP.ATTRIB = 4 AND NOP+FLAG =0 --> SKIP;
                    459   ;*/PRIORITY+CHANGE+ONLY (IN : A OR D,CMND,ADP,RES+PRIORITY,CID,CPARA;OUT: ERR);
                    460
                    461   ;*FI
                    462
00C8 8A478A         463   DIG22:    MOV  AL,[BX+ATTRIB]             ;SET ATTRIBUTE
00CB 24F0           464             AND  AL,0F0H                    ;MASK
00CD 3C40           465             CMP  AL,040H                    ;COMPARE TO ALARM
00CF 750A           466             JNE  DIG22A                     ;JMP NOT ALARM
00D1 A00000     E   467             MOV  AL,NOPFLG                  ;GET NOP+FLAG
00D4 0AC0           468             OR   AL,AL
00D6 7503           469             JNZ  DIG22A                     ;JMP NOP COMMAND
00D8 E81F90         470             JMP  DIG23
00DB 33C0           471   DIG22A:   XOR  AX,AX
00DD 50             472             PUSH AX                         ;A+OR+D = 0
00DE FF360800   R   473             PUSH TEMP5                      ;CMND
00E2 53             474             PUSH BX                         ;ADP
00E3 FF360000   R   475             PUSH TEMP1                      ;RES+PRIORITY
00E7 FF360400   R   476             PUSH TEMP3                      ;CID
00EB FF360600   R   477             PUSH TEMP4                      ;CPARA
00EF E80000     E   478             CALL PRIORCHNG
00F2 0BC0           479             OR   AX,AX
00F4 7403           480             JZ   DIG23                      ;CONTINUE ERROR = 0
00F6 EB7D90         481             JMP  DIG100                     ;JUMP ERROR += 0
                    482
                    483   ;*IF
                    484   ;* ERR <> 0 OR FLB <> 0 -->
                    485   ;* SKIP;
                    486
00F9 8B0E0A00   R   487   DIG23:    MOV  CX,TEMP6                   ;FLB
00FD 0BC9           488             OR   CX,CX
00FF 7512           489             JNZ  DIG24A                     ;CONTINUE FLB += 1
                    490                                             ;JUMP FLB = 1
                    491
                    492   ;*;ERR = 0 AND FLB <> 0 -->
                    493   ;* FAILSAFE+CHECK (IN: ADP,A+OR+D,CTYP,CID; OUT: ERR);
                    494   ;*FI
                    495
0101 53             496   DIG24:    PUSH BX                         ;ADP
0102 33C0           497             XOR  AX,AX
0104 50             498             PUSH AX                         ;A+OR+D = 0
0105 FF760A         499             PUSH WORD PTR [BP+PRM4]         ;CTYP
0108 FF360400   R   500             PUSH TEMP3                      ;CID
010C E80000     E   501             CALL FAILSAF+CHK
010F 0BC0           502             OR   AX,AX
0111 7562           503             JNZ  DIG100
                    504
                    505   ;*IF
                    506   ;* ERR = 0 AND CTYP = 1 AND RES(AD).DL = 0 -->
                    507   ;* DELAY+C := PKT+REC(ADP).DLY;
                    508   ;*;CTYP <> 1 -->
                    509   ;* DELAY+C := 0;
                    510   ;*FI
                    511
0113 33D2           512   DIG24A:   XOR  DX,DX                      ;(DX) = 0
0115 8B4E0A         513             MOV  CX,[BP+PRM4]               ;CTYP
0118 83F901         514             CMP  CX,1
011B 750A           515             JNE  DIG25                     ;JUMP CTYP += 1
011D 8A4403         516             MOV  AL,[SI+PC+DL]              ;DELAY
```

```
0120 A840           517              TEST AL,40H
0122 7503           518              JNZ DIC25                  ;JUMP DL := 0
0124 8A5714         519              MOV DL,[BX+CMDDLY]         ;DELAY+C
                    520
                    521    ;*IF
                    522    ;* ERR <> 0 -->
                    523    ;*   SKIP;
                    524    ;*;ERR = 0 -->
                    525    ;*   PNT+REC(ADP).OV := OVB;
                    526    ;*   SEND+COMMAND (IN: A+OR+D,CMND,GRP+REC(ADC).TYP,CHNL,ADP,CRP,DELAY+C,PNT; OUT: NO+MORE)
                    527    ;*FI
                    528    ;*IF
                    529    ;* ERR = 0 -->
                    530    ;*   UPDATE+PNT+FILE (IN: A+OR+D,CMND,RES+PRIORITY,CID,CPARA,ADP; OUT: );
                    531
0127 A10C00     R   532    DIC25:       MOV AX,TEMP7           ;OVB
012A B107          533                   MOV CL,7
012C D2E0          534                   SHL AL,CL
012E 80670C7F      535                   AND BYTE PTR [BX+OV],07FH  ;MASK OV BIT
0132 08470C        536                   OR [BI+OV],AL          ;OVB INTO FILE
0135 33C0          537                   XOR AX,AX
0137 50            538                   PUSH AX                ;A+OR+D = 0
0138 FF360800   R  539                   PUSH TEMP5             ;CMND
013C 8B7E0E          540                  MOV DI,[BP+PRM2]       ;ADC
013F 8A4501          541                  MOV AL,[DI+PHTYCHN]    ;GRP+REC(ADC).TYP
0142 B104            542                  MOV CL,4
0144 D2E8            543                  SHR AL,CL              ;SHIFT AND MASK TYPE
0146 50              544                  PUSH AX                ;GRP+REC(ADC).TYP
0147 8B4608          545                  MOV AX,[BP+PRM5]
014A 50              546                  PUSH AX                ;CHNL
014B 53              547                  PUSH BX                ;ADP
014C 8B4606          548                  MOV AX,[BP+PRM6]
014F 50              549                  PUSH AX                ;CROUP
0150 52              550                  PUSH DX                ;DELAY+C
0151 8B4604          551                  MOV AX,[BP+PRM7]
0154 50              552                  PUSH AX                ;PNT
0155 E80000     E   553                   CALL SEN+COM
0158 A20000     E   554                   MOV PCNOMOR,AL         ;SAVE STATUS OF NOMORE FLAG
015B 33C0           555                   XOR AX,AX              ;A+OR+D = 0
015D 50             556                   PUSH AX
015E FF360800   R  557                   PUSH TEMP5             ;CMND
0162 FF360000   R  558                   PUSH TEMP1             ;RES+PRIORITY
0166 FF360400   R  559                   PUSH TEMP3             ;CID
016A FF360600   R  560                   PUSH TEMP4             ;CPARA
016E 53             561                   PUSH BX                ;ADP
016F E80000     E  562                   CALL UPD+PNTFIL
0172 E82F00         563                   JMP DICOUT
                    564
                    565    ;*;ERR <> 0 -->
                    566    ;*  IF
                    567    ;*   ERR=11 --> ERR := ERR + 13
                    568    ;*  ;ERR<>11 --> ERR := ERR + 14
                    569    ;*  FI
                    570    ;*  COSTATUS (IN: CHNL,CRP,PNT,ERR,CID,CPARA,CMND; OUT: NO+MORE);
                    571    ;*FI
                    572
                    573
0175 A20000     E   574    DIC100:       MOV PCERR,AL           ;SAVE ERROR NUMBER
0178 8B5E08         575                   MOV BX,[BP+PRM5]
017B 53             576                   PUSH BX                ;CHNL
017C 8B5E06         577                   MOV BX,[BP+PRM6]
017F 53             578                   PUSH BX                ;GRP
0180 8B5E04         579                   MOV BX,[BP+PRM7]
0183 53             580                   PUSH BX                ;PNT
0184 3C0B           581                   CMP AL,11
0186 7506           582                   JNE DIC105
0188 050D00         583                   ADD AX,13              ;ERROR + 14
018B E80400         584                   JMP DIC110
018E 050E00         585    DIC105:       ADD AX,14              ;ERROR + 14
0191 50             586    DIC110:       PUSH AX                ; TO PARAMETER LIST
0192 FF360400   R  587                   PUSH TEMP3             ;CID
0196 FF360600   R  588                   PUSH TEMP4             ;CPARA
019A FF360800   R  589                   PUSH TEMP5             ;CMND
019E 9A0000----  E  590                   CALL COSTATUS
```

```
                    591
01A3 5E             592        DIGOUT:         POP SI
01A4 5F             593                        POP DI
01A5 5A             594                        POP DX
01A6 59             595                        POP CX
01A7 5B             596                        POP BX
01A8 5D             597                        POP BP
01A9 C20E00         598                        RET 14
                    599
                    600        DIGITAL         ENDP
----                601        CODE            ENDS
                    602                        END
```

XREF SYMBOL TABLE LISTING
---- ------ ----- -------

| NAME | TYPE | VALUE | ATTRIBUTES, XREFS |
|---|---|---|---|
| ??SEG | SEGMENT | | SIZE=0000H PARA PUBLIC |
| ABASLN | NUMBER | 0015H | 281# |
| ABIT | NUMBER | 000BH | 182# 183 |
| ABITMSK | NUMBER | 0008H | 310# |
| ABMSK | NUMBER | 0002H | 159# |
| ACTL | NUMBER | 000AH | 180# 181 |
| ACTLMSK | NUMBER | 0008H | 313# |
| ADPMSK | NUMBER | 0007H | 335# |
| ADYN | NUMBER | 0004H | 279# 281 |
| AMA | NUMBER | 002BH | 288# 289 |
| AMD | NUMBER | 001BH | 236# 237 |
| ANDECP | NUMBER | 0017H | 265# 266 277 |
| ANHIL | NUMBER | 001BH | 269# 270 |
| ANLCKOUT | NUMBER | 0027H | 275# 277 285 |
| ANLOL | NUMBER | 001DH | 270# 271 |
| ANOFST1 | NUMBER | 0021H | 272# 273 |
| ANOFST2 | NUMBER | 0025H | 274# 275 |
| ANPD1 | NUMBER | 0028H | 285# 286 |
| ANPD2 | NUMBER | 0029H | 286# 287 |
| ANPD3 | NUMBER | 002AH | 287# 288 |
| ANSCFC1 | NUMBER | 001FH | 271# 272 |
| ANSCFC2 | NUMBER | 0023H | 273# 274 |
| ANVAL | NUMBER | 0013H | 261# 262 279 |
| ASTAT | NUMBER | 0011H | 277# 281 |
| ATTMSK | NUMBER | 03F0H | 297# |
| ATTRIB | NUMBER | 000AH | 178# 179 198 463 |
| AVALMSK | NUMBER | FFF0H | 331# |
| BITRLDS | NUMBER | 0001H | 169# 170 |
| BUSNO | NUMBER | 0018H | 243# 244 255 |
| BUSNUM | NUMBER | 001CH | 220# 221 |
| C | NUMBER | 0018H | 245# 246 |
| CBASLN | NUMBER | 0013H | 208# |
| CDY | NUMBER | 0009H | 198# 200 |
| CHECK+BIT | L NEAR | 0000H | EXTRN 40# 445 |
| CHNL | NUMBER | 001DH | 223# 224 |
| CIMSK | NUMBER | 00F8H | 306# |
| CLRMSK | NUMBER | 0008H | 325# |
| CMDDLY | NUMBER | 0014H | 205# 206 210 519 |
| CMDID | NUMBER | 0010H | 194# 195 |
| CMDPAM | NUMBER | 0010H | 195# 196 |
| CMDCKK | NUMBER | 0060H | 301# |
| CMDSTS | NUMBER | 000CH | 186# 187 |
| CMFHI | NUMBER | 0018H | 218# 219 229 |
| CMFLOW | NUMBER | 001AH | 219# 220 |
| CNIL | NUMBER | 000AH | 179# 180 |
| CNTLMSK | NUMBER | 0004H | 314# |
| CODE | SEGMENT | | SIZE=01ACH BYTE PUBLIC 341# 343 601 |
| COSTATUS | L FAR | 0000H | EXTRN 36# 590 |
| EPMSK | NUMBER | 07FFH | 307# |
| DATA | GROUP | | DYNAMIC+BYTE DYNAMIC+WORD DATA+POINTER DATA+FILE 339# 341 |
| DATA+FILE | SEGMENT | | SIZE=0000H --UNDEFINED-- 339# |
| DATA+POINTER | SEGMENT | | SIZE=0000H --UNDEFINED-- 339# |
| DBASLN | NUMBER | 0005H | 214# |

```
DDYM. . . . . . NUMBER    0001H    212# 214
DECPMK. . . . . NUMBER    0007H    317#
DCPID1. . . . . NUMBER    0004H    172# 173
DCPID2. . . . . NUMBER    0005H    173# 174
DIG01 . . . . . L NEAR    0000H    CODE    358#
DIG10 . . . . . L NEAR    0017H    CODE    369 392#
DIG100. . . . . L NEAR    0175H    CODE    448 455 481 503 574#
DIG105. . . . . L NEAR    018EH    CODE    582 585#
DIG11 . . . . . L NEAR    0191H    CODE    584 586#
DIG20 . . . . . L NEAR    009BH    CODE    389 441#
DIG20A. . . . . L NEAR    00A6H    CODE    442 444#
DIG21 . . . . . L NEAR    00B6H    CODE    447 449#
DIG22 . . . . . L NEAR    00C8H    CODE    454 463#
DIG22A. . . . . L NEAR    00DBH    CODE    466 469 471#
DIG23 . . . . . L NEAR    00F9H    CODE    470 480 487#
DIG24 . . . . . L NEAR    0101H    CODE    496#
DIG24A. . . . . L NEAR    0113H    CODE    489 512#
DIG25 . . . . . L NEAR    0127H    CODE    515 518 532#
DIGITAL . . . . L NEAR    0000H    CODE PUBLIC    30 345# 600
DIGOUT. . . . . L NEAR    01A3H    CODE    563 592#
DLEN. . . . . . NUMBER    0005H    239#
DLYFLG. . . . . NUMBER    0040H    300#
DM15A1. . . . . NUMBER    0014H    138# 139
DM15BUS . . . . NUMBER    000AH    128# 129
DM15CE. . . . . NUMBER    000FH    133# 134
DM15CI. . . . . NUMBER    0013H    137# 138 375
DM15E . . . . . NUMBER    0010H    134# 135
DM15LC. . . . . NUMBER    0011H    135# 136
DM15LP. . . . . NUMBER    0012H    136# 137
DM15ML. . . . . NUMBER    000CH    130# 131
DM15P . . . . . NUMBER    0015H    139#
DM15RC. . . . . NUMBER    000DH    131# 132
DM15S . . . . . NUMBER    000BH    129# 130
DM15SSA . . . . NUMBER    000EH    132# 133 373
DMSK. . . . . . NUMBER    0002H    324#
DPD1. . . . . . NUMBER    0018H    233# 234 239
DPD2. . . . . . NUMBER    0019H    234# 235
DPD3. . . . . . NUMBER    001AH    235# 236
DSTAT . . . . . NUMBER    0004H    210# 214
DYNAMIC+BYTE. SEGMENT     SIZE=0000H BYTE PUBLIC    59# 65 339
DYNAMIC+WORD. SEGMENT     SIZE=0010H WORD PUBLIC    44# 55 339
E . . . . . . . NUMBER    0018H    244# 245
ENSLEN. . . . . NUMBER    0008H    229#
ENGMSK. . . . . NUMBER    0000H    323#
ENRMSK. . . . . NUMBER    0020H    326#
EU. . . . . . . NUMBER    0003H    171# 172
FAILSAF+CHK . L NEAR      0000H    EXTRN    36# 501
FRCNT . . . . . NUMBER    0009H    177# 178 200
FRCTR . . . . . NUMBER    000BH    184# 185
FRMSK . . . . . NUMBER    003FH    299#
GRP1. . . . . . NUMBER    001EH    225# 226
GRP10 . . . . . NUMBER    001EH    224# 225
HYSTER. . . . . NUMBER    001AH    266# 269
L6LMSK. . . . . NUMBER    0004H    319#
LCKPT . . . . . NUMBER    0007H    175# 176
LKCRMK. . . . . NUMBER    003FH    320#
LKDLCT. . . . . NUMBER    0016H    264# 265
LODCMSK . . . . NUMBER    003FH    334#
MAXOFF. . . . . NUMBER    0015H    206# 207
MCMSK . . . . . NUMBER    0001H    303#
MIMXMSK . . . . NUMBER    00FFH    315#
MIMXTM. . . . . NUMBER    0013H    204# 205 212 212
MIMCTR. . . . . NUMBER    0012H    196# 198 204 261
MINOFF. . . . . NUMBER    0016H    207# 208
MINON . . . . . NUMBER    0017H    208# 210 218 233 243
MOD1. . . . . . NUMBER    001DH    222# 223
MOD10 . . . . . NUMBER    001CH    221# 222
MODE. . . . . . NUMBER    0018H    246# 247
MODEMSK . . . . NUMBER    0002H    327#
MODNUM. . . . . NUMBER    0019H    247# 248
NOPFLG. . . . . V BYTE    0000H    EXTRN    63# 467
NRA . . . . . . NUMBER    0002H    154#
NRB . . . . . . NUMBER    0001H    155#
```

```
OUTID1. . . . NUMBER   0006H   174# 175
OV. . . . . . NUMBER   000CH   185# 186 535 536
OVMSK . . . . NUMBER   0009H   318#
OVRHD . . . . NUMBER   000AH   126#
PC+ANACOM . . NUMBER   0004H   105# 106
PC+CB . . . . NUMBER   0003H   103# 418
PC+CHNL . . . NUMBER   0000H   97# 98
PC+COMID. . . NUMBER   0008H   110# 111 398
PC+COMPRI . . NUMBER   0006H   107# 108 395
PC+COMPRK . . NUMBER   0008H   111# 402
PC+CONTYP . . NUMBER   0003H   104# 105 406
PC+DECPOS . . NUMBER   0006H   106# 107
PC+DL . . . . NUMBER   0003H   101# 102 516
PC+ERRTYP . . NUMBER   0000H   96# 97
PC+FL . . . . NUMBER   0003H   100# 101 409
PC+FLG. . . . NUMBER   0007H   188# 189
PC+GRP. . . . NUMBER   0001H   98# 99
PC+OV . . . . NUMBER   0003H   102# 103 104 413
PC+PNT. . . . NUMBER   0002H   99# 100
PC+RESPRI . . NUMBER   0007H   109# 110 392
PCERR . . . . V BYTE   0000H   EXTRN 61# 574
PCMONOR . . . V BYTE   0000H   EXTRN 62# 554
PHAC. . . . . NUMBER   0008H   157#
PHEB. . . . . NUMBER   0001H   166# 169 200
PHCRD . . . . NUMBER   0004H   158#
PHGRP . . . . NUMBER   0002H   147# 148
PHMXPT. . . . NUMBER   0005H   150# 151
PHNR. . . . . NUMBER   0004H   149# 150
PHPNTADB. . . NUMBER   0006H   151#
PHSCAN. . . . NUMBER   0003H   148# 149
PHTCOM. . . . NUMBER   0001H   144# 147 541
PHTYP . . . . NUMBER   00F0H   156#
PHUCNT. . . . NUMBER   0000H   145# 146
PNT1. . . . . NUMBER   001FH   227#
PNT10 . . . . NUMBER   001FH   226# 227 229
PRIOR+CHK . . L NEAR   0000H   EXTRN 34# 452
PRIORCHNG . . L NEAR   0000H   EXTRN 35# 478
PRM1. . . . . NUMBER   0010H   72# 73 365
PRM2. . . . . NUMBER   000EH   73# 74 540
PRM3. . . . . NUMBER   000CH   74# 75 456
PRM4. . . . . NUMBER   000AH   75# 76 366 499 513
PRM5. . . . . NUMBER   0008H   76# 77 545 575
PRM6. . . . . NUMBER   0006H   77# 78 549 577
PRM7. . . . . NUMBER   0004H   78# 551 579
R . . . . . . NUMBER   000DH   188# 189
RD. . . . . . NUMBER   0009H   166# 167
RDMSK . . . . NUMBER   0030H   293#
REPRNC. . . . NUMBER   0018H   266# 267
RESPRY. . . . NUMBER   000DH   191# 192
RMSK. . . . . NUMBER   0080H   311#
RP. . . . . . NUMBER   000DH   189# 190
RPMSK . . . . NUMBER   0040H   312#
RPTPRI. . . . NUMBER   0008H   176# 177
RPTPYMK . . . NUMBER   001FH   316#
RSPRNK. . . . NUMBER   001FH   303#
RTC . . . . . NUMBER   001CH   250# 251 253
RTC2. . . . . NUMBER   001DH   251# 253
RTI . . . . . NUMBER   001AH   248# 249 250
RTI2. . . . . NUMBER   001BH   249# 255
RTLDYN. . . . NUMBER   0000H   253# 257
RTLEN . . . . NUMBER   0004H   257#
RTMSK . . . . NUMBER   0010H   322#
RTSLEN. . . . NUMBER   0004H   255# 257
SCNMSK. . . . NUMBER   0001H   321#
SECMSK. . . . NUMBER   00F0H   295#
SECTYP. . . . NUMBER   0002H   170# 171
SEN+COM . . . L NEAR   0000H   EXTRN 39# 353
STATUS. . . . NUMBER   000AH   181# 182
STSMSK. . . . NUMBER   0003H   296#
TARVAL. . . . NUMBER   0014H   262# 263
TC. . . . . . NUMBER   0005H   183# 184
TCIDMSK . . . NUMBER   00F8H   304#
```

```
TEMP1 . . . . V WORD    0000H  DYNAMIC+WORD  46#  369 394 475 558
TEMP2 . . . . V WORD    0002H  DYNAMIC+WORD  47#  370 397 449
TEMP3 . . . . V WORD    0004H  DYNAMIC+WORD  48#  371 401 476 540 559 587
TEMP4 . . . . V WORD    0006H  DYNAMIC+WORD  49#  374 405 477 560 588
TEMP5 . . . . V WORD    0008H  DYNAMIC+WORD  50#  376 408 441 443 473 539 557 589
TEMP6 . . . . V WORD    000AH  DYNAMIC+WORD  51#  377 412 407
TEMP7 . . . . V WORD    000CH  DYNAMIC+WORD  52#  378 417 532
TEMP8 . . . . V WORD    000EH  DYNAMIC+WORD  53#  379 422 444
TID . . . . . NUMBER    0020H  115# 116
TMA . . . . . NUMBER    002CH  289#
TMD . . . . . NUMBER    001CH  237# 239
TMFRES. . . . NUMBER    000CH  187# 188
TPOPR . . . . NUMBER    002EH  195# 194
TPCID . . . . NUMBER    000EH  192# 193
TPPMMK. . . . NUMBER    07FFH  305#
TPRSMK. . . . NUMBER    001FH  302#
TRVLMK. . . . NUMBER    0FFFH  337#
TYPMSK. . . . NUMBER    000FH  296#
UCMSK . . . . NUMBER    007FH  294#
UCNTMSK . . . NUMBER    00C0H  333#
UNRCNT. . . . NUMBER    0016H  263# 264 279
UNREAS. . . . NUMBER    0019H  267# 268
UPD+PNTFIL. . L NEAR    0000H  EXTRN 37# 562
USERCT. . . . NUMBER    0008H  167# 168
WL. . . . . . NUMBER    000DH  190# 191
WLMSK . . . . NUMBER    0020H  309#
WORD1 . . . . NUMBER    0001H  116# 117
WORD2 . . . . NUMBER    0002H  117# 118
WORD3 . . . . NUMBER    0003H  118# 119
WORD4 . . . . NUMBER    0004H  119# 120
WORD5 . . . . NUMBER    0005H  120# 121
WORD6 . . . . NUMBER    0006H  121# 122
WORD7 . . . . NUMBER    0007H  122# 123
WORD8 . . . . NUMBER    0008H  123# 124
WORD9 . . . . NUMBER    0009H  124# 128
```

ASSEMBLY COMPLETE, NO ERRORS FOUND

ISIS-II MCS-86 MACRO ASSEMBLER V2.0 ASSEMBLY OF MODULE ALOC
OBJECT MODULE PLACED IN :F1:ALOC.OBJ
ASSEMBLER INVOKED BY: ASM86 :F1:ALOC.SRC OBJECT(:F1:ALOC.OBJ) IREF EP(:F1:ALOC.EPL) PW(132) DA(02/25/81) PR(:F1:ALOC.LST)

```
LOC  OBJ           LINE    SOURCE

1      $TITLE ('ANALOC')
                    2      ;        REV 0  056-DC-000-0000
                    3
                    4      ;   1.   REVISION HISTORY:
                    5
                    6      ;        REV 0   07/30/80      L. LYON
                    7      ;        REV 2   01/21/81      JHB AND RTB
                    8
                    9      ;   2.   FUNCTION:
                   10
                   11      ;        THE CHECK BIT IS SCANNED AND THE APPROPRIATE COMPARISONS
                   12      ;        OF THE DIRECT MESSAGE AND THE POINT FILE ARE MADE. IF
                   13      ;        THE COMMAND CHECK FAILS, AN ERROR INDICATION IS RETURNED
                   14      ;        TO THE CALLING MODULE. IF THE CHECK PASSES, THEN THE
                   15      ;        MODULE WILL CHECK THAT THE MESSAGE HAS SUFFICIENT
                   16      ;        PRIORITY TO COMMAND THE POINT AND THAT THE COMMAND IS
                   17      ;        NOT A PRIORITY CHANGE ONLY. IF THE COMMAND ATTEMPTS
                   18      ;        TO SET THE POINT OUT OF RANGE, THEN THE COMMAND WILL
                   19      ;        BE MODIFIED TO SET IT TO THE LIMIT AS DEFINED IN THE
                   20      ;        POINT RECORD. IF AN ERROR OCCURRED IN EITHER OF THE
                   21      ;        PRIORITY CHECKS, A CHANGE OF STATUS MESSAGE WILL BE
                   22      ;        GENERATED AND A RESPONSE ERROR RETURNED TO THE CALLING
                   23      ;        MODULE. IF AN ERROR DID NOT OCCUR, THE POINT FILE
                   24      ;        WILL BE UPDATED AND A COMMAND SENT TO THE POINT AND
                   25      ;        AN INDICATOR OF NO ERROR RETURNED TO THE CALLING MODULE.
                   26
                   27      ;   3.   CALL AND RETURN SETUP:
```

```
28
29      ;           CALL:   STACK - ADJ ADC; ADP; CTYP; CHNL; GRP; PNT
30      ;           RETURN: AX = ERR/NO MORE
31
32      ;       4.  ENTRY POINT:
33
34                  PUBLIC ANALOG
35
36      ;       5.  CALLED ROUTINES:
37
38                  EXTRN PRIOR+CHK:NEAR
39                  EXTRN CNVT+VALINC:NEAR
40                  EXTRN PRIORCHNG:NEAR
41                  EXTRN FAILSAF+CHK:NEAR
42                  EXTRN UPD+PNTFIL:NEAR
43                  EXTRN SEN+COM:NEAR
44                  EXTRN COSTATUS:FAR
45                  EXTRN DJBCDBIN:FAR
46                  EXTRN CHECK+BIT:NEAR
47                  EXTRN ANADJ:FAR
48
49      ;       6.  EXTERNAL VARIABLES DEFINED:
50
51                  DYNAMIC+WORD    SEGMENT WORD PUBLIC
52
0000 0000   53          TMP1    DW      0       ;RES+PRIORITY
0002 0000   54          TMP2    DW      0       ;PRIORITY
0004 0000   55          TMP3    DW      0       ;CID
0006 0000   56          TMP4    DW      0       ;CPARA
0008 0000   57          TMP5    DW      0       ;VALUE
000A 0000   58          TMP6    DW      0       ;CNID
000C 0000   59          TMP7    DW      0       ;OVB
000E 0000   60          TMP8    DW      0       ;CKB
61
62                  DYNAMIC+WORD    ENDS
63
64      ;       7.  EXTERNAL VARIABLES USED:
65
66                  DYNAMIC+BYTE    SEGMENT BYTE PUBLIC
67
68                  EXTRN   PCERR:BYTE      ;STORAGE FOR ERROR NUMBER
69                  EXTRN   PCNOMOR:BYTE    ;STORAGE FOR NO+MORE FLAG
70
71                  DYNAMIC+BYTE    ENDS
72
73
74      ;       8.  EQUATED SYMBOLS:
75
76      ;           INCLUDED:   DM15EQ.SRC,PCOMEQ.SRC,PNTEQU.SRC
77
0010    78              PAR1    EQU     16      ;PARAMETER STACK OFFSETS
000E    79              PAR2    EQU     PAR1-2
000C    80              PAR3    EQU     PAR2-2
000A    81              PAR4    EQU     PAR3-2
0008    82              PAR5    EQU     PAR4-2
0006    83              PAR6    EQU     PAR5-2
0004    84              PAR7    EQU     PAR6-2
0028    85              DEL40   EQU     40
0FA0    86              EIA4000 EQU     4000
87
88      ;       9.  INTERNAL SYMBOLS USED:
89
90      ;       10. REGISTERS USED:
91
92      ;           ALL REGISTERS RESTORED EXCEPT AX.
93 +1   $EJECT
94
95
96                                  65
97
98
99 +1   $SAVE
100 +1  $NOLIST
346 +1  $EJECT
```

```
                347
                348
                349    DATA    GROUP   DYNAMIC+BYTE,DYNAMIC+WORD,DATA+POINTER,DATA+FILE
                350    ASSUME CS:CODE,DS:DATA
                351
----            352    CODE SEGMENT BYTE PUBLIC
                353
0000            354    ANALOG      PROC            NEAR
                355
                356    ;*IF
                357    ;* CTYP = 0 -->
                358    ;* RES+PRIORITY := 31;
                359    ;* PRIORITY := 1;
                360    ;* CID := A;
                361    ;* CPARA := MES(AD).SSA;
                362    ;* VALUE := MES(AD).ANA+INCR;
                363    ;* CMND := MES(AD).CIP;
                364    ;* OVB := 1;
                365    ;* CKB := 0;
                366
0000 55         367    ALOG01:     PUSH BP                 ;SAVE REGISTERS USED
0001 8BEC       368                MOV BP,SP
0003 53         369                PUSH BX
0004 51         370                PUSH CX
0005 52         371                PUSH DX
0006 57         372                PUSH DI
0007 56         373                PUSH SI
0008 8B7E10     374                MOV DI,[BP+PAR1]        ;ADDRESS OF MSC (AD)
000B 8B560A     375                MOV DX,[BP+PAR4]        ;CTYP
000E 0AD2       376                OR DL,DL
0010 7535       377                JNZ ALOG10              ;JUMP CTYP += 0
0012 C706000001F00  R  378        MOV TMP1,31             ;RES+PRIORITY
0018 C706020001000  R  379        MOV TMP2,1              ;PRIORITY
001E C706040001000  R  380        MOV TMP3,1              ;CID
0024 33C0       381                XOR AX,AX               ;CLEAR AX
0026 8A450E     382                MOV AL,[DI+DM1SSSA]     ;SENDER'S STRAPPED ADDR
0029 A30600     R  383             MOV TMP4,AX             ;CPARA
002C 8A4514     384                MOV AL,[DI+DM1SAI]      ;ANALOG INCREMENT
002F A30800     R  385             MOV TMP5,AX
0032 8A4513     386                MOV AL,[DI+DM1SCI]      ;COMMAND INPUT
0035 A30A00     R  387             MOV TMP6,AX             ;CMND
0038 C7060C0001000  R  388        MOV TMP7,1              ;OVB
003E C7060E000000   R  389        MOV TMP8,0              ;CKB
0044 EB6790     390                JMP ALOG20
                391
                392    ;*:CTYPE <> 0 -->
                393    ;* RES+PRIORITY := MES(AD).RES+PRIORITY;
                394    ;* PRIORITY := MES(AD).PRIORITY;
                395    ;* CID := MES(AD).CID;
                396    ;* CPARA := MES(AD).CPARA;
                397    ;* ANADJ ((IN:ADP,DECPOS,ANA+COM+VAL; OUT:ANA+COM+VAL);
                398    ;* VALUE := ANA+COM+VAL;
                399    ;* CMNB := MES(AD).CMND;
                400    ;* OVB := MES(AD).OV;
                401    ;*FI
                402
0047 8A4507     403    ALOG10:     MOV AL,[DI+PC+RESPRI]   ;RES+PRIORITY
004A 251F00     404                AND AX,01FH             ;MASK OFF
004D A30000     R  405             MOV TMP1,AX
0050 8A4506     406                MOV AL,[DI+PC+COMPRI]   ;PRIORITY
0053 241F       407                AND AL,01FH             ;MASK OFF
0055 A30200     R  408             MOV TMP2,AX
0058 8A4508     409                MOV AL,[DI+PC+COMID]    ;COMMAND ID
005B B103       410                MOV CL,3
005D D3E8       411                SHR AX,CL
005F A30400     R  412             MOV TMP3,AX             ;CID
0062 8B4508     413                MOV AX,[DI+PC+COMPRM]   ;COMMAND PARAMETER
0065 86E0       414                XCHG AH,AL
0067 25FF07     415                AND AX,07FFH            ;MASK OFF
006A A30600     R  416             MOV TMP4,AX             ;CPARA
006D 8B4504     417                MOV AX,[DI+PC+ANACOM]   ;ANALOG COMMAND VALUE
0070 86E0       418                XCHG AH,AL
```

```
0072 8B760C        419         MOV  SI,[BP+PAR3]           ; ADP
0075 8A4506        420         MOV  CL,[DI+PC+DECPOS]      ; ANALOG DECIMAL POSITION
0078 D0E9          421         SHR  CL,1                   ; MASK (SHIFT RIGHT 5 BITS)
007A D0E9          422         SHR  CL,1
007C D0E9          423         SHR  CL,1
007E D0E9          424         SHR  CL,1
0080 D0E9          425         SHR  CL,1
0082 9A0000---- E  426         CALL ANADJ                  ; CALL ANALOG VALUE ADJUST
0087 A30000     R  427         MOV  TMP5,AX                ;VALUE
008A 8A4503        428         MOV  AL,[DI+PC+CONTYP]      ;COMMAND
008D 251F00        429         AND  AX,01FH                ;MASK OFF
0090 A30000     R  430         MOV  TMP6,AX                ;CMND
0093 8A4503        431         MOV  AL,[DI+PC+OV]
0096 B105          432         MOV  CL,5
0098 250100        433         AND  AX,1
009B D3E8          434         SHR  AX,CL
009D A30C00     R  435         MOV  TMP7,AX                ;OVB
00A0 8A4503        436         MOV  AL,[DI+PC+CB]
00A3 B104          437         MOV  CL,4
00A5 D3E8          438         SHR  AX,CL
00A7 250100        439         AND  AX,1
00AA A30E00     R  440         MOV  TMP8,AX                ;CKB
                   441
                   442    ;*CHECK+BIT(IN: AD,ADC,ADP,CB; OUT: ERR);
                   443    ;*IF
                   444    ;* ERR <> 0 -->
                   445    ;* SKIP;
                   446    ;*+;ERR = 0 -->
                   447    ;* A+OR+B := 1;
                   448    ;* PRIORITY+CHECK (IN: PRIORITY,ADP; OUT:ERR);
                   449    ;*FI
                   450    ;*IF
                   451    ;* ERR <>0 -->
                   452    ;* SKIP;
                   453
00AD FF360E00   R  454   ALOG20:  PUSH TMP8               ;CKB
00B1 E80000     E  455            CALL CHECK+BIT          ;CALL CHECK+BIT SERVICE ROUTINE
00B4 0BC0          456            OR   AX,AX              ;CHECK ERROR
00B6 7403          457            JZ   ALOG21             ;CONTINUE IF ERROR = 0
00B8 E9A400        458            JMP  ALOG50             ;JUMP IF ERROR <> 0
00BB FF360200   R  459   ALOG21:  PUSH TMP2               ;PRIORITY
00BF 88460C        460            MOV  AX,[BP+PAR3]
00C2 50            461            PUSH AX                 ;ADP
00C3 E80000     E  462            CALL PRIOR+CHK
00C6 0BC0          463            OR   AX,AX              ;ERROR
00C8 7403          464            JZ   ALOG22             ;CONTINUE ERROR = 0
00CA E99200        465            JMP  ALOG50             ;JUMP ERROR <= 0
                   466
                   467    ;*;ERR = 0 -->
                   468    ;* CNVRT+VAL+INCR (IN: VALUE,ADP,ADC,CMND; OUT: ANA+VAL);
                   469    ;* IF
                   470    ;*  CTYP = 0 -->
                   471    ;*   IF
                   472    ;*    CIP = 4 -->
                   473    ;*     ANA+VAL := PNT+REC(ADP).A+VAL + ANA+VAL
                   474
00CD FF360800   R  475   ALOG22:  PUSH TMP5               ;VALUE
00D1 88460C        476            MOV  AX,[BP+PAR3]
00D4 50            477            PUSH AX                 ;ADP
00D5 88460E        478            MOV  AX,[BP+PAR2]
00D8 50            479            PUSH AX                 ;ADG
00D9 FF360A00   R  480            PUSH TMP6               ;CMND
00DD E80000     E  481            CALL CNVT+VAL+INC       ;RETURNS AX = ANA+VAL
00E0 8B760C        482            MOV  SI,[BP+PAR3]       ;ADP
00E3 8B5C13        483            MOV  BX,[SI+ANVAL]      ;ANALOG VALUE
00E6 86FB          484            XCHG BH,BL
00E8 B104          485            MOV  CL,4
00EA D3EB          486            SHR  BX,CL
00EC 0BD2          487            OR   DX,DX
00EE 7514          488            JNZ  ALOG30             ;JUMP CTYP <> 0
00F0 8B0E0A00   R  489            MOV  CX,TMP6            ;COMMAND INPUT
00F4 83F904        490            CMP  CX,4
00F7 7505          491            JNE  ALOG27             ;JUMP CIP <> 4
```

```
00F9 03C3           493      ALOG25:    ADD AX,BX                   ;(ADP.A+VAL) - (ANA+VAL)
00FB EB1590         494                 JMP ALOG32
                    495
                    496      ;*   ;NES(AD).CIP () 4 -->
                    497      ;*      ANA+VAL := PNT+REC(ADP).A+VAL - ANA+VAL;
                    498      ;*   FI
                    499
00FE 2BD8           500      ALOG27:    SUB BX,AX                   ;(ADP.A+VAL) - (ANA+VAL)
0100 93             501                 XCHG AX,BX
0101 EB0F90         502                 JMP ALOG32
                    503
                    504      ;*   ;CTYP () 0 -->
                    505      ;*   IF
                    506      ;*      NES(AD).CHND = 4 -->
                    507      ;*         ANA+VAL := PNT+REC(ADP).A+VAL + ANA+VAL;
                    508      ;*      ;NES(AD).CHND = 5 -->
                    509      ;*         ANA+VAL := PNT+REC(ADP).A+VAL + ANA+VAL;
                    510      ;*      ;NES(AD).CHND () 4 OR 5 -->
                    511      ;*         SKIP;
                    512      ;*   FI
                    513      ;* FI
                    514
0104 8D0E0A00   R   515      ALOG30:    MOV CX,TMP6                 ;CHND (CTYP += 0)
0108 83F904         516                 CMP CX,4
010B 74EC          517                 JE ALOG25                   ;JUMP CHND = 4
010D 83F905         518                 CMP CX,5
0110 74EC          519                 JE ALOG27                   ;JUMP CHND = 5
                    520
                    521      ;*   IF
                    522      ;*      ANA+VAL < 0 -->
                    523      ;*         ANA+VAL := 0;
                    524      ;*      ;ANA+VAL > 4000 AND GRP+REC(ADP).TYP =) 4 -->
                    525      ;*         ANA+VAL = 4000;
                    526      ;*      ;ANA+VAL > 40 AND GRP+REC(ADP).TYP ( 4 -->
                    527      ;*         ANA+VAL := 40;
                    528      ;*   FI
                    529      ;*FI
                    530
0112 0BC0           531      ALOG32:    OR AX,AX                    ;ANA+VAL < 0?
0114 7902           532                 JNS ALP1                    ;JUMP IF NOT
0116 33C0           533                 XOR AX,AX                   ;IF LESS MAKE 0
0118 8B7E0E         534      ALP1:      MOV DI,[BP+PAR2]            ;GET GROUP ADDRESS
011B 8A5D01         535                 MOV BL,[DI+PNTYCHN]         ;GET GROUP TYPE
011E 80E3F0         536                 AND BL,0F0H                 ;ISOLATE
0121 80FB30         537                 CMP BL,30H                  ;CHECK FOR EIA TYPE
0124 7F06           538                 JG ALP2                     ;JUMP IF EIA
0126 BB2800         539                 MOV BX,DEL40
0129 E80490         540                 JMP ALP3
012C BBA00F         541      ALP2:      MOV BX,EIA4000              ;SET LIMIT FOR EIA (4000)
012F 3BC3           542      ALP3:      CMP AX,BX                   ;COMPARE ANALOG VALUE TO LIMIT
0131 7E01           543                 JNC ALOG34                  ;JUMP IF LESS THAN LIMIT
0133 93             544                 XCHG BX,AX                  ;ELSE SET TO LIMIT
                    545
0134 8BD8           546      ALOG34:    MOV BX,AX                   ;"BX = ANA+VAL"
                    547
                    548      ;*IF
                    549      ;* ERR () 0 -->
                    550      ;*   SKIP;
                    551      ;*;ERR = 0 -->
                    552      ;*   PRIORITY+CHANGE+ONLY(IN:A+OR+D,ANA+VAL,ADP,RES+PRIORITY,CID,CPARA;OUT:ERR);
                    553      ;*FI
                    554
0136 B80100         555      ALOG35:    MOV AX,1
0139 50             556                 PUSH AX                     ;A+OR+D = 1
013A 53             557                 PUSH BX                     ;ANA+VAL
013B 56             558                 PUSH SI                     ;ADP
013C FF360000   R   559                 PUSH TMP1                   ;RES+PRIORITY
0140 FF360400   R   560                 PUSH TMP3                   ;CID
0144 FF360600   R   561                 PUSH TMP4                   ;CPARA
0148 E80000     E   562                 CALL PRIORCHNG
                    563
                    564      ;*IF
```

```
                565    ;* ERR <> 0 -->
                566    ;* SKIP;
                567    ;*:ERR = 0 -->
                568    ;* FAILSAFE+CHECK (IN: ADP,A+OR+D,CTYP,CID; OUT: ERR);
                569    ;*FI
                570
0148 0BC0       571              OR AX,AX
014D 7510       572              JNZ ALOC50              ;JUMP ERROR += 0
014F 56         573              PUSH SI                 ;ADP
0150 B80100     574              MOV AX,1
0153 50         575              PUSH AX                 ;A+OR+D
0154 8B460A     576              MOV AX,[BP+PAR4]
0157 50         577              PUSH AX                 ;CTYP
0158 FF360000 R 578              PUSH TMP3               ;CID
015C E80000  E  579              CALL FAILSAF+CHK
                580
                581    ;*IF
                582    ;* ERR = 0 OR ER = 9 -->
                583    ;* UPDATE+PNT+FILE (IN: A+OR+D,AND+VAL,RES+PRIORITY,CID,CPARA,ADP; OUT: );
                584    ;* DELAY+C := 0;
                585    ;* PNT+REC(ADP) := OVB;
                586    ;* SEND+COMMAND (IN: A+OR+D,ANA+VAL,GRP+REC(ADC).TYP,CHNL,ADP,GRP,DELAY+C,PNT; OUT: NO+MORE);
                587
015F 0BC0       588    ALOC50:   OR AX,AX
0161 7405       589              JE ALOC52               ;JUMP ERROR = 0
0163 3D0900     590              CMP AX,9
0166 754E       591              JNE ALOC100             ;JUMP ERROR += 9
                592
0168 B80100     593    ALOC52:   MOV AX,1
016B 50         594              PUSH AX                 ;A+OR+D
016C 53         595              PUSH BX                 ;ANA+VAL
016D FF360000 R 596              PUSH TMP1               ;RES+PRIORITY
0171 FF360000 R 597              PUSH TMP3               ;CID
0175 FF360000 R 598              PUSH TMP4               ;CPARA
0179 56         599              PUSH SI                 ;ADP
017A E80000  E  600              CALL UPD+PNTFIL
017D A10C00  R  601              MOV AX,TMP7             ;OVB
0180 B107       602              MOV CL,7
0182 D2E0       603              SHL AL,CL               ;SHIFT TO OV BIT
0184 80640C7F   604              AND BYTE PTR [SI+OV],07FH ;AND OV BIT
0188 09440C     605              OR [SI+OV],AL           ;PLACE OVB INTO POINT FILE
018B B80100     606              MOV AX,1
018E 50         607              PUSH AX                 ;A+OR+D
018F 53         608              PUSH BX                 ;ANA+VAL
0190 8B7E0E     609              MOV DI,[BP+PAR2]        ;ADC
0193 33C0       610              XOR AX,AX               ;CLEAR AX
0195 8A4501     611              MOV AL,[DI+PHTYCHN]     ;TYPE FROM GROUP FILE
0198 B104       612              MOV CL,4
019A D2E8       613              SHR AL,CL
019C 50         614              PUSH AX                 ;GRP+REC(ADC).TYP
019D 884608     615              MOV AX,[BP+PAR5]
01A0 50         616              PUSH AX                 ;CHNL
01A1 56         617              PUSH SI                 ;ADP
01A2 884606     618              MOV AX,[BP+PAR6]
01A5 50         619              PUSH AX                 ;GRP
01A6 33C0       620              XOR AX,AX
01A8 50         621              PUSH AX                 ;DELAY+C (=0)
01A9 884604     622              MOV AX,[BP+PAR7]
01AC 50         623              PUSH AX                 ;PNT
01AD E80000  E  624              CALL SEN+CON
01B0 A20000  E  625              MOV PCNOMOR,AL          ;SAVE THE NO+MORE FLAG
01B3 E82F00     626              JMP ALOCOUT
                627
                628    ;*:ERR <> 0 AND ERR <> 9 -->
                629    ;* IF
                630    ;*   ERR = 11 --> ERR = ERR + 13
                631    ;*  :ERR <> 11 --> ERR = ERR + 14
                632    ;* FI
                633    ;* COSTATUS (IN: CHNL,GRP,PNT,ERR,CID,CPARA,CMND; OUT: );
                634    ;*FI
                635
01B6 A20000  E  636    ALOC100:  MOV PCERR,AL            ;SAVE THE ERROR NUMBER
01B9 8B5E08     637              MOV BX,[BP+PAR5]
```

```
01BC 53                     638              PUSH BX              ;CHNL
01BD 8B5E06                 639              MOV  BX,[BP+PAR6]
01C0 53                     640              PUSH BX              ;GRP
01C1 8B5E04                 641              MOV  BX,[BP+PAR7]
01C4 53                     642              PUSH BX              ;PNT
01C5 3C0B                   643              CMP  AL,11
01C7 7506                   644              JNE  ALOG105
01C9 050D00                 645              ADD  AX,13           ;ERROR + 13
01CC EB0490                 646              JMP  ALOG110
01CF 050E00        647      ALOG105:         ADD  AX,14           ;ERR +14
01D2 50            648      ALOG110:         PUSH AX
01D3 FF360400   R  649                       PUSH TMP3            ;CID
01D7 FF360600   R  650                       PUSH TMP4            ;CPARA
01DB FF360A00   R  651                       PUSH TMP6            ;CHNO
01DF 9A0000---- E  652                       CALL COSTATUS
                   653
01E4 5E            654      ALOGOUT:         POP  SI              ;RESTORE REGISTERS USED
01E5 5F            655                       POP  DI
01E6 5A            656                       POP  DX
01E7 59            657                       POP  CX
01E8 5B            658                       POP  BX
01E9 5D            659                       POP  BP
01EA C20E00        660                       RET  14
                   661
                   662      ANALOG           ENDP
----               663      CODE             ENDS
                   664                       END

;XREF SYMBOL TABLE LISTING
---- ------ ----- -------

NAME         TYPE      VALUE   ATTRIBUTES, XREFS

??SEG . . . .SEGMENT           SIZE=0000H PARA PUBLIC
ABASLN. . . .NUMBER    0015H   29C#
ABIT. . . . .NUMBER    000BH   191# 192
ABITMSK . . .NUMBER    0080H   319#
ABMSK . . . .NUMBER    0002H   168#
ACTL. . . . .NUMBER    000AH   189# 190
ACTLMSK . . .NUMBER    0008H   322#
AOPMSK. . . .NUMBER    0007H   344#
ADYM. . . . .NUMBER    0004H   288# 290
ALOG01. . . .L NEAR    0000H   CODE  367#
ALOG10. . . .L NEAR    0047H   CODE  377 403#
ALOG100 . . .L NEAR    0186H   CODE  591 636#
ALOG105 . . .L NEAR    01CFH   CODE  644 647#
ALOG110 . . .L NEAR    01D2H   CODE  646 648#
ALOG20. . . .L NEAR    00ADH   CODE  398 454#
ALOG21. . . .L NEAR    00BBH   CODE  457 459#
ALOG22. . . .L NEAR    00CDH   CODE  464 475#
ALOG25. . . .L NEAR    00F9H   CODE  493# 517
ALOG27. . . .L NEAR    00FEH   CODE  491 500# 519
ALOG30. . . .L NEAR    0104H   CODE  488 515#
ALOG32. . . .L NEAR    0112H   CODE  494 502 531#
ALOG34. . . .L NEAR    0134H   CODE  543 546#
ALOG35. . . .L NEAR    0136H   CODE  555#
ALOG50. . . .L NEAR    015FH   CODE  458 465 572 588#
ALOG52. . . .L NEAR    0168H   CODE  589 593#
ALOGOUT . . .L NEAR    01E4H   CODE  626 654#
ALP1. . . . .L NEAR    0118H   CODE  532 534#
ALP2. . . . .L NEAR    012CH   CODE  538 541#
ALP3. . . . .L NEAR    012FH   CODE  540 542#
AMA . . . . .NUMBER    002BH   297# 298
AMD . . . . .NUMBER    001BH   245# 246
ANADJ . . . .L FAR     0000H   EXTRN 47# 426
ANALOG. . . .L NEAR    0000H   CODE PUBLIC 34 354# 662
ANDECP. . . .NUMBER    0017H   274# 275 284
ANHIL . . . .NUMBER    001BH   278# 279
ANLCKOUT. . .NUMBER    0027H   284# 286 294
ANLOL . . . .NUMBER    001DH   279# 280
ANOFSTI . . .NUMBER    0021H   281# 282
```

```
ANOFST2 . . . NUMBER   0025H   283# 284
ANPD1 . . . . NUMBER   0028H   294# 295
ANPD2 . . . . NUMBER   0029H   295# 296
ANPD3 . . . . NUMBER   002AH   296# 297
ANSCFC1 . . . NUMBER   001FH   280# 281
ANSCFC2 . . . NUMBER   0023H   282# 283
ANVAL . . . . NUMBER   0013H   270# 271 288 483
ASTAT . . . . NUMBER   0011H   286# 290
ATTMSK. . . . NUMBER   00F0H   306#
ATTRIB. . . . NUMBER   000AH   187# 188 207
AVALMSK . . . NUMBER   FFF0H   340#
BITRLDS . . . NUMBER   0001H   178# 179
BUSNO . . . . NUMBER   0018H   252# 253 264
BUSNUM. . . . NUMBER   001CH   229# 230
C . . . . . . NUMBER   0018H   254# 255
CBASLN. . . . NUMBER   0013H   209#
CDY . . . . . NUMBER   0009H   207# 209
CHECK+BIT . . L NEAR   0000H   EXTRN 46# 455
CHNL. . . . . NUMBER   0010H   232# 233
CIMSK . . . . NUMBER   00F8H   315#
CLRMSK. . . . NUMBER   0008H   334#
CMDDLY. . . . NUMBER   0014H   214# 215 219
CMDID . . . . NUMBER   0016H   203# 204
CMDPAR. . . . NUMBER   0010H   204# 205
CMDSMK. . . . NUMBER   0060H   310#
CMDSTS. . . . NUMBER   000CH   195# 196
CMFNI . . . . NUMBER   0018H   227# 228 238
CMFLOW. . . . NUMBER   001AH   228# 229
CNTL. . . . . NUMBER   000AH   188# 189
CNTLMSK . . . NUMBER   0004H   323#
CNVT+VALINC . L NEAR   0000H   EXTRN 39# 481
CODE. . . . . SEGMENT          SIZE=01EDH BYTE PUBLIC  350# 352 663
COSTATUS. . . L FAR    0000H   EXTRN 44# 452
CPMSK . . . . NUMBER   07FFH   316#
D3BCDBIN. . . L FAR    0000H   EXTRN 45#
DATA. . . . . GROUP            DYNAMIC+BYTE DYNAMIC+WORD DATA+POINTER DATA+FILE  349# 350
DATA+FILE . . SEGMENT          SIZE=0000H --UNDEFINED--  349#
DATA+POINTER. SEGMENT          SIZE=0000H --UNDEFINED--  349#
DBASLN. . . . NUMBER   0005H   223#
DDYN. . . . . NUMBER   0001H   221# 223
DECPMK. . . . NUMBER   0007H   326#
DEL40 . . . . NUMBER   0028H   85# 539
DCPID1. . . . NUMBER   0004H   181# 182
DCPID2. . . . NUMBER   0005H   182# 183
DLEN. . . . . NUMBER   0005H   248#
DLYFLC. . . . NUMBER   0040H   309#
DM15AI. . . . NUMBER   0014H   147# 148 384
DM15BUS . . . NUMBER   000AH   137# 138
DM15CE. . . . NUMBER   000FH   142# 143
DM15CI. . . . NUMBER   0013H   146# 147 386
DM15E . . . . NUMBER   0010H   143# 144
DM15LC. . . . NUMBER   0011H   144# 145
DM15LP. . . . NUMBER   0012H   145# 146
DM15ML. . . . NUMBER   000CH   139# 140
DM15P . . . . NUMBER   0015H   148#
DM15RC. . . . NUMBER   000DH   140# 141
DM15S . . . . NUMBER   000BH   138# 139
DM15SSA . . . NUMBER   000EH   141# 142 382
DMSK. . . . . NUMBER   0002H   333#
DPD1. . . . . NUMBER   0018H   242# 243 248
DPD2. . . . . NUMBER   0019H   243# 244
DPD3. . . . . NUMBER   001AH   244# 245
DSTAT . . . . NUMBER   0004H   219# 223
DYNAMIC+BYTE. SEGMENT          SIZE=0200H BYTE PUBLIC  66# 71 349
DYNAMIC+WORD. SEGMENT          SIZE=0410H WORD PUBLIC  51# 62 349
E . . . . . . NUMBER   0018H   253# 254
ETA4000 . . . NUMBER   0FA0H   86# 541
ENSLEN. . . . NUMBER   0008H   238#
ENSMSK. . . . NUMBER   0008H   332#
ENAMSK. . . . NUMBER   0020H   335#
EU. . . . . . NUMBER   0003H   180# 181
FAILSAF+CHK . L NEAR   0000H   EXTRN 41# 579
```

```
FRCNT . . . . . NUMBER    0009H    186#  187  209
FRCTR . . . . . NUMBER    000BH    193#  194
FRMSK . . . . . NUMBER    003FH    308#
GRP1. . . . . . NUMBER    001EH    234#  235
GRP10 . . . . . NUMBER    001EH    233#  234
HYSTER. . . . . NUMBER    001AH    277#  278
L6LMSK. . . . . NUMBER    0004H    328#
LCKPT . . . . . NUMBER    0007H    184#  185
LKCRMK. . . . . NUMBER    003FH    329#
LKDLCT. . . . . NUMBER    0016H    273#  274
LODCMSK . . . . NUMBER    003FH    343#
MAXOFF. . . . . NUMBER    0015H    215#  216
MCMSK . . . . . NUMBER    0001H    317#
MINXMSK . . . . NUMBER    00FFH    324#
MINXTM. . . . . NUMBER    0013H    213#  214  221  221
MINCTR. . . . . NUMBER    0012H    205#  207  213  270
MINOFF. . . . . NUMBER    0016H    216#  217
MINON . . . . . NUMBER    0017H    217#  219  227  242  252
MOD1. . . . . . NUMBER    001DH    231#  232
MOD10 . . . . . NUMBER    001CH    230#  231
MODE. . . . . . NUMBER    0018H    255#  256
MODEMSK . . . . NUMBER    0002H    336#
MODNUM. . . . . NUMBER    0019H    256#  257
NRA . . . . . . NUMBER    0002H    163#
NRB . . . . . . NUMBER    0001H    164#
OUTID1. . . . . NUMBER    0006H    183#  184
OV. . . . . . . NUMBER    000CH    194#  195  604  605
OVMSK . . . . . NUMBER    0008H    327#
OVRHD . . . . . NUMBER    000AH    135#
PAR1. . . . . . NUMBER    0010H     76#   79  374
PAR2. . . . . . NUMBER    000EH     79#   80  478  534  609
PAR3. . . . . . NUMBER    000CH     80#   81  419  460  476  482
PAR4. . . . . . NUMBER    000AH     81#   82  375  576
PAR5. . . . . . NUMBER    0008H     82#   83  615  637
PAR6. . . . . . NUMBER    0006H     83#   84  618  639
PAR7. . . . . . NUMBER    0004H     84#  622  641
PC+ANACOM . . . NUMBER    0004H    113#  114  417
PC+CB . . . . . NUMBER    0003H    111#  436
PC+CHNL . . . . NUMBER    000AH    105#  106
PC+COMID. . . . NUMBER    000CH    118#  119  489
PC+CONCRT . . . NUMBER    0006H    115#  116  406
PC+CONSTM . . . NUMBER    0500H    119#  413
PC+CONTYP . . . NUMBER    000BH    112#  113  428
PC+DELPOS . . . NUMBER    0006H    114#  115  420
PC+DL . . . . . NUMBER    0003H    109#  110
PC+ERRTYP . . . NUMBER    0000H    104#  105
PC+FL . . . . . BYTES     0003H    108#  109
PC+FLG. . . . . NUMBER    0007H    116#  117
PC+GRP. . . . . NUMBER    0001H    106#  107
PC+OV . . . . . NUMBER    0003H    110#  111  112  431
PC+PNT. . . . . NUMBER    0002H    107#  108
PC+RESPRI . . . NUMBER    0007H    117#  118  403
PCERR . . . . V BYTE      0000H    EXTRN  68#  636
PCMONOR . . . V BYTE      0000H    EXTRN  69#  625
PHAC. . . . . . NUMBER    0000H    166#
PHED. . . . . . NUMBER    0001H    177#  178  209
PHCRD . . . . . NUMBER    0004H    167#
PHGRP . . . . . NUMBER    0002H    156#  157
PHMKPT. . . . . NUMBER    0005H    159#  160
PHNR. . . . . . NUMBER    0004H    158#  159
PHPNTADD. . . . NUMBER    0006H    160#
PHSCAN. . . . . NUMBER    0003H    157#  158
PHTICHN . . . . NUMBER    0001H    155#  156  535  611
PHTYP . . . . . NUMBER    00F0H    165#
PHUCNT. . . . . NUMBER    0000H    154#  155
PNT1. . . . . . NUMBER    001FH    236#
PNT10 . . . . . NUMBER    001FH    235#  236  238
PRIOR+CHK . . L NEAR      0000H    EXTRN  36#  462
PRIORCHNG . . L NEAR      0000H    EXTRN  40#  562
R . . . . . . . NUMBER    000DH    197#  198
RD. . . . . . . NUMBER    0002H    175#  176
RDMSK . . . . . NUMBER    0020H    302#
REPLNC. . . . . NUMBER    0018H    275#  276
```

```
RESFRY. . . . NUMBER    000DH   280# 281
RMSK. . . . . NUMBER    0003H   320#
RP. . . . . . NUMBER    0201H   198# 199
RPMSK . . . . NUMBER    0040H   321#
RPTPRI. . . . NUMBER    0058H   185# 186
RPTPYMK . . . NUMBER    001FH   325#
RSPRMK. . . . NUMBER    001FH   312#
RTC . . . . . NUMBER    001CH   259# 260 262
RTC2. . . . . NUMBER    001DH   260# 262
RTI . . . . . NUMBER    001AH   257# 258 259
RTI2. . . . . NUMBER    001BH   258# 264
RTLDYN. . . . NUMBER    0000H   262# 266
RTLEN . . . . NUMBER    0004H   266#
RTMSK . . . . NUMBER    0010H   331#
RTSLEN. . . . NUMBER    0004H   264# 266
SCKMSK. . . . NUMBER    0001H   338#
SEGMSK. . . . NUMBER    02F0H   304#
SECTYP. . . . NUMBER    0002H   179# 180
SEN+CON . . . L NEAR    0000H   EXTRN  43# 624
STATUS. . . . NUMBER    000AH   190# 191
STCMSK. . . . NUMBER    0003H   307#
TARVAL. . . . NUMBER    0014H   271# 272
TC. . . . . . NUMBER    0008H   192# 193
TCIDMSK . . . NUMBER    00F8H   313#
TID . . . . . NUMBER    0003H   124# 125
TMA . . . . . NUMBER    002CH   298#
TMD . . . . . NUMBER    001CH   246# 248
TMP1. . . . . V WORD    0000H   DYNAMIC+WORD  53# 378 405 559 596
TMP2. . . . . V WORD    0002H   DYNAMIC+WORD  54# 379 408 459
TMP3. . . . . V WORD    0004H   DYNAMIC+WORD  55# 380 412 560 578 597 649
TMP4. . . . . V WORD    0006H   DYNAMIC+WORD  56# 383 416 561 598 650
TMP5. . . . . V WORD    0008H   DYNAMIC+WORD  57# 385 427 475
TMP6. . . . . V WORD    000AH   DYNAMIC+WORD  58# 387 430 486 489 515 651
TMP7. . . . . V WORD    000CH   DYNAMIC+WORD  59# 388 435 601
TMP8. . . . . V WORD    000EH   DYNAMIC+WORD  60# 389 440 454
TMPRES. . . . NUMBER    000CH   196# 197
TPCDPR. . . . NUMBER    000EH   202# 203
TPCID . . . . NUMBER    000EH   201# 202
TPPMMK. . . . NUMBER    07FFH   314#
TPRSMK. . . . NUMBER    001FH   311#
TRVLMK. . . . NUMBER    0FFFH   341#
TYPMSK. . . . NUMBER    000FH   305#
UCMSK . . . . NUMBER    007FH   303#
UCNTMSK . . . NUMBER    00C0H   342#
UNRCNT. . . . NUMBER    0016H   272# 273 288
UNREAS. . . . NUMBER    0019H   276# 277
UPD+PNTFIL. . L NEAR    0000H   EXTRN  42# 600
USERCT. . . . NUMBER    0000H   176# 177
WL. . . . . . NUMBER    000DH   199# 200
WLMSK . . . . NUMBER    0020H   318#
WORD1 . . . . NUMBER    0001H   125# 126
WORD2 . . . . NUMBER    0002H   126# 127
WORD3 . . . . NUMBER    0003H   127# 128
WORD4 . . . . NUMBER    0004H   128# 129
WORD5 . . . . NUMBER    0005H   129# 130
WORD6 . . . . NUMBER    0006H   130# 131
WORD7 . . . . NUMBER    0007H   131# 132
WORD8 . . . . NUMBER    0008H   132# 133
WORD9 . . . . NUMBER    0009H   133# 137
```

ASSEMBLY COMPLETE, NO ERRORS FOUND

ISIS-II MCS-86 MACRO ASSEMBLER V2.0 ASSEMBLY OF MODULE ACKNOW
OBJECT MODULE PLACED IN :F1:ACKNOW.OBJ
ASSEMBLER INVOKED BY: ASM86 :F1:ACKNOW.SRC OBJECT(:F1:ACKNOW.OBJ) XREF EP(:F2:ACKNOW.EPL) PW(132) DA(02/25/81) PR(:F2:ACKNOW

```
LOC  OBJ              LINE    SOURCE

1      $TITLE(ACKNOW REV. 0 07/30/80 ACKNOWLEDGE D56-DC-000-000)
                        2
                        3      ;1.    REVISION HISTORY:
                        4
                        5      ;      REV. 0  07/30/80    R. FISHER
```

```
 6
 7   ;2.   FUNCTION:
 8
 9   ;     THIS MODULE CLEARS THE ACKNOWLEDGE BIT IN THE POINT FILE AND CALLS
10   ;     THE CHANGE OF STATE MODULE WHICH WILL GENERATE A CHANGE OF STATE
11   ;     MESSAGE.
12
13
14   ;3.   CALL AND RETURN SETUP:
15
16   ;     CALL SETUP:    STACK:  (SP+12) = DATA ADDRESS
17   ;                            (SP+10) = GROUP ADDRESS
18   ;                            (SP+08) = POINT ADDRESS
19   ;                            (SP+06) = COMMAND TYPE
20   ;                            (SP+04) = CHANNEL NUMBER
21   ;                            (SP+02) = GROUP NUMBER
22   ;                            (SP+00) = POINT NUMBER
23
24   ;     RETURN SETUP:  AH = ERROR NUMBER
25   ;                    AL = NO+MORE FLAG
26
27
28   ;4.   ENTRY POINT:
29
30         PUBLIC  ACKNOW
31
32
33   ;5.   CALLED ROUTINES:
34
35         EXTRN   COSTATE:FAR     ;CHANGE OF STATE ROUTINE
36
37
38   ;6.   EXTERNAL VARIABLES DEFINED:
39
40   ;     NONE
41
42
43   ;7.   EXTERNAL VARIABLES USED:
44
45         DATA+POINTER    SEGMENT WORD PUBLIC
46
47         EXTRN   PCADP:WORD      ;POINT FILE ADDRESS
48
49         DATA+POINTER    ENDS
50
51
52         DYNAMIC+BYTE    SEGMENT BYTE PUBLIC
53
54         EXTRN   PCCHNL:BYTE     ;CHANNEL NUMBER
55         EXTRN   PCGRP:BYTE      ;GROUP NUMBER
56         EXTRN   PCPNT:BYTE      ;POINT NUMBER
57
58         DYNAMIC+BYTE    ENDS
59
60
61   ;8.   EQUATED SYMBOLS:
62
63         AMASK   EQU     80H     ;MASK FOR ACKNOWLEDGE BIT IN POINT FILE
64         FORTEN  EQU     14      ;NUMBER OF PARAMETER BYTES ON STACK
65
66   ;     INCLUDED FILES  PHYEQU.SRC
67   ;                     COSATB.SRC
68
69
70   ;9.   INTERNAL SYMBOLS:
71
72   ;     NONE
73
74
75   ;10.  REGISTERS USED:
76
77   ;     DI AND CI USED AND RESTORED TO ENTRY STATE
78   ;     AX RETURNS PARAMETERS
```

```
                    79
                    80
                    81 +1  $EJECT
                    82
                    83
                    84
                    85
                    86 +1  $SAVE
                    87 +1  $NOLIST
                    361 +1 $EJECT
                    362    DATA    GROUP   DYNAMIC+BYTE,DYNAMIC+WORD,DATA+POINTER,DATA+FILE
                    363
                    364    ASSUME  CS:CODE,DS:DATA
                    365
----                366    CODE    SEGMENT BYTE PUBLIC
                    367
                    368
0000                369    ACKNOW  PROC    NEAR
                    370
                    371    ;=IF
                    372    ;* PNT+REC(ADP).A = 1 -->
                    373    ;* PNT+REC(ADP).A := 0;
                    374    ;* COSTATE (IN: CHNL,GRP,PNT,ACKCLR; OUT: )
                    375    ;*;PNT+REC(ADP).A <> 1 -->
                    376    ;* SKIP;
                    377    ;*FI
                    378
0000 53             379    AC1:    PUSH    BX              ;SAVE CONTENTS FOR CALLER
0001 51             380            PUSH    CX
0002 8B1E0000  E    381            MOV     BX,PCADP        ;POINT FILE ADDRESS
0006 F6470080       382            TEST    BYTE PTR [BX+ABIT],AMASK    ;CHECK FOR ALREADY ACKNOWLEDGED
000A 7417           383            JZ      AC5             ;JUMP IF ACKNOWLEDGED
000C 8067037F       384            AND     BYTE PTR [BX+ABIT],NOT AMASK    ;RESET ACKNOWLEDGE BIT
0010 8A0E0000  E    385            MOV     CL,PCPNT        ;POINT NUMBER
0014 8A2E0000  E    386            MOV     CH,PCGRP        ;GROUP NUMBER
0018 8A260000  E    387            MOV     AH,PCCHNL       ;CHANNEL NUMBER
001C B000           388            MOV     AL,ACKCLR       ;ACKNOWLEDGE CLEAR
001E 9A000000--- E  389            CALL    COSTATE         ;CALL THE CHANGE OF STATE HANDLER
0023 33C0           390    AC5:    XOR     AX,AX           ;RESET ERR AND NO+MORE PARAMETERS
0025 59             391            POP     CX              ;RESTORE REGISTERS
0026 5B             392            POP     BX
0027 C20E00         393            RET     FORTEN          ;RETURN TO CALLER MINUS PARAMETERS
                    394
                    395    ACKNOW  ENDP
                    396
----                397    CODE    ENDS
                    398
                    399            END
```

XREF SYMBOL TABLE LISTING

```
NAME            TYPE      VALUE   ATTRIBUTES, XREFS

??SEG . . . . SEGMENT             SIZE=0000H PARA PUBLIC
ABASLN. . . . NUMBER    0015H     231#
ABIT. . . . . NUMBER    000BH     130# 131 382 384
ABITMSK . . . NUMBER    0080H     260#
ABMSK . . . . NUMBER    0002H     107#
AC+PWR. . . . NUMBER    0063H     346#
AC1 . . . . . L NEAR    0000H     CODE 379#
AC5 . . . . . L NEAR    0023H     CODE 383 390#
ACKCLR. . . . NUMBER    0008H     312# 388
ACKNOW. . . . L NEAR    0000H     CODE PUBLIC 30 349# 395
ACKSTDY . . . NUMBER    0088H     311#
ACTL. . . . . NUMBER    000AH     128# 129
ACTLMSK . . . NUMBER    0008H     263#
ADPMSK. . . . NUMBER    0007H     285#
ADYN. . . . . NUMBER    0004H     229# 231
ALARM . . . . NUMBER    0010H     317#
ALARMFB . . . NUMBER    0044H     298#
ALARMSD . . . NUMBER    0002H     333#
```

```
AMA . . . . . . NUMBER    002BH    238# 239
AMASK . . . . . NUMBER    0086H    63# 382 384
AMD . . . . . . NUMBER    001BH    186# 187
ANALOC. . . . . NUMBER    0031H    339#
ANDECP. . . . . NUMBER    0017H    215# 216 227
ANHIL . . . . . NUMBER    001BH    219# 220
ANLCKOUT. . . . NUMBER    0027H    225# 227 235
ANLOL . . . . . NUMBER    001DH    220# 221
ANOFST1 . . . . NUMBER    0021H    222# 223
ANOFST2 . . . . NUMBER    0025H    224# 225
ANPD1 . . . . . NUMBER    0028H    235# 236
ANPD2 . . . . . NUMBER    0029H    236# 237
ANPD3 . . . . . NUMBER    002AH    237# 238
ANSCFC1 . . . . NUMBER    001FH    221# 222
ANSCFC2 . . . . NUMBER    0023H    223# 224
ANVAL . . . . . NUMBER    0013H    211# 212 229
ASTAT . . . . . NUMBER    0011H    227# 231
ATTMSK. . . . . NUMBER    00F0H    247#
ATTRIB. . . . . NUMBER    000AH    126# 127 148
AUTOCMD . . . . NUMBER    0001H    328#
AVALMSK . . . . NUMBER    FFF0H    281#
BITRLOS . . . . NUMBER    0001H    117# 118 146
BUSNO . . . . . NUMBER    0016H    193# 194 205
BUSNUM. . . . . NUMBER    001CH    170# 171
C . . . . . . . NUMBER    0018H    195# 196
CBASLN. . . . . NUMBER    0013H    158#
CDY . . . . . . NUMBER    0007H    148# 150
CHNL. . . . . . NUMBER    0010H    173# 174
CIMSK . . . . . NUMBER    00F8H    256#
CLRMSK. . . . . NUMBER    0008H    275#
CMCTRL. . . . . NUMBER    0011H    307#
CMDDLY. . . . . NUMBER    0014H    155# 156 160
CMDFAIL . . . . NUMBER    0049H    303#
CMDID . . . . . NUMBER    0010H    142# 143
CMDFAM. . . . . NUMBER    001MH    143# 144
CMDSMK. . . . . NUMBER    0060H    251#
CMDSTS. . . . . NUMBER    000CH    134# 135
CMFHI . . . . . NUMBER    0018H    168# 169 179
CMFLOW. . . . . NUMBER    001AH    169# 170
CNTL. . . . . . NUMBER    003AH    127# 128
CNTLMSK . . . . NUMBER    0004H    264#
CODE. . . . . . SEGMENT            SIZE=002AH BYTE  PUBLIC  364# 366 397
COSKORMAL . . . NUMBER    0010H    306#
COSTATE . . . L FAR       0000H    EXTRN  35# 389
CPA . . . . . . NUMBER    0003H    343#
CPMSK . . . . . NUMBER    07FFH    257#
DATA. . . . . . GROUP              DYNAMIC+BYTE DYNAMIC+WORD DATA+POINTER DATA+FILE  362# 364
DATA+FILE . . . SEGMENT            SIZE=0000H --UNDEFINED--  362#
DATA+POINTER. SEGMENT              SIZE=0200H WORD  PUBLIC   45# 49 362
DBASLN. . . . . NUMBER    0005H    164#
DDYN. . . . . . NUMBER    0001H    162# 164
DECPMK. . . . . NUMBER    0007H    267#
DCPID1. . . . . NUMBER    0004H    120# 121
DCPID2. . . . . NUMBER    0005H    121# 122
DIGCMD. . . . . NUMBER    0002H    337#
DIGITAL . . . . NUMBER    0069H    336#
DLEN. . . . . . NUMBER    0305H    169#
DLYFLG. . . . . NUMBER    0040H    259#
DMSK. . . . . . NUMBER    0002H    274#
DPD1. . . . . . NUMBER    0018H    183# 184 189
DPD2. . . . . . NUMBER    0019H    184# 185
DPD3. . . . . . NUMBER    001AH    185# 186
DSTAT . . . . . NUMBER    0004H    160# 164
DYNAMIC+BYTE. SEGMENT              SIZE=0000H BYTE  PUBLIC   52# 58 362
DYNAMIC+WORD. SEGMENT              SIZE=0000H --UNDEFINED--  362#
E . . . . . . . NUMBER    0018H    194# 195
EMSLEN. . . . . NUMBER    0008H    179#
EMSMSK. . . . . NUMBER    0008H    273#
ENAMSK. . . . . NUMBER    0020H    276#
EU. . . . . . . NUMBER    0C83H    119# 120
FASTCMD . . . . NUMBER    0502H    330#
FBANALOC. . . . NUMBER    0011H    341#
FORTEN. . . . . NUMBER    000EH    64# 393
```

| Symbol | Type | Value | References |
|---|---|---|---|
| FRCNT | NUMBER | 0009H | 125# 126 146 150 |
| FRCTR | NUMBER | 000BH | 132# 133 |
| FRMSK | NUMBER | 003FH | 249# |
| GRD+FALT | NUMBER | 0300H | 345# |
| GRP1 | NUMBER | 001EH | 175# 176 |
| GRP10 | NUMBER | 001EH | 174# 175 |
| HEDLEN | NUMBER | 0009H | 146# |
| HIALM | NUMBER | 0020H | 320# |
| HIALMFB | NUMBER | 0042H | 296# |
| HTGCLCB | NUMBER | 009FH | 351# |
| HYSTER | NUMBER | 001AH | 218# 219 |
| INTRPT | NUMBER | 0017H | 304# |
| L6LMSK | NUMBER | 0004H | 269# |
| LCKPT | NUMBER | 0007H | 123# 124 |
| LKCRMK | NUMBER | 003FH | 278# |
| LKDLCT | NUMBER | 0016H | 214# 215 |
| LOALM | NUMBER | 0010H | 319# |
| LOALMFB | NUMBER | 0041H | 295# |
| LOCKSTS | NUMBER | 0015H | 313# |
| LODCMSK | NUMBER | 003FH | 284# |
| MAXOFF | NUMBER | 0015H | 156# 157 |
| NCMSK | NUMBER | 0001H | 258# |
| MINMSK | NUMBER | 00FFH | 265# |
| MINITH | NUMBER | 0013H | 154# 155 162 162 |
| MINCTR | NUMBER | 0012H | 144# 148 154 211 |
| MINOFF | NUMBER | 0016H | 157# 158 |
| MINON | NUMBER | 0017H | 158# 160 168 183 193 |
| MOD1 | NUMBER | 001DH | 172# 173 |
| MOD10 | NUMBER | 001CH | 171# 172 |
| MODE | NUMBER | 0018H | 196# 197 |
| MODEMSK | NUMBER | 0032H | 277# |
| MODNUM | NUMBER | 0019H | 197# 198 |
| NOCHNG | NUMBER | 0002H | 358# |
| NOMSG | NUMBER | 00FFH | 291# |
| NORESP | NUMBER | 0036H | 321# |
| NORESPAFB | NUMBER | 0046H | 309# 302 |
| NORESPBFB | NUMBER | 0047H | 301# |
| NORESPFB | NUMBER | 0046H | 302# |
| NORMAL | NUMBER | 0000H | 316# |
| NORMALSD | NUMBER | 0000H | 331# |
| NORSPFB | NUMBER | 0043H | 297# |
| NOSTATE | NUMBER | 00FFH | 322# |
| NRA | NUMBER | 0002H | 102# |
| NRB | NUMBER | 0001H | 103# |
| OFFCMD | NUMBER | 0009H | 327# |
| OFFOFFONOMB | NUMBER | 0099H | 353# |
| OFFSLWFSTB | NUMBER | 009DH | 350# |
| ONCMD | NUMBER | 0002H | 326# |
| ONOFFAUTOB | NUMBER | 009BH | 349# |
| OPNCLSB | NUMBER | 00A1H | 352# |
| OUTID1 | NUMBER | 0006H | 122# 123 |
| OV | NUMBER | 030CH | 133# 134 |
| OVMSK | NUMBER | 0003H | 268# |
| PCADP | V WORD | 0000H | EXTRN 47# 381 |
| PCCHNL | V BYTE | 0000H | EXTRN 54# 387 |
| PCGRP | V BYTE | 0000H | EXTRN 55# 386 |
| PCPNT | V BYTE | 0000H | EXTRN 56# 385 |
| PHAC | NUMBER | 0008H | 105# |
| PHED | NUMBER | 0001H | 116# 117 150 |
| PHCRD | NUMBER | 0004H | 106# |
| PHGRP | NUMBER | 0002H | 95# 96 |
| PIMXPT | NUMBER | 0005H | 98# 99 |
| PHNR | NUMBER | 0004H | 97# 98 |
| PHPNTADD | NUMBER | 0006H | 99# |
| PHSCAN | NUMBER | 0003H | 96# 97 |
| PHSYCON | NUMBER | 0007H | 94# 95 |
| PHTYP | NUMBER | 00F0H | 104# |
| PHUCNT | NUMBER | 0000H | 93# 94 |
| PNT1 | NUMBER | 001FH | 177# |
| PNT10 | NUMBER | 001FH | 176# 177 179 |
| PWRRPT | NUMBER | 0016H | 305# |
| R | NUMBER | 0000H | 136# 137 |

```
RD. . . . . . . NUMBER   0020H    114#  115
RDMSK . . . . . NUMBER   0030H    243#
REJFAIL . . . . NUMBER   0013H    309#
REJPRI. . . . . NUMBER   0012H    308#
REPRNC. . . . . NUMBER   0018H    216#  217
REPRT . . . . . NUMBER   0003H    359#
RESPRY. . . . . NUMBER   000DH    139#  140
RETURN. . . . . NUMBER   0088H    292#
RETURNA . . . . NUMBER   008CH    293#
RETURNB . . . . NUMBER   008CH    294#
RMSK. . . . . . NUMBER   0028H    261#
RP. . . . . . . NUMBER   000DH    137#  138
RPMSK . . . . . NUMBER   0040H    262#
RPTPRI. . . . . NUMBER   0008H    124#  125
RPTPYMK . . . . NUMBER   001FH    266#
RSPRMK. . . . . NUMBER   001FH    253#
RTC . . . . . . NUMBER   001CH    200#  201  203
RTC2. . . . . . NUMBER   001DH    201#  203
RTI . . . . . . NUMBER   001AH    198#  199  200
RTI2. . . . . . NUMBER   001BH    199#  205
RTLDYN. . . . . NUMBER   0020H    203#  207
RTLEN . . . . . NUMBER   0004H    207#
RTMSK . . . . . NUMBER   0010H    272#
RTSLEN. . . . . NUMBER   0004H    205#  207
SCNMSK. . . . . NUMBER   0001H    271#
SECACCB . . . . NUMBER   0097H    348#
SECMSK. . . . . NUMBER   00F0H    245#
SECTYP. . . . . NUMBER   0092H    118#  119
SLOWCMD . . . . NUMBER   0001H    329#
STATUS. . . . . NUMBER   008AH    129#  130
STSMSK. . . . . NUMBER   0003H    248#
TARVAL. . . . . NUMBER   0014H    212#  213
TC. . . . . . . NUMBER   0303H    131#  132
TCIDMSK . . . . NUMBER   00F8H    254#
TMA . . . . . . NUMBER   002CH    239#
TMD . . . . . . NUMBER   001CH    197#  189
TMPRES. . . . . NUMBER   00CCH    135#  136
TPCDPR. . . . . NUMBER   000EH    141#  142
TPCID . . . . . NUMBER   000EH    140#  141
TPPMK . . . . . NUMBER   07FFH    255#
TPRSMK. . . . . NUMBER   001FH    252#
TROUBLE . . . . NUMBER   0058H    310#
TROUBLEFB . . . NUMBER   0045H    299#
TROUBLESO . . . NUMBER   0021H    332#
TRVLNK. . . . . NUMBER   0FFFH    282#
TSTRSTB . . . . NUMBER   0092H    347#
TYPMSK. . . . . NUMBER   000FH    246#
UCMSK . . . . . NUMBER   007FH    241#
UCNTMSK . . . . NUMBER   00C0H    283#
UNRCNT. . . . . NUMBER   0016H    213#  214  229
UNREAS. . . . . NUMBER   0019H    217#  218
UNREASON. . . . NUMBER   0001H    357#
USERCT. . . . . NUMBER   0003H    115#  116
WL. . . . . . . NUMBER   0000H    138#  139
WLMSK . . . . . NUMBER   0020H    259#
```

ASSEMBLY COMPLETE, NO ERRORS FOUND

The embodiments of the invention in which an exclusive property or right is claimed are defined as follows:

1. A system for controlling a plurality of loads based upon command and residual priorities comprising:
    a plurality of loads;
    control means for controlling said loads according to at least two programs, each program having a command priority used for a program which wants control of a load and a residual priority retained for the program having control, said control means comparing the command priority of the program wanting control of a load to the residual priority of the program having control for thereby providing a command instruction to the load if said command priority of the program wanting control is greater than or equal to the residual priority of the program having control; and,
    communication means connected between said control means and said loads for communicating the command instruction to said load.

2. A system for controlling a plurality of loads based upon command and residual priority comprising:
    a plurality of loads;
    control means for controlling said loads according to at least two programs, each program having a command priority used for a program which wants control of a load and a residual priority retained for the program having control, said control means comparing the command priority of the program wanting control of a load to the residual priority of the program having control for thereby providing a command instruction to the load if said command priority of the program wanting control is greater than or equal to the residual priority of the program having control;
    said control means storing the residual priority of the program wanting control if the command priority of the program wanting control is greater than or equal to the residual priority of the program having control; and,
    communication means connected between said control means and said loads for communicating the command instruction to said load.

3. A system for controlling a plurality of loads based upon command and residual priorities comprising:
    a plurality of loads;
    memory means having first memory locations for storing at least first and second programs, each program having a command priority used for a program which wants control of a load and a residual priority retained for the program having control, said memory means having second memory locations for storing a residual priority for each load based upon the program which is currently in control of the load;
    control means for controlling said loads according to said at least first and second programs, said control means comparing the command priority of a program wanting control of a load to the residual priority of the program having control for thereby providing a command instruction to the load if said command priority of the program wanting control is greater than or equal to the residual priority of the program having control; and,
    communication means connected between said control means and said loads for communicating the command instruction to said load.

4. A system for controlling a plurality of loads based upon command and residual priorities comprising:
    a plurality of loads;
    memory means having first memory locations for storing at least first and second programs, each program having a command priority used for a program which wants control of a load and a residual priority retained for the program having control, said memory means having second memory locations for storing a residual priority for each load based upon the program which is currently in control of the load;
    control means for controlling said loads according to said at least first and second programs, said control means comparing the command priority of a program wanting control of a load to the residual priority of the program having control for thereby providing a command instruction to the load if said command priority of the program wanting control is greater than or equal to the residual priority of the program having control;
    said control means storing the residual priority of the program wanting control if the command priority of the program wanting control is greater than or equal to the residual priority of the program having control; and,
    communication means connected between said control means and said loads for communicating the command instruction to said load.

* * * * *